(12) United States Patent
Lu et al.

(10) Patent No.: US 8,824,657 B2
(45) Date of Patent: *Sep. 2, 2014

(54) PROVIDING RING BACK TONES IN A COMMUNICATION NETWORK

(75) Inventors: Xuanming Lu, Shenzhen (CN); Xiaodong Zhao, Shenzhen (CN); Yongfeng Cai, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 708 days.

This patent is subject to a terminal disclaimer.

(21) Appl. No.: 12/877,483

(22) Filed: Sep. 8, 2010

(65) Prior Publication Data

US 2010/0329442 A1 Dec. 30, 2010

Related U.S. Application Data

(63) Continuation of application No. 11/274,939, filed on Nov. 15, 2005, now Pat. No. 7,889,856, which is a continuation of application No. PCT/CN2004/000499, filed on May 17, 2004.

(30) Foreign Application Priority Data

| May 15, 2003 | (CN) | 03 1 36117 |
| May 26, 2003 | (CN) | 03 1 36994 |
| Aug. 23, 2003 | (CN) | 03 1 55239 |
| Aug. 23, 2003 | (CN) | 03 1 55242 |
| Aug. 23, 2003 | (CN) | 03 1 55243 |
| Oct. 31, 2003 | (CN) | 2003 1 0103906 |
| Dec. 4, 2003 | (CN) | 2003 1 0118878 |
| Mar. 16, 2004 | (CN) | 2004 1 0039809 |
| Mar. 16, 2004 | (CN) | 2004 1 0039812 |
| Apr. 7, 2004 | (CN) | 2004 1 0030852 |

(51) Int. Cl.
*H04M 3/00* (2006.01)
*H04M 3/42* (2006.01)
*H04M 3/487* (2006.01)

(52) U.S. Cl.
CPC .......... *H04M 3/42068* (2013.01); *H04M 3/487* (2013.01); *H04M 3/42017* (2013.01); *H04M 2203/2072* (2013.01); *H04M 3/4211* (2013.01)

USPC .............. 379/257; 455/414.1; 455/414.2; 379/210.02; 379/252; 379/220.1

(58) Field of Classification Search
USPC .............. 455/414.1, 414.2; 379/210.02, 252, 379/220.01
See application file for complete search history.

(56) References Cited

U.S. PATENT DOCUMENTS 5,539,809 A * 7/1996 Mayer et al. ............. 379/210.02
5,926,537 A * 7/1999 Birze ........................ 379/252

(Continued)

FOREIGN PATENT DOCUMENTS

| CN | 1294811 | 5/2001 |
| CN | 1335015 | 2/2002 |

(Continued)

OTHER PUBLICATIONS

Summons to attend oral proceedings pursuant to Rule 115(1) EPC dated (mailed_Mar. 1, 2013, issued in related European Application No. 04733299.4-2414/1705885, Huawei Technologies Co., Ltd.

(Continued)

*Primary Examiner* — Charles Shedrick
(74) *Attorney, Agent, or Firm* — Huawei Technologies Co., Ltd.

(57) ABSTRACT

Disclosed are systems and methods for providing ring back tones in a communication network. At first, a ring back tone device for storing and playing the ring back tone customized by a subscriber is established in the communication network. Whether a subscriber is a ring back tone service register subscriber is judged with a certain triggering mode, such as intelligent network triggering, signaling interception triggering, call forwarding triggering or switching device triggering. If it is judged the subscriber is a ring back tone service registered subscriber, a connection between the originating switching device and the terminating switching device and a connection between a switching device and the ring back tone device are established. When the called terminal is idle, the ring back tone device provides a piece of customized ring back tone to the calling subscriber for replacing traditional ring back tone.

15 Claims, 62 Drawing Sheets calling terminal A      called terminal B

(56) References Cited

U.S. PATENT DOCUMENTS

| | | | |
|---|---|---|---|
| 6,128,503 A * | 10/2000 | Granberg et al. | 455/461 |
| 6,134,316 A * | 10/2000 | Kallioniemi et al. | 379/220.01 |
| 7,171,200 B2 * | 1/2007 | No et al. | 455/433 |
| 2004/0114732 A1 * | 6/2004 | Choe et al. | 379/88.17 |
| 2004/0120494 A1 * | 6/2004 | Jiang et al. | 379/210.01 |
| 2004/0132435 A1 | 7/2004 | No et al. | |
| 2005/0026646 A1 * | 2/2005 | Naim et al. | 455/552.1 |
| 2005/0117726 A1 * | 6/2005 | DeMent et al. | 379/142.01 |
| 2006/0013377 A1 * | 1/2006 | Ahn et al. | 379/207.16 |
| 2006/0128381 A1 * | 6/2006 | Kim et al. | 455/433 |
| 2006/0264225 A1 | 11/2006 | No et al. | |
| 2008/0101554 A1 * | 5/2008 | Rhee et al. | 379/67.1 |

FOREIGN PATENT DOCUMENTS

| | | |
|---|---|---|
| CN | 1419772 | 5/2003 |
| CN | 1498508 A | 5/2004 |
| CN | 1507290 | 6/2004 |
| CN | 1556643 | 12/2004 |
| CN | 1218602 | 9/2005 |
| CN | 1223130 | 10/2005 |
| CN | 1225936 | 11/2005 |
| CN | 1288935 | 12/2006 |
| CN | 1300997 | 2/2007 |
| CN | 1310530 | 4/2007 |
| CN | 100440909 | 12/2008 |
| JP | 11/272532 | 10/1999 |
| JP | 2001094669 A | 4/2001 |
| JP | 2002/223480 | 8/2002 |
| JP | 2002/537730 | 11/2002 |
| JP | 2003/515283 | 4/2003 |
| JP | 2003515283 A | 4/2003 |
| JP | 2003/283660 | 10/2003 |
| JP | 2004/088452 | 3/2004 |
| KR | 2000/000244 | 1/2000 |
| KR | 20000000244 A | 1/2000 |
| KR | 2002-0056833 A | 7/2002 |
| KR | 2002/0097046 | 12/2002 |
| KR | 2002/0097050 | 12/2002 |
| KR | 2003/0005076 | 1/2003 |
| KR | 20030005076 A | 1/2003 |
| KR | 2003/0024466 | 3/2003 |
| KR | 2003/0027916 | 4/2003 |
| KR | 2003/0067613 | 8/2003 |
| KR | 2003/0069134 | 8/2003 |
| RU | 2154357 | 8/2000 |
| RU | 2178628 | 1/2002 |
| WO | WO00/18107 | 3/2000 |
| WO | WO00/49793 | 8/2000 |
| WO | WO 00/62524 A1 | 10/2000 |
| WO | WO01/06679 | 1/2001 |
| WO | 0137527 A1 | 5/2001 |
| WO | WO03/071815 | 8/2003 |
| WO | WO03/071820 | 8/2003 |
| WO | WO 2004/016029 | 2/2004 |
| WO | 2004036944 A1 | 4/2004 |
| WO | WO2004/102940 | 11/2004 |

OTHER PUBLICATIONS

European Communication in related European Application No. 04 733 299.4 dated Mar. 1, 2012, pp. 1-6.
ETS 300 374-1: dated Sep. 1994, p. 148.
Hearing Notice in Reference Application No. 5858/DELNP/2005 dated Jan. 4, 2012, 1 page.
Statement of Responses dated Oct. 20, 2011, issued in related Chinese Patent No. ZL03136117.X, (36 pages).
EPO Result of Consultation mailed Jun. 18, 2012, issued in related European Application No. 04733299.4, Huawei Technologies Co., Ltd. (4 pages).
EPO Result of Consultation dated Jun. 18, 2012, issued in related European Application No. 04733299.4, Huawei Technologies Co., Ltd. (4 pages).
Guenther, Roger D., Lucent Technologies; Bell Labs Innovations, TIAIEIA-41-D; Cellular Radiotelecommunications Intersystem Operations, Whippany, New Jersey, 1495 pages.
Wireless Intelligent Network Capabilities for Pre-Paid Charging, PN-4287, 356 pages.
Wang Yulong, et al., Solutions Supporting Color Ring Service for CSI Subscribers in MIN; Modern Science & Technology of Telecommunications, Jan. 1, 2004; 3 pages.
Russian Office Action for Russian Patent Application No. 2007147831, dated Feb. 26, 2009, and English translation thereof.
Russian Office Action for Russian Patent Application No. 2005140545, dated Aug. 30, 2006, and English translation thereof 7021812, dated Nov. 17, 2006.
English translation of the Written Opinion of the International Searching Authority for International Application No. PCT/CN2004/000499, dated Aug. 26, 2004.
English translation of Korean Office Action for Korean Patent Application No. 10-2005-7021812, dated Nov. 17, 2006.
Notice of Reasons of Rejection for Japanese Patent Application No. 2006-529557, dated Nov. 11, 2008, and English translation thereof.
English translation of Indonesian Office Action for Indonesian Patent Application No. W-00200503048, dated Oct. 31, 2007.
Extended European Search Report for European Patent Application No. 07120478.8, dated Apr. 8, 2008.
Supplementary European Search Report for European Patent Application No. 04733299.4, dated Feb. 15, 2007.
European Office Action for European Patent Application No. 04733299.4, dated Apr. 24, 2007.
Chinese Office Action for Chinese Patent Application No. 200310103906.8, and English translation thereof.
Chinese Office Action for Chinese Patent Application No. 2004100.39812.3, dated Sep. 1, 2006, and English translation thereof.
Chinese Office Action for Chinese Patent Application No. 200410039809.1, dated Sep. 21, 2007, and English translation thereof.
Canadian Office Action for Canadian Patent Application No. 2,523,909, dated Jan. 8, 2009.
Canadian Office Action for Canadian Patent Application No. 2,523,909, dated Apr. 21, 2010.
Japanese Decision of Refusal for Japanese Patent Application No. 2006-529557, dated Sep. 1, 2009, and English summary thereof.
Indian Office Action for Indian Application No. 5858/DELNP/2005, dated Jan. 28, 2009.
European Office Action for European Application No. 04 733 299.4, dated Mar. 25, 2008.
First office action issued in corresponding Japanese patent application No. 2010-003407, dated Aug. 31, 2012, and English translation thereof, total 6 pages.
European Patent Office Communication pursuant to Article 94(3) EPC, European search opinion for Application No. 04 733 299.4-2414, mailed Mar. 4, 2011, Huawei Technologies C., Ltd 7 pgs.

* cited by examiner

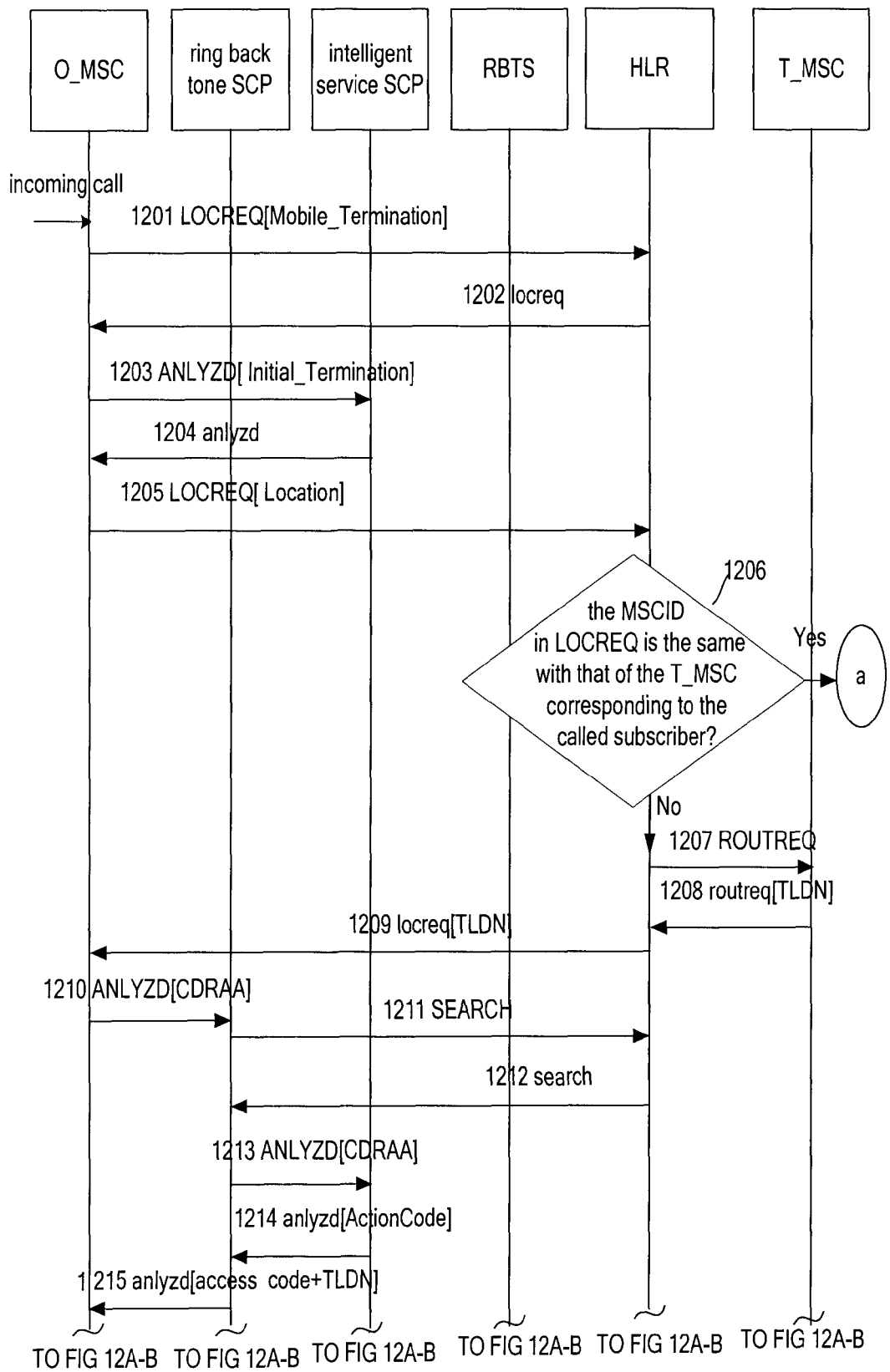
Fig.12A-A

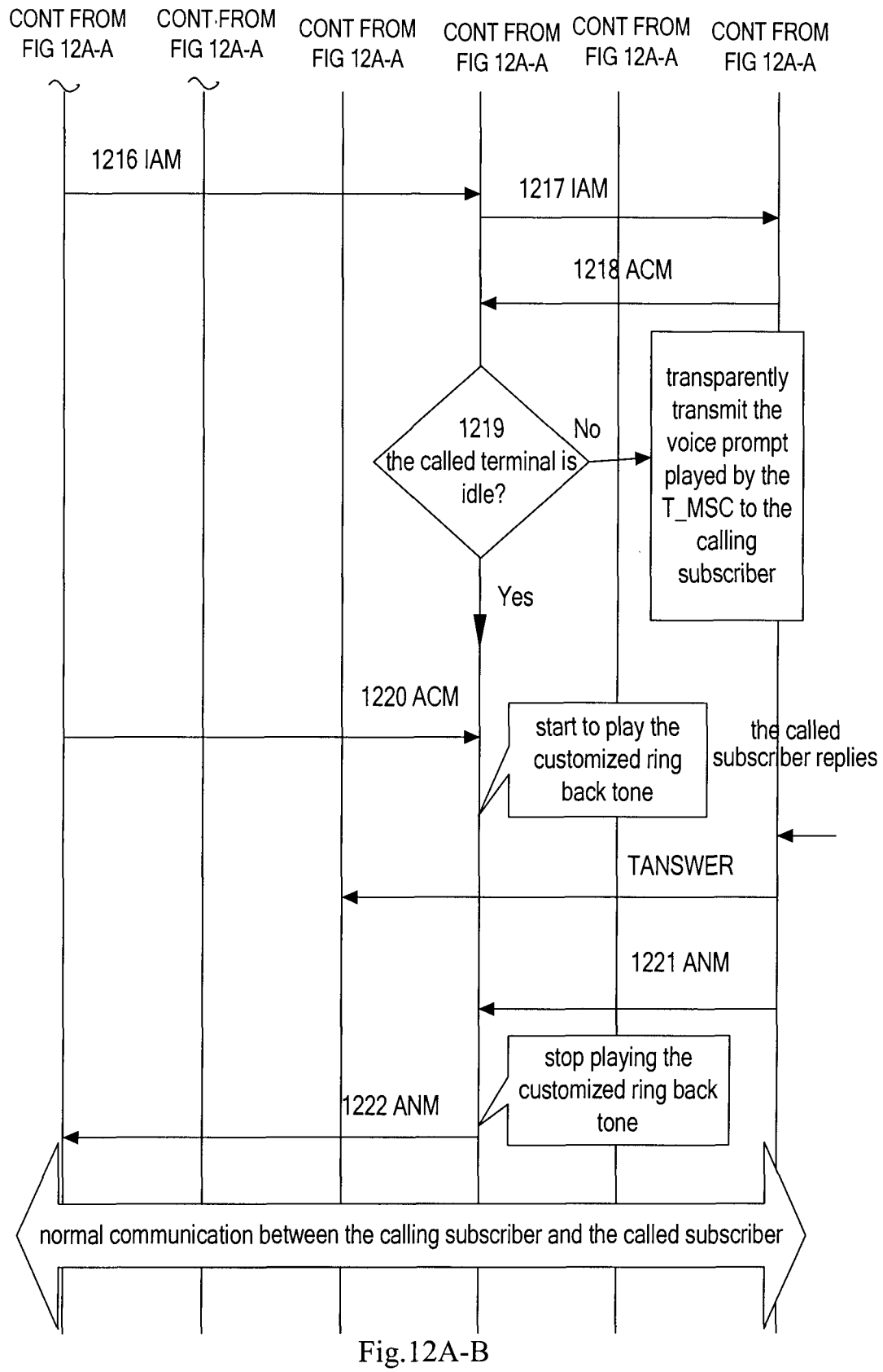
Fig.12A-B

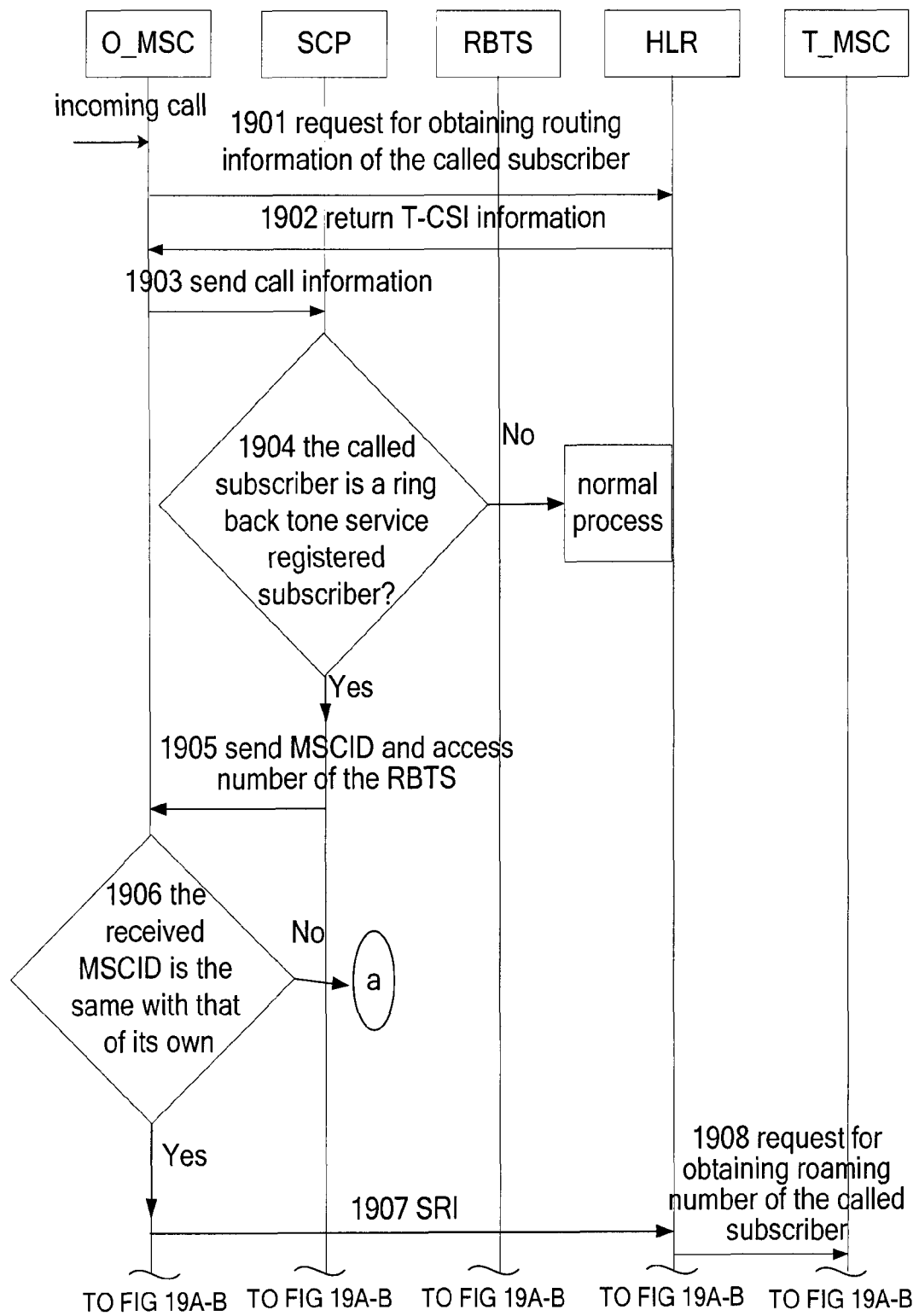
Fig.19A-A

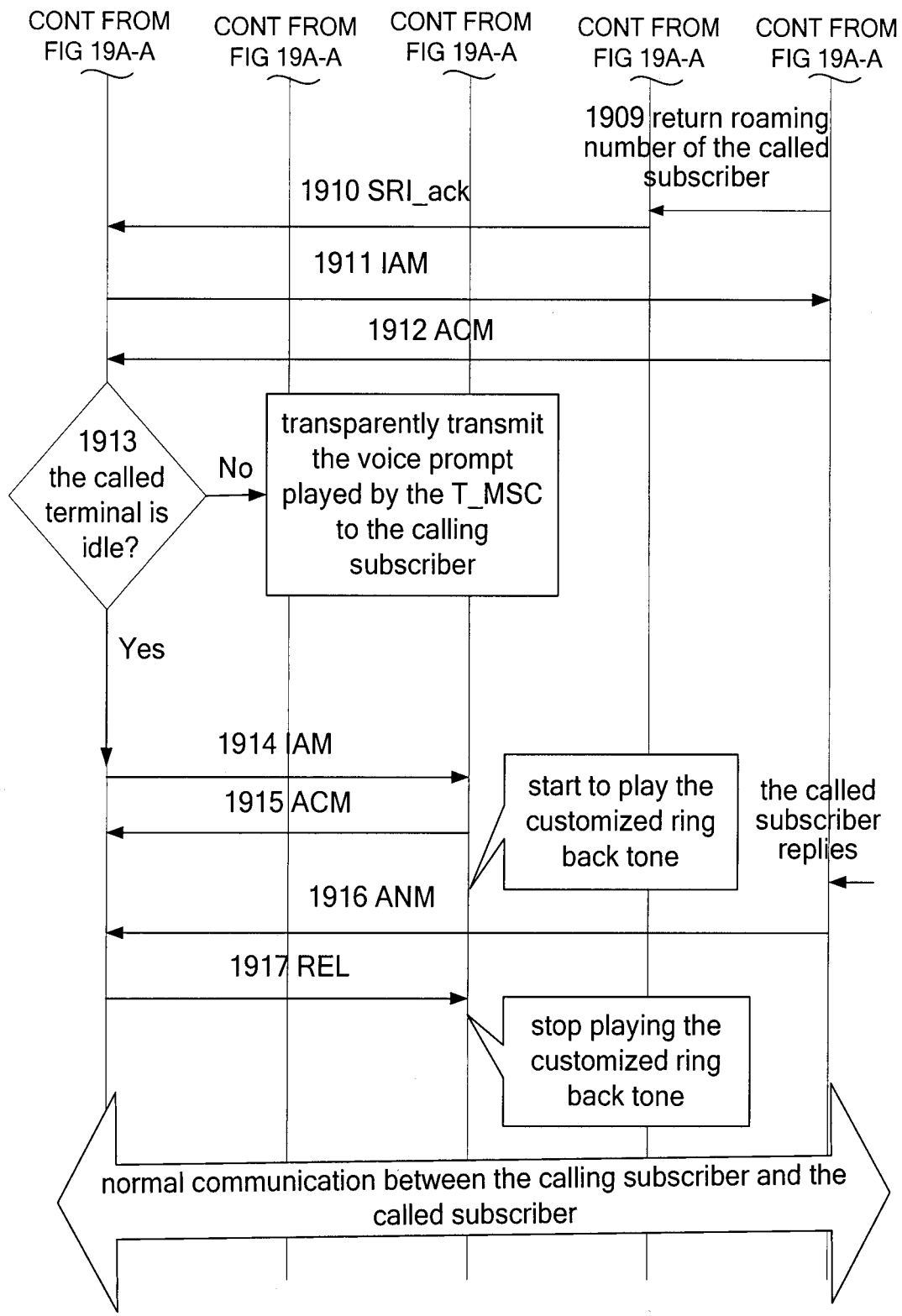
Fig.19A-B

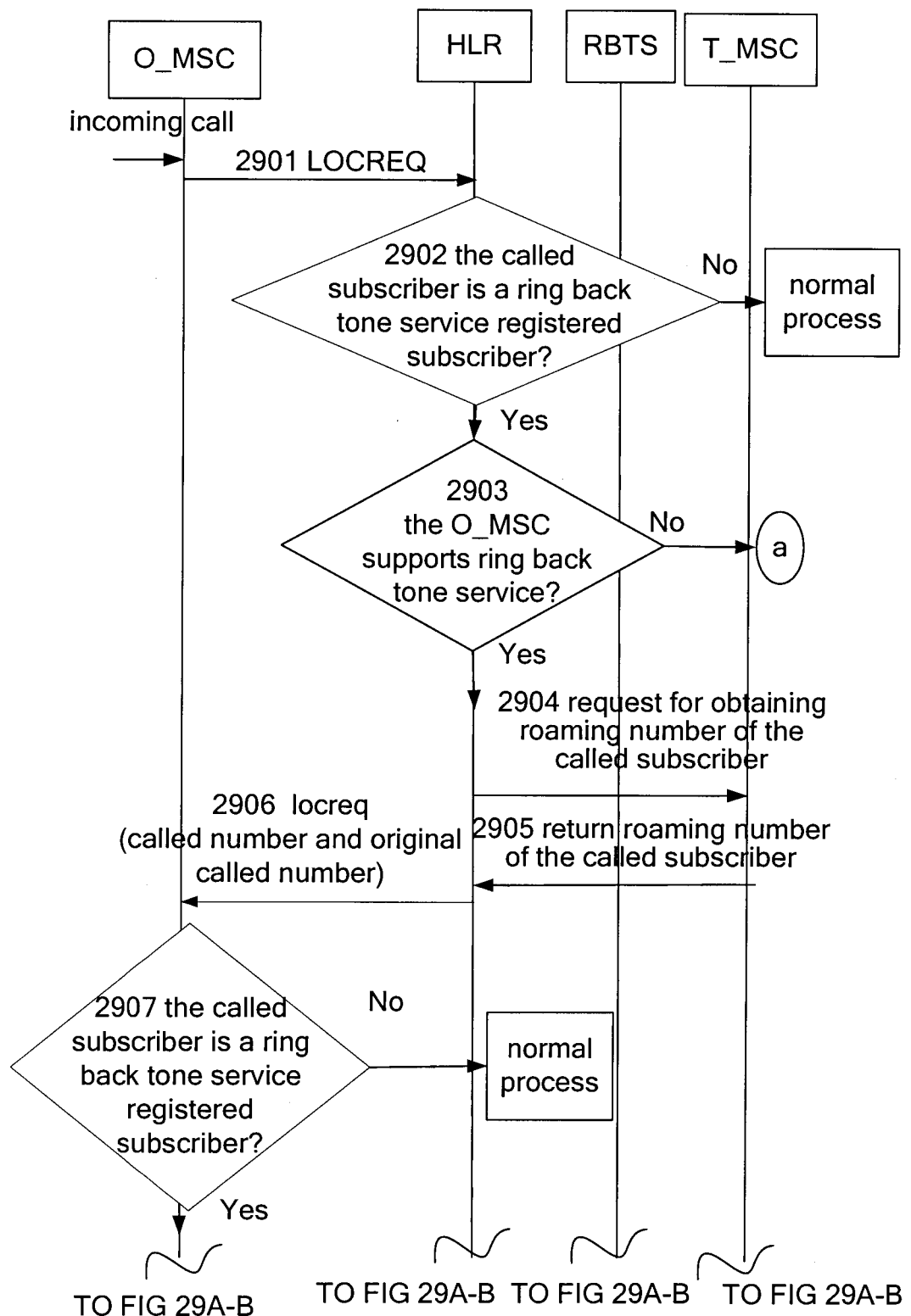
Fig.29A-A

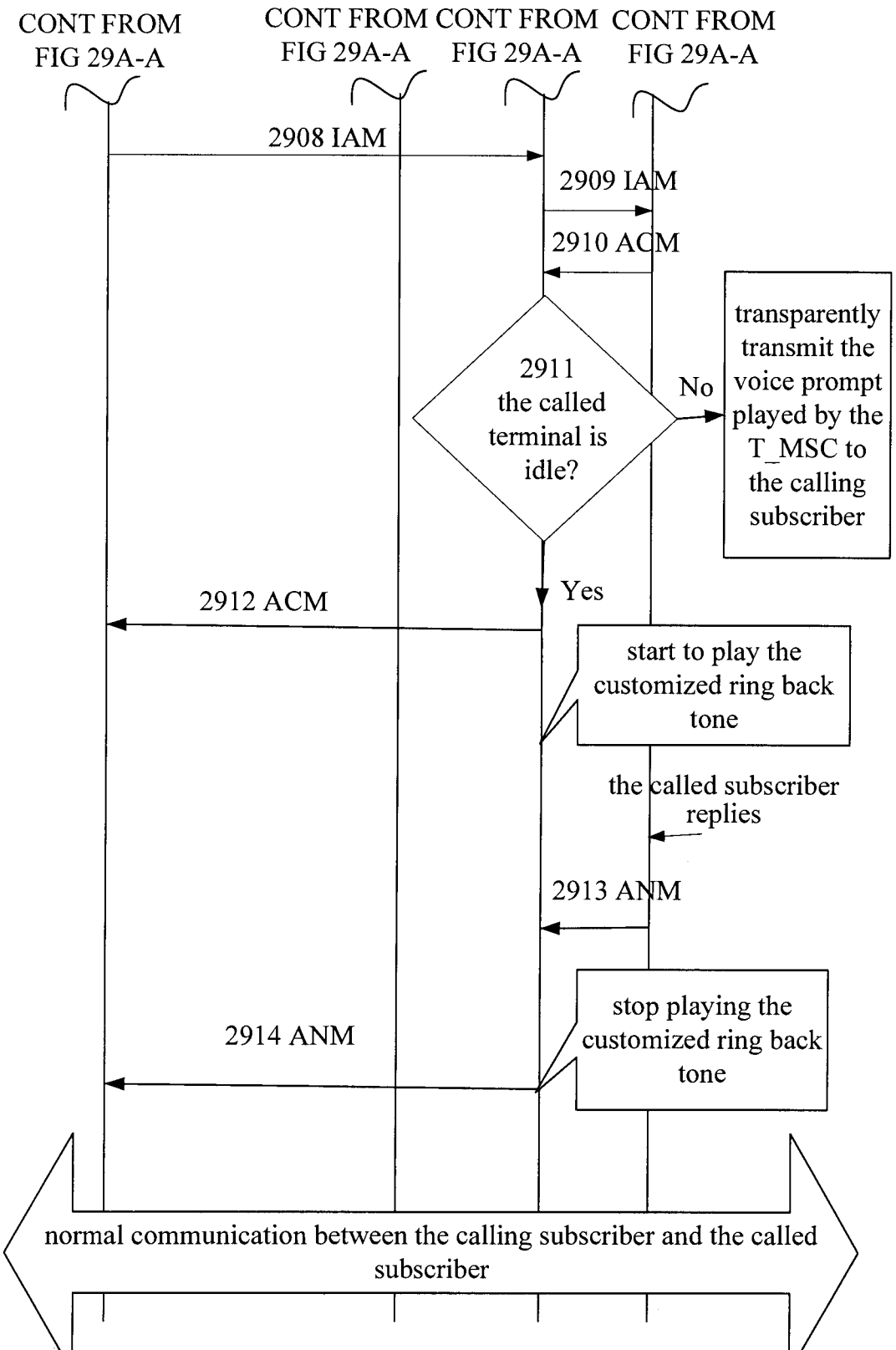
Fig.29A-B

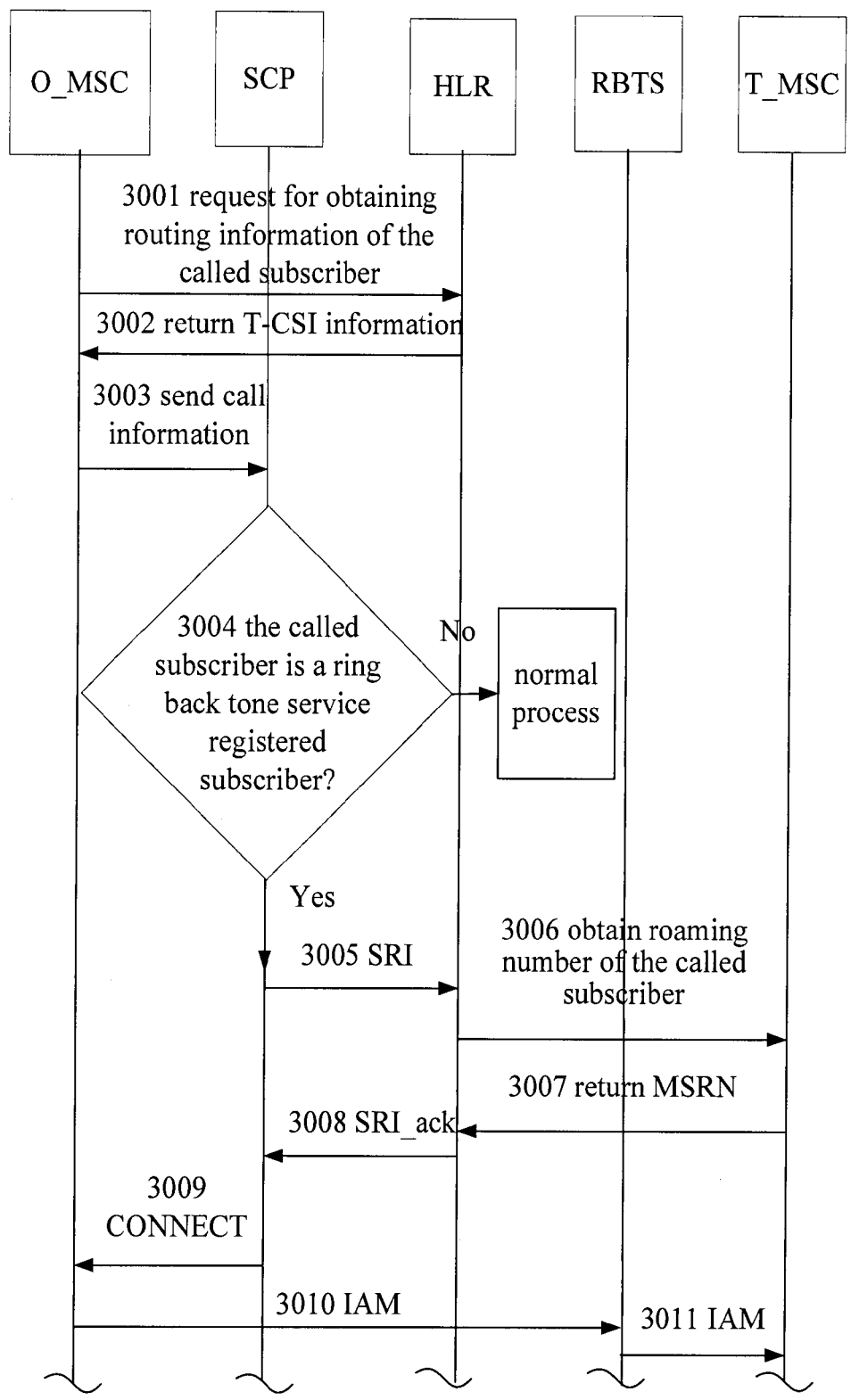
Fig.30A-A

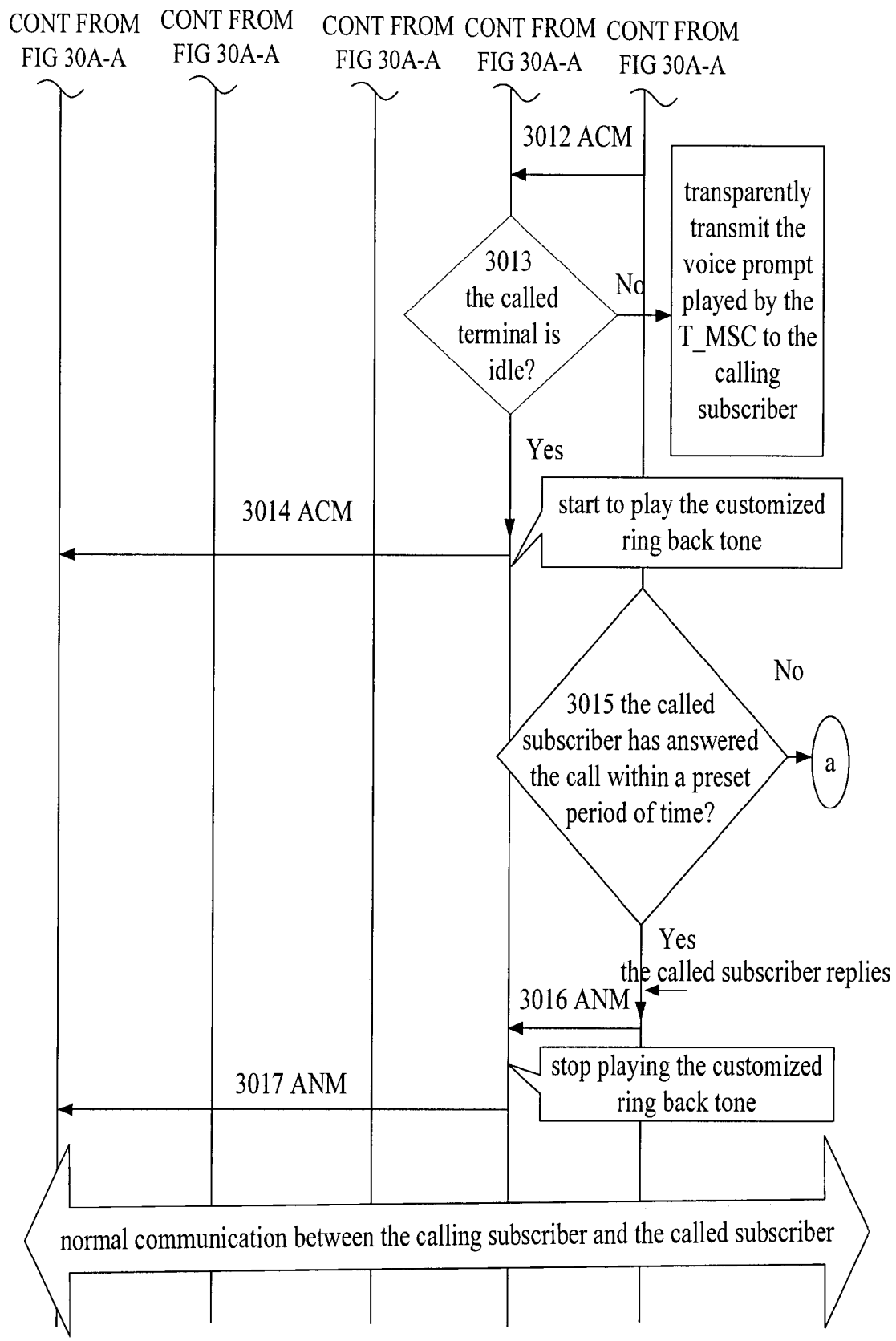
Fig.30A-B

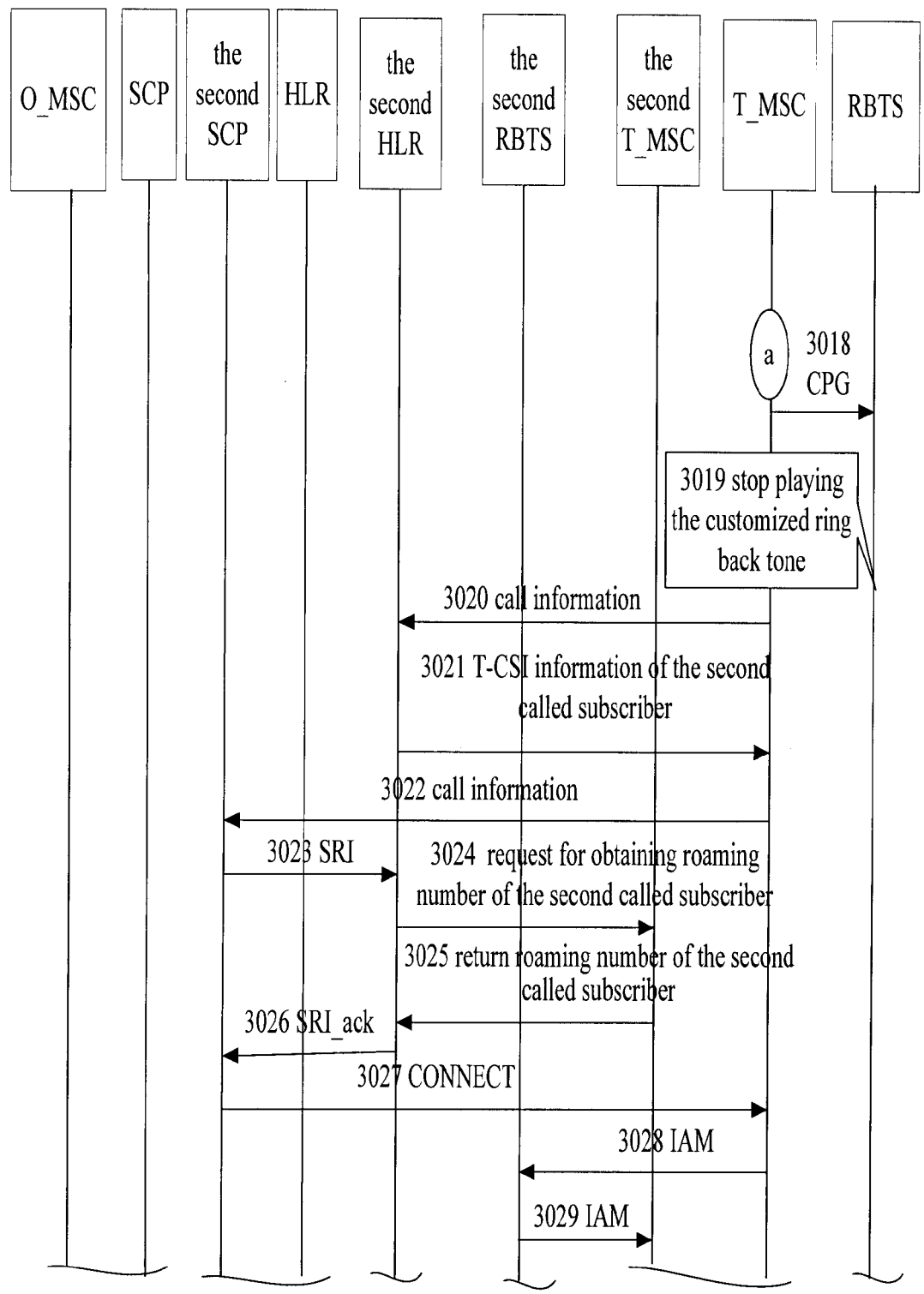
Fig.30B-A

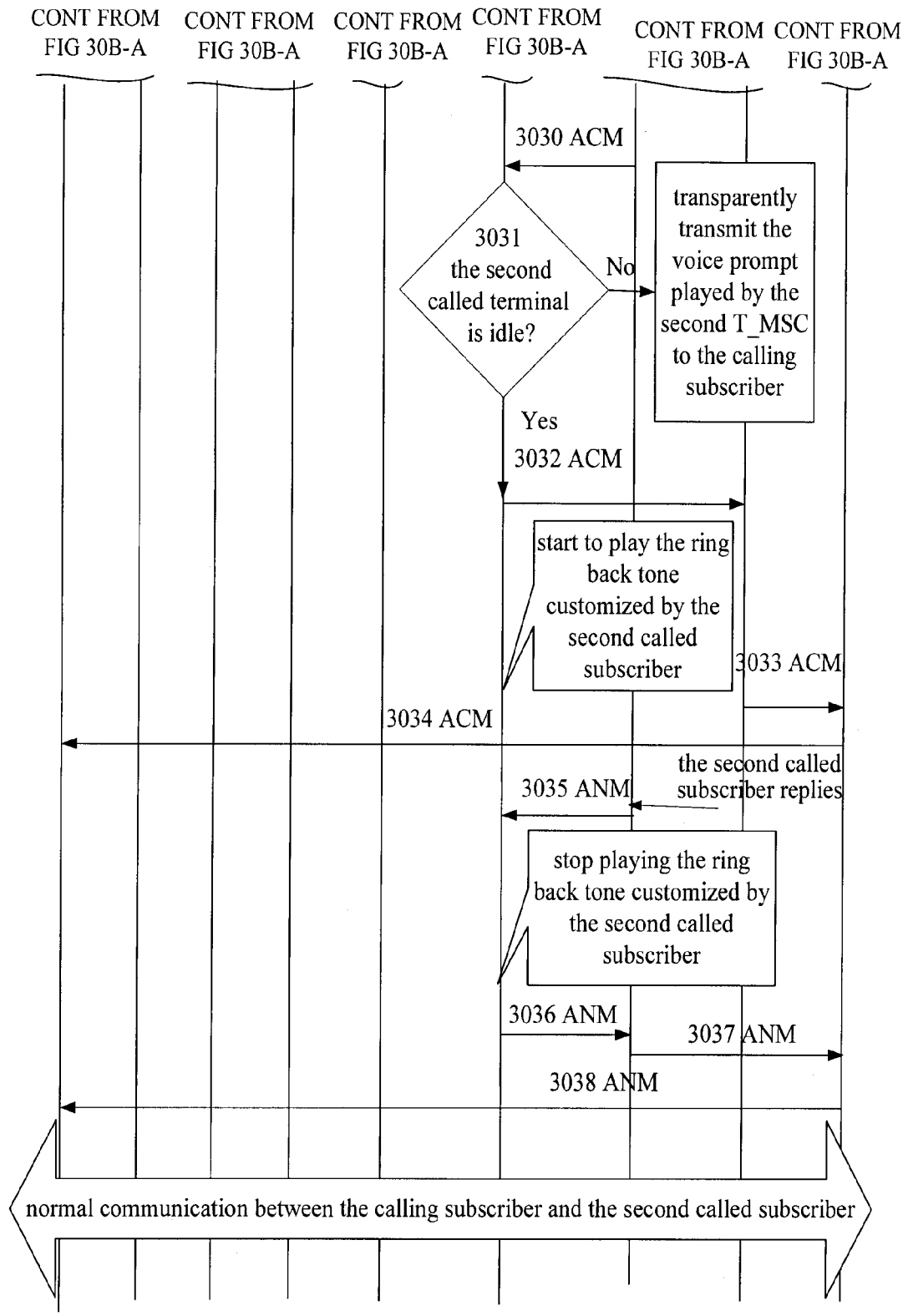
Fig.30B-B

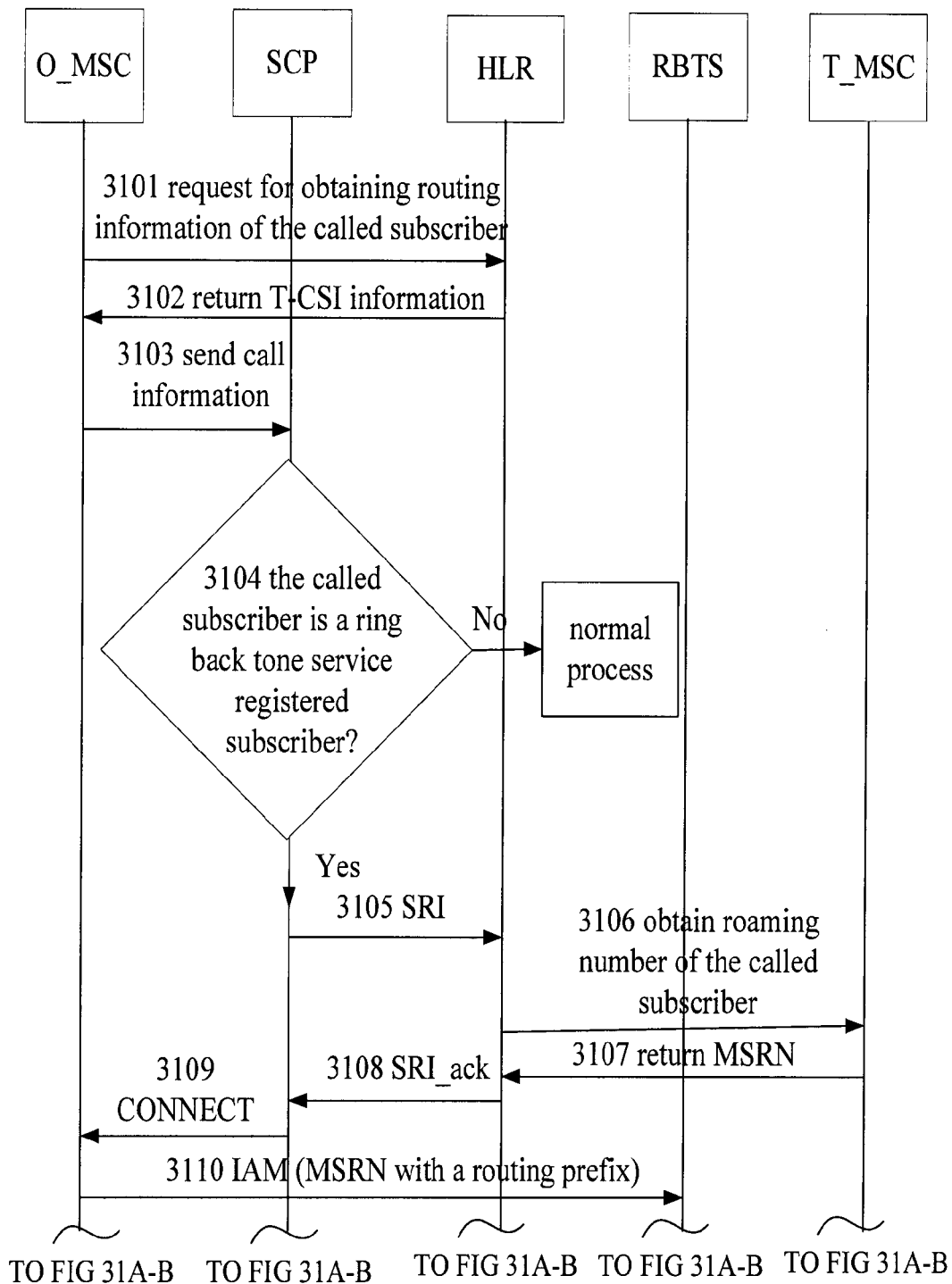
Fig.31A-A

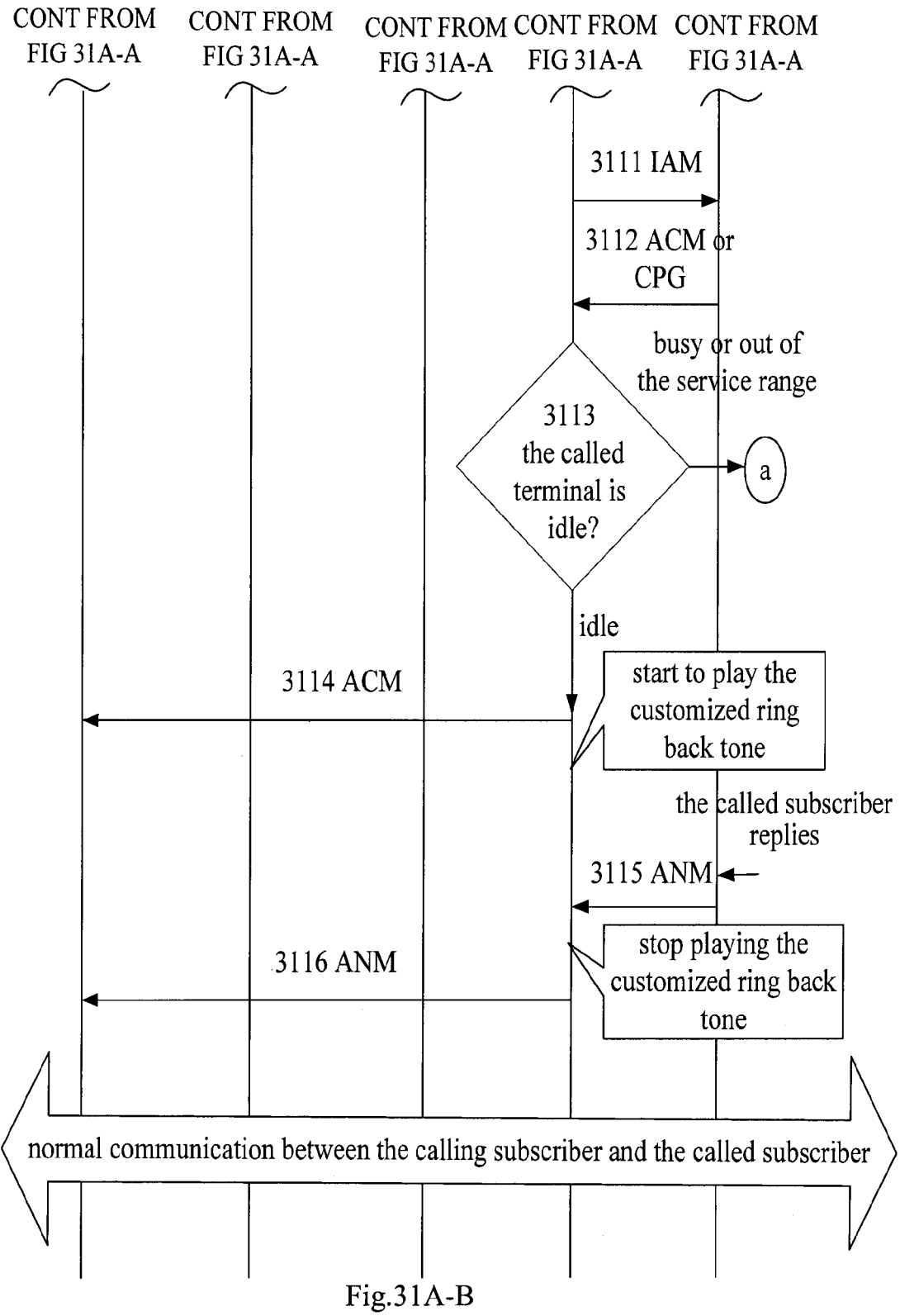
Fig.31A-B

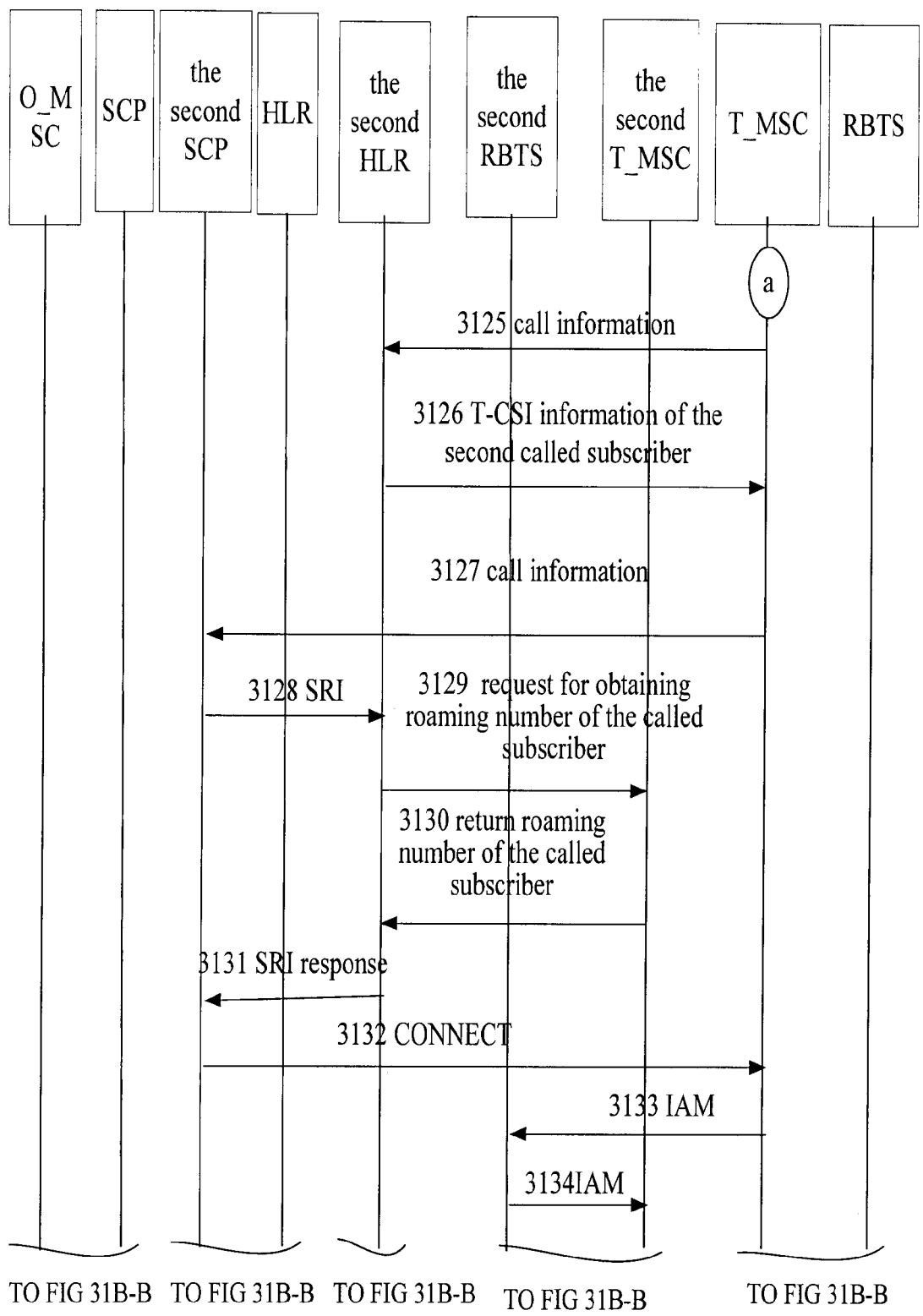
Fig.31B-A

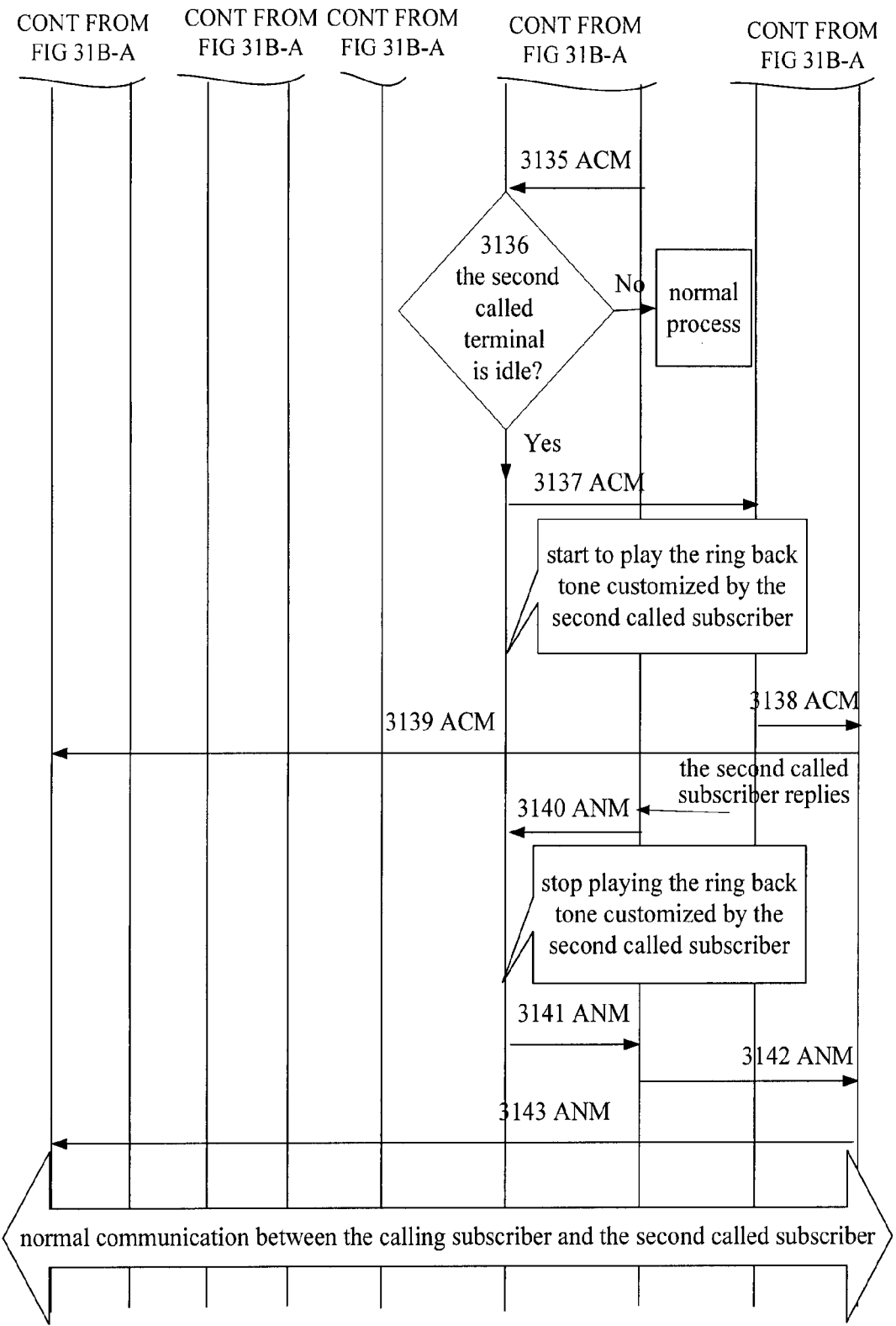
Fig.31B-B

PROVIDING RING BACK TONES IN A COMMUNICATION NETWORK

CROSS-REFERENCE TO RELATED APPLICATIONS

This application is a continuation of U.S. patent application Ser. No. 11/274,939, filed on May 17, 2004, which is a continuation of International Application No. PCT/CN2004/000499, filed on May 17, 2004, which claims priority to Chinese Patent Application CN03136117.X, filed on May 15, 2003, and CN03136994.4, filed on May 26, 2003, and CN03155239.0, filed on Aug. 23, 2003, and CN03155243.9, filed on Aug. 23, 2003, and CN03155242.0, filed on Aug. 23, 2003, and CN 200310103906.8, filed on Oct. 31, 2003, and CN 200310118878.7, filed on Dec. 4, 2003, and CN 200410039809.1, filed on Mar. 16, 2004, and CN 200410039812.3, filed on Mar. 16, 2004, and CN200410030852.1, filed on Apr. 7, 2004, all of which are hereby incorporated by reference in their entireties.

FIELD OF THE TECHNOLOGY

The present invention relates to ring providing technique, and more particularly, to a method and a system for providing subscriber-customized ring back tones in a communication network.

BACKGROUND OF THE INVENTION

In conventional communication networks, no matter a fixed communication network, a Global System of Mobile communication network (GSM) or a Code Division Multiple Access (CDMA) mobile communication network, when a calling subscriber calls a called subscriber, under the condition that the called terminal is idle and there is no reply from the called subscriber, the network system will play a traditional ring back tone, i.e. "toot . . . toot . . . ", stored in the terminating switching device to the calling subscriber.

FIG. 1 shows architecture of a conventional GSM mobile communication network. As shown in FIG. 1, a GSM mobile communication network comprises a calling terminal A corresponding to a calling subscriber, a called terminal B corresponding to a called subscriber, an Originating Mobile Switching Center (O_MSC) and a Terminating Mobile Switching Center (T_MSC), as well as a Home Location Register (HLR). Here, the O_MSC and the T_MSC refer to an originating switching device and a terminating switching device respectively.

FIG. 2 illustrates a flowchart of a method for providing ring back tones in a conventional GSM mobile communication network. As shown in FIG. 2, when the calling subscriber dials telephone number of called terminal B of the called subscriber via calling terminal A, in step 201, the O_MSC requests for roaming number of the called subscriber from the HLR to which the called terminal is attached after receiving a call request from mobile terminal A.

In steps 202 to 204, the HLR sends a message for requesting called roaming number to the T_MSC. The T_MSC distributes a roaming number for the called subscriber, i.e. MSRN, and returns the number to the HLR which returns the MSRN of the called subscriber to the O_MSC afterwards.

In step 205, the O_MSC sends an Initial Address Message (IAM) to the T_MSC. In step 206, after receiving the IAM from the O_MSC, the T_MSC pages the called subscriber, which means sending rings to mobile terminal B of the called subscriber, and then sends current state of called terminal B to the O_MSC via an Address Complete Message (ACM). Here, the state of called terminal B may be idle, busy, shutdown or out of service range.

The T_MSC determines state of called terminal B in step 207, and in step 208 plays a traditional ring back tone to calling terminal A via the O_MSC under the condition the called terminal is idle, or plays corresponding voice prompt to calling terminal A via the O_MSC if the called terminal is busy, shutdown or out of service range etc.

In step 209, after the called subscriber picking up and answering the phone, called terminal B sends an Answer Message (ANM) to the T_MSC. Then, the T_MSC sends an ANM to the O_MSC, stops playing ring back tone, and establishes a communication channel between calling terminal A and called terminal B.

Although being able to play ring back tones to calling subscribers, the prior art described above has the following shortcomings.

First, the ring back tones implemented in the prior art are solely and tedious sounds of "toot . . . toot . . . ", which can hardly satisfy the individuation requirements for ring back tones, and will even limit the development in service quality provided by communication service providers.

Secondly, in the prior art, when a calling subscriber initiates a call to a called subscriber, all the rings played for the calling subscriber are uniform and tedious sounds of "toot . . . toot . . . ", which means the prior art cannot provide different ring back tones corresponding to various called subscribers for the calling subscriber, making it difficult for a calling subscriber to distinguish different called subscribers according to the ring back tones.

Thirdly, because of making tedious sounds of "toot . . . toot . . . " as uniform and exclusive ring back tone, the subscribers are not capable of customizing their favorite music or voices as the ring back tones, which is incompatible with individuation requirements of the subscribers, and limits service functions of the communication network, making it difficult for a subscriber to enjoy plentiful and free services.

In the system and the method for providing ring back tones in prior art, all ring back tones are played by switching devices, and they are exclusively uniform and tedious for different calling and called subscribers, therefore, the prior services can neither satisfy individuation requirements of different subscribers, nor distinguish various subscribers only based on ring back tones. Anyway, the prior art can no longer satisfy needs of subscribers for higher quality of communication service, and limits the development of the whole communication services.

SUMMARY OF THE INVENTION

It is an object of the present invention to provide a method for providing ring back tones in a communication network so as to satisfy individuation requirements of subscribers through playing different rings such as music to different subscribers.

Another object of the present invention is to provide a system for providing ring back tones in a communication network.

According to the first aspect of the present invention, a method for providing ring back tones in a communication network comprises the following steps:

a. establishing a ring back tone device for storing and playing ring back tones in the communication network, and storing ring back tone service register information of subscribers in said SCP, wherein said ring back tone service register information at least includes identification information indicating whether a subscriber is a ring back tone service registered subscriber and routing information of the ring back tone device;

b. after receiving a call request, the originating switching device submitting call information to the SCP, the SCP judging whether a certain subscriber relating to the call is a ring back tone service registered subscriber according to said identification information, if so, the SCP returning the routing information of the ring back tone device to the originating switching device, and then going to step c, else going to step d; and c. establishing a connection between the originating switching device and the terminating switching device, and establishing a connection between a switching device and the ring back tone device according to the routing information of the ring back tone device, the ring back tone device playing a ring back tone pre-customized by said certain subscriber to the calling subscriber when the called terminal is idle; or d. establishing a connection between the originating switching device and the terminating switching device.

A system for providing ring back tones in a communication network according to the first aspect of the present invention comprises an originating switching device, a terminating switching device, a Service Control Point (SCP), and further comprises:

a ring back tone device, for storing subscriber-customized ring back tones and playing a ring back tone pre-customized by a subscriber to the calling subscriber via a switching device when the called terminal is idle.

In this system, the SCP stores ring back tone service register information of subscribers, and is capable of returning routing information of the ring back tone device to the originating switching device after determining a subscriber relating to the call is a ring back tone service registered subscriber.

A method for providing ring back tones in a communication network according to the second aspect of the present invention comprises:

a. establishing a ring back tone device for storing and playing ring back tones in the communication network, and establishing a Signaling Processing System (SPS) for storing ring back tone service register information of subscribers and implementing signaling interception and processing, said ring back tone service register information at least includes identification information indicating whether a subscriber is a ring back tone service registered subscriber and routing information of the ring back tone device; configuring the output signaling from the switching device to be forwarded via the SPS;

b. after receiving a call request, the originating switching device sending call information to the SPS, the SPS judging whether a certain subscriber relating to the call is a ring back tone service registered subscriber according to said identification information, if so, going to step c, else going to step d; and c. establishing a connection between the originating switching device and the terminating switching device through modifying address information of the received signaling by the SPS, and establishing a connection between a switching device and the ring back tone device, the ring back tone device playing a ring back tone pre-customized by said certain subscriber to the calling subscriber when the called terminal is idle; or d. establishing a connection between the originating switching device and the terminating switching device through transparently transmitting the received signaling by the SPS.

Here, the SPS can judge whether the called subscriber is a ring back tone service registered subscriber, in this case, the ring back tone played by the ring back tone device in step c is that pre-customized by the called subscriber. Alternatively, the SPS can judge whether the calling subscriber is a ring back tone service registered subscriber, in this case, the ring back tone played by the ring back tone device in step c is that pre-customized by the calling subscriber.

A system for providing ring back tones in a communication network according to the second aspect of the present invention comprises an originating switching device, a terminating switching device and a HLR, and further comprises:

a ring back tone device, for storing subscriber-customized ring back tones and playing a ring back tone pre-customized by a subscriber to the calling subscriber via a switching device when the called terminal is idle;

a SPS, for storing ring back tone service register information of subscribers, and implementing address modification for the received signaling so as to establish a connection between a switching device and the ring back tone device after determining that a certain subscriber relating to the call is a ring back tone service registered subscriber, or implementing transparent transmission for the received signaling so as to establish a connection between the originating switching device and the terminating switching device after determining that a certain subscriber relating to the call is not a ring back tone service registered subscriber.

A method for providing ring back tones in a communication network according to the third aspect of the present invention comprises:

a. establishing a ring back tone device for storing and playing ring back tones in the communication network, and setting an unconditional forwarding number for the ring back tone service registered subscriber as routing number of the ring back tone device in HLR;

b. the originating switching device sending a request for the roaming number of the called subscriber to HLR after receiving a call request;

c. the HLR judging whether there is an unconditional forwarding number in subscriber information of the called subscriber, if so, sending the forwarding number to the originating switching device as a called number, and then going to step d; else, sending the roaming number of the called subscriber to the originating switching device as a called number, and then going to step e; and d. the originating switching device establishing a connection to the ring back tone device according to the routing number of the ring back tone device that acts as a forwarding number, and then establishing a connection between the ring back tone device and the terminating switching device, the ring back tone device playing a ring back tone pre-customized by a subscriber to the calling subscriber when the called terminal is idle; or e. establishing a connection between the originating switching device and the terminating switching device.

A system for providing ring back tones in a communication network according to the third aspect of the present invention comprises an originating switching device, a terminating switching device and a HLR, and further comprises:

a ring back tone device, for storing subscriber-customized ring back tones and playing a ring back tone pre-customized by a subscriber to the calling subscriber via a switching device when the called terminal is idle;

In this system, an unconditional forwarding number in the subscriber information in HLR is a routing number of the ring back tone device for a ring back tone service registered subscriber.

A method for providing ring back tones in a communication network according to the fourth aspect of the present invention comprises:

a. establishing a ring back tone device for storing and playing ring back tones in the communication network, and storing ring back tone service register information of subscribers in the subscriber information in the HLR, wherein said ring back tone service register information at least includes identification information indicating whether a subscriber is a ring back tone service registered subscriber and routing information of the ring back tone device;

b. after receiving a call request, the originating switching device sending a request for roaming number of the called subscriber to the HLR, and then judging whether the called subscriber is a ring back tone service registered subscriber according to the called subscriber information corresponding to said identification information received from the HLR, if so, going to step c, else going to step d; and c. establishing a connection between the originating switching device and the terminating switching device, and establishing a connection between a switching device and the ring back tone device according to the routing information of the ring back tone device in the subscriber information of the called subscriber, the ring back tone device playing a ring back tone pre-customized by the called subscriber to the calling subscriber when the called terminal is idle; or d. establishing a connection between the originating switching device and the terminating switching device.

A method for providing ring back tones in a communication network according to the fifth aspect of the present invention comprises:

a. establishing a ring back tone device for storing and playing ring back tones in the communication network, and storing ring back tone service register information of subscribers in the subscriber information in HLR, wherein said ring back tone service register information at least includes identification information indicating whether a subscriber is a ring back tone service registered subscriber and routing information of the ring back tone device;

b. the HLR sending the subscriber information including ring back tone service register information of subscribers to the switching devices where said subscriber information is saved;

c. after receiving a call request, the originating switching device judging whether the calling subscriber is a ring back tone service registered subscriber according to the identification information in the subscriber information saved in itself, if so, going to step d, else going to step e; and d. establishing a connection between the originating switching device and the terminating switching device, and establishing a connection between a switching device and the ring back tone device according to the routing information of the ring back tone device in the subscriber information, the ring back tone device playing a ring back tone pre-customized by the calling subscriber to the calling subscriber when the called terminal is idle; or e. establishing a connection between the originating switching device and the terminating switching device.

Here, the connection between the originating switching device and the terminating switching device can be relayed via the ring back tone device. Alternatively, the originating switching device is connected to the terminating switching device and the ring back tone device simultaneously.

A system for providing ring back tones in a communication network according to the fourth and fifth aspects of the present invention comprises an originating switching device, a terminating switching device and a HLR, and further comprises:

a ring back tone device, for storing subscriber-customized ring back tones and playing a ring back tone pre-customized by a subscriber to the calling subscriber via a switching device when the called terminal is idle;

wherein the HLR saves ring back tone service register information of subscribers, and is capable of sending said ring back tone service register information of subscribers to a switching device while sending roaming number of the called subscriber;

wherein the originating switching device and the terminating switching device are capable of judging whether a subscriber is a ring back tone service registered subscriber according to the ring back tone service register information.

The HLR is further used to send ring back tone service register information of subscribers to a switching device, and the originating switching device and the terminating switching device can save said ring back tone service register information received from the HLR.

According to the first aspect of the present invention in which ring back tone service is triggered with SCP, the SCP stores information relating to ring back tone service by means of which the SCP can notify the originating switching device to route the call to the ring back tone device. The ring back tone device plays the pre-customized ring back tone to the calling subscriber according to state of the called terminal, thereby, the customized individuation ring back tone can provided to the calling subscriber, and individuation requirements for ring back tones can be further satisfied. Adopting an intelligent network to implement ring back tone service, without any need for reconstruction for the switching center, the mode is easy to implement and rapidly popularize.

According to the second aspect of the present invention in which the ring back tone service is triggered through signaling interception, the information relating to ring back tone service is stored in the SPS. The SPS intercepts the signaling sent from the originating switching device, and notifies the originating switching device to route the call to the ring back tone device which plays the pre-customized ring back tone to the calling subscriber according to state of the called terminal, thereby, the customized individuation ring back tone can be provided for the calling subscriber, and individuation requirements for ring back tone service can be further satisfied. The method can implement ring back tone service through simply adding a SPS before each HLR, without any need for reconstruction to the switch. Moreover, because intelligent network is not be adopted, the method has no direct influence on implementation of intelligent service within intelligent network, therefore, the method has advantages of being widely applicable, easy to rapidly popularize, and bitterly compatible with different intelligent services etc.

According to the third aspect of the present invention in which the ring back tone service is triggered through call forwarding, all that is needed to do is to configure routing number of the ring back tone device as unconditional forwarding number. The originating switching device routes the call to the ring back tone device according to the forwarding number, and the ring back tone device plays the pre-customized ring back tone to the calling subscriber according to state of the called terminal so as to provide customized individuation ring back tone to the calling subscriber, which can satisfy the individuation requirements for ring back tone of subscribers. The method can be implemented with prior communication network, without any need for reconstruction to the HLR and switch and join of intelligent network, therefore, the method has advantages of being widely applicable, easy to implement and rapidly popularize, etc.

According to the fourth and fifth aspects of the present invention, the switching equipment judges whether a subscriber is a ring back tone service registered subscriber according to the contract information obtained from the HLR, if so, the call will be routed to the ring back tone device which plays the pre-customized ring back tone to the calling subscriber according to state of the called terminal. This method can provide customized coloring ring back tone service to the calling subscriber, which satisfies the coloring requirements for ring back tone service from subscribers.

Besides, because a subscriber can customize ring back tone in the ring back tone device, he can choose different ring back tones as his personal ring back tone, which satisfies coloring ring requirements of the subscriber on one hand, and enables the calling subscriber to distinguish different subscribers according to different ring back tones and further improves quality of service on the other hand.

The ring back tone service registration and ring back tone customization can be implemented by means of service contract at business lobby, dialing special numbers or disposing through Internet in the present invention. After registration, the subscriber can modify flexibly his register information and customized ring back tone, in this way, the present invention can provide more convenience and further improve quality of service.

The schemes of the present invention does not only include the one that is used to provide ring back tone service customized by the called subscriber for the calling subscriber, but also the one that is used to provide ring back tone service customized by the calling subscriber for the calling subscriber, making the service provided by the communication service provider more perfect.

In addition, the embodiments of the present invention can also provide other intelligent services to the subscribers at the time of providing ring back tone service, so, the present invention has no negative influence on the quality of prior services while providing the ring back tone service to the subscribers.

The embodiments of the present invention provide individuation ring back tone service for the ring back tone registered subscribers through flexible service styles. The embodiments of the invention can provide more convenience to the subscribers and further improve quality of service provided by the communication network service providers.

BRIEF DESCRIPTION OF THE DRAWINGS

FIG. 12A and FIG. 12B are signaling flowcharts according to the seventh embodiment of the present invention.

FIG. 19A and FIG. 19B are signaling flowcharts according to the fourteenth embodiment of the present invention.

FIG. 29A and FIG. 29B are signaling flowcharts according to the twentieth embodiment of the present invention.

FIG. 30A and FIG. 30B are signaling flowcharts according to the twenty-first embodiment of the present invention.

FIG. 31A and FIG. 31B are signaling flowcharts according to the twenty-second embodiment of the present invention.

DETAILED DESCRIPTION OF THE INVENTION

The present invention will be described in more detail hereinafter with reference to the accompanying drawings and embodiments.

In the present invention, a ring back tone device that is used for storing and playing subscriber-customized ring back tones is added in a conventional communication network, a call is connected to the ring back tone device by means of intelligent network triggering, signaling interception triggering, call forwarding triggering or switching device triggering etc., and then a ring back tone is played to the calling subscriber by the ring back tone device. In this way, the invention enables the calling subscriber enjoying rich and colorful ring back tones. The system and method will be described in more detail hereinafter according to different triggering modes.

Intelligent Network Triggering

Figure 3:
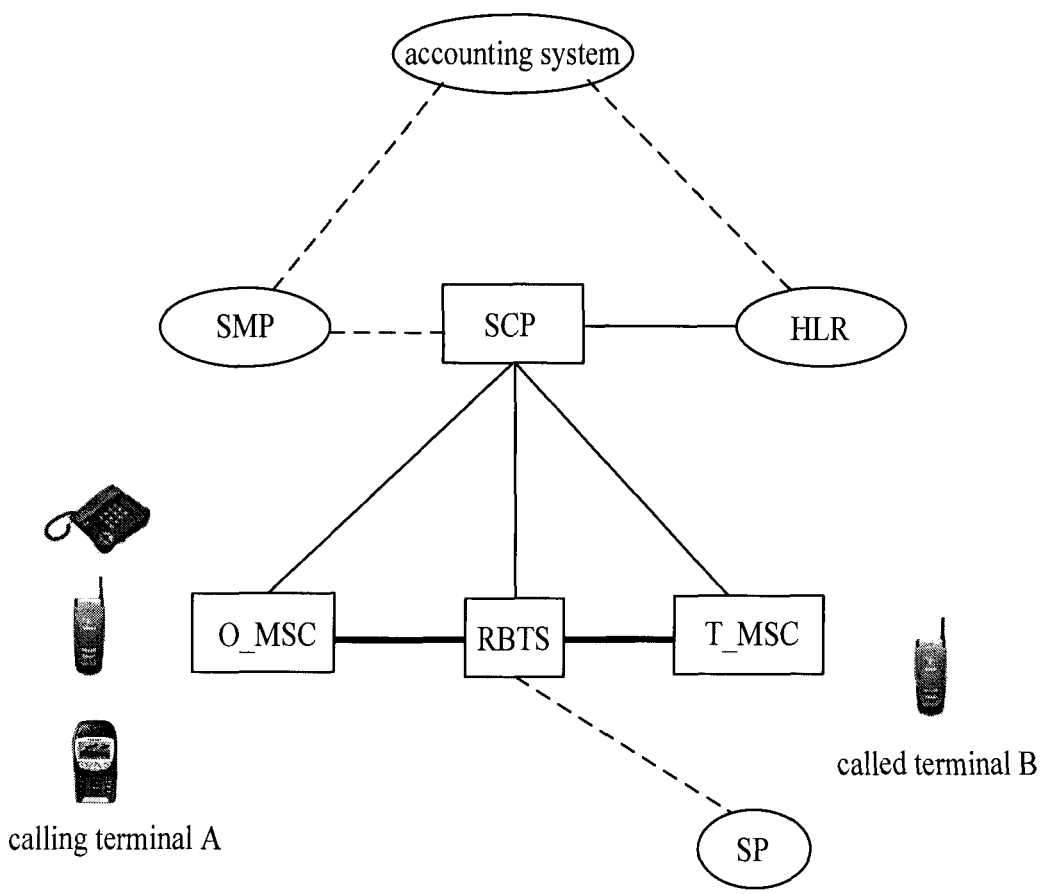
FIG. 3 illustrates a system structure for providing ring back tones via an intelligent network in accordance with the present invention.

The first embodiment of the present invention employs intelligent network triggering mode to provide rich and colorful ring back tones to the calling subscriber. FIG. 3 illustrates a system structure of this embodiment in which GSM mobile communication network is taken as example.

As shown in FIG. 3, a system for providing ring back tones comprises not only an O_MSC, a T_MSC, a HLR and a SCP, but also a Ring Back Tone Server (RBTS) that is used for storing ring back tones and providing the same.

The MSCs in this system are mainly used to implement functions of service switching and call controlling. Among the MSCs, the O_MSC is a MSC or a Gateway Mobile Switching Center (GMSC) to which the calling terminal is attached; the T_MSC is the MSC that the called terminal visits, and mainly stores current information of the called subscriber, and accomplishes call connection to the called subscriber during call procedure.

The HLR mainly stores basic information of mobile terminals, such as contract information of intelligent network subscribers.

As a service control point in an intelligent network, the SCP is used to control intelligent services. In this invention, the database of the SCP stores ring back tone service register information of subscribers, which at least includes identification information indicating whether a subscriber is a ring back tone service registered subscriber and routing information of the ring back tone device.

In addition, the system can further comprise a Service Provider (SP), which can provide various ring back tones and upload the tones to the RBTS through Internet or the like. In this way, the RBTS can play different ring back tones for subscribers.

The system can also comprise an accounting system that is used for charging the call.

In FIG. 3, the bold real lines refer to relay lines used for transferring voice and signaling, the thin real lines refer to signaling links used for transferring signaling, while the dash lines represent data links that are used for transferring data. The meaning of the lines in this figure is the same as that in other figures illustrating system architectures, so description for the meaning of lines will be omitted hereinafter.

In the system structure mentioned above, terminals A and B are coupled to the O_MSC and the T_MSC respectively, while voice channel between terminals A and B is relayed via the RBTS, which means the RBTS acts as an intermediate device to connect calls between the O_MSC and the T_MSC. Both the O_MSC and the T_MSC are coupled to the SCP simultaneously, while the SCP is coupled to the HLR. In this architecture, the RBTS not only plays ring back tones to the calling subscriber via the O_MSC, but also relays voice channels between the calling subscriber and the called subscriber.

Figure 4:
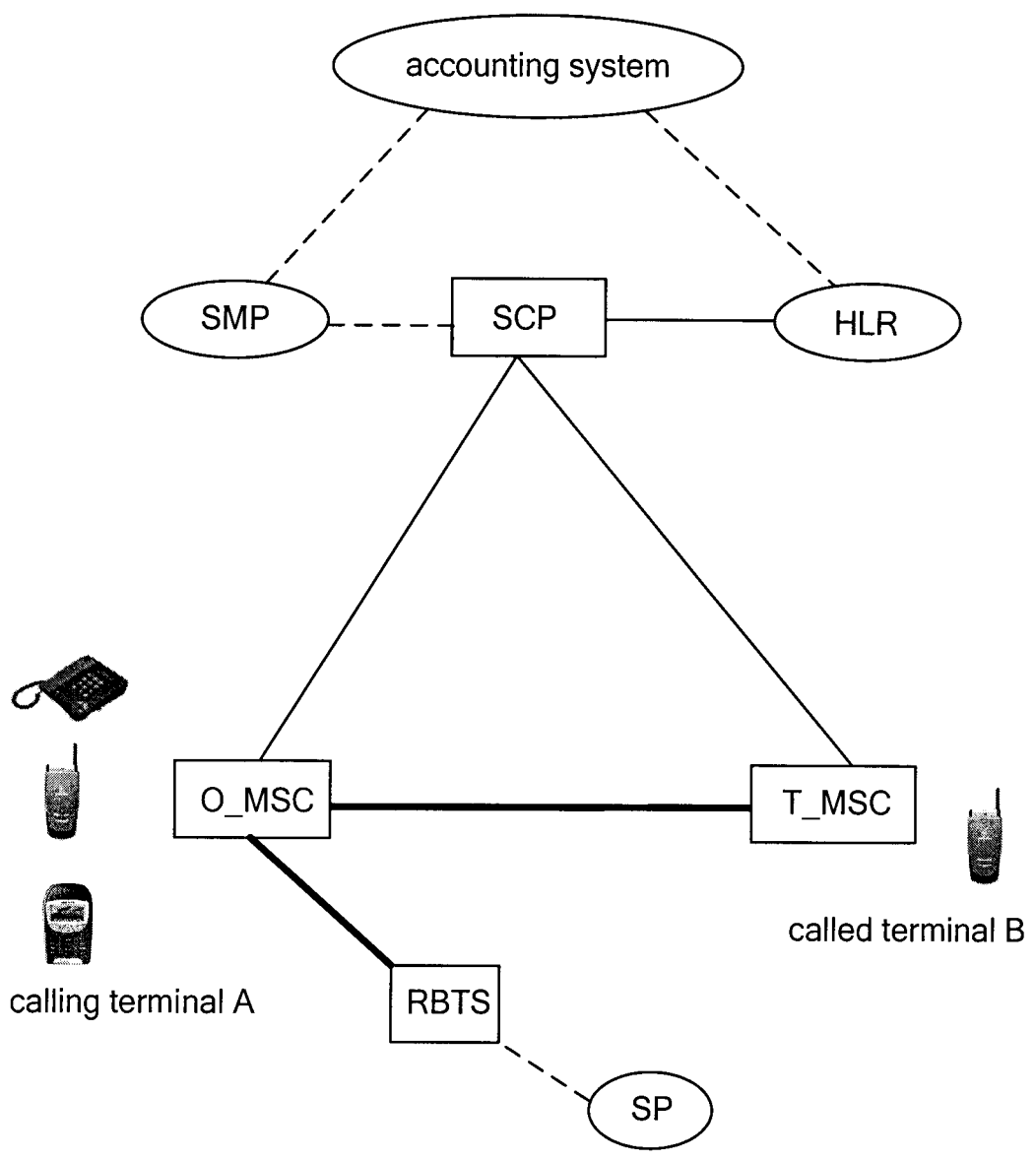
FIG. 4 illustrates another system structure for providing ring back tones via an intelligent network in accordance with the present invention.

Of course, the present invention can also employs the system structure shown in FIG. 4. The difference compared with the structure in FIG. 3 is that, the voice channel is directly established between the O_MSC and the T_MSC without relay of RBTS. In addition, there is an individual voice channel between the O_MSC and the RBTS, and the RBTS plays ring back tones to the calling subscriber via this individual voice channel, while communications between the calling subscriber and the called subscriber are accomplished through the voice channel between the O_MSC and the T_MSC.

Figure 5A:
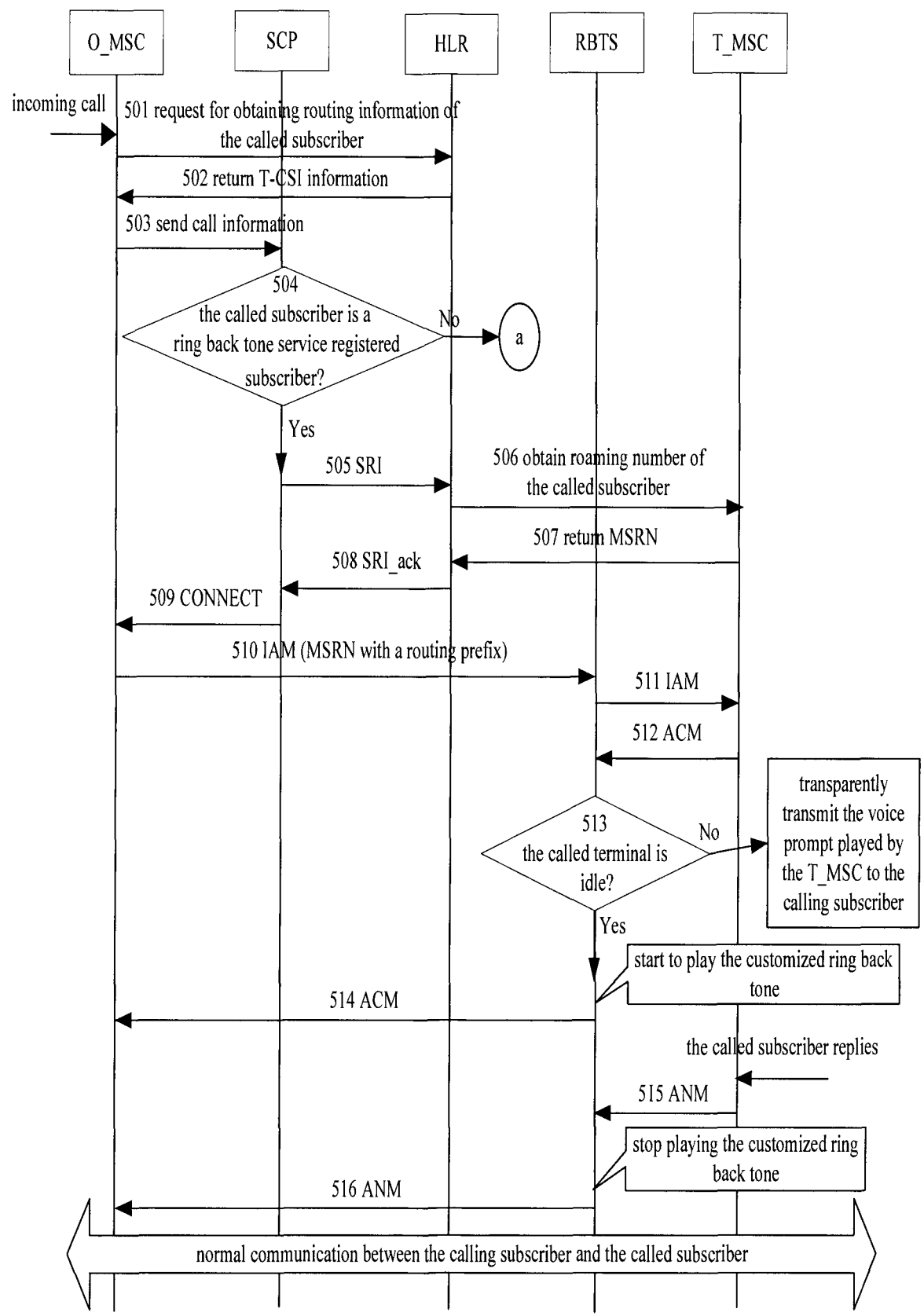
FIG. 5A and FIG. 5B are signaling flowcharts according to the first embodiment of the present invention.
Figure 5B:
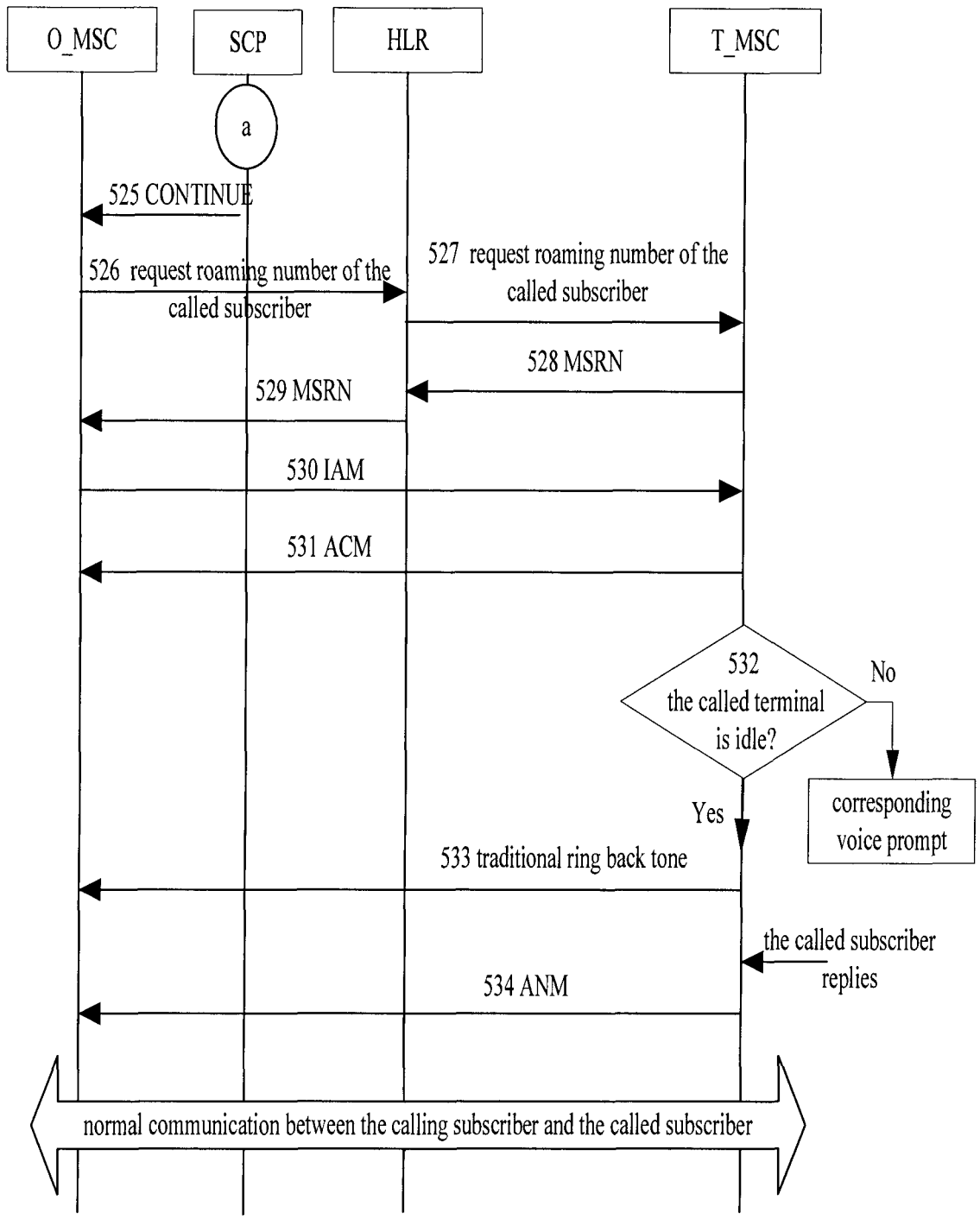

In the method according to the first embodiment, the SCP in the intelligent network judges whether the called subscriber is a ring back tone service registered subscriber, if so, ring back tone service routine shown in FIG. 5A and FIG. 5B is then executed.

In the first embodiment, the system architecture shown in FIG. 3 is adopted.

In step 501, when a calling subscriber initiates a call to a called terminal B via a calling terminal A, after receiving the call request from calling terminal A, the O_MSC sends the HLR to which called terminal B is attached a request for obtaining routing information of the called subscriber which includes information on the called number etc., wherein the called number is MSISDN of the called subscriber.

In step 502, the HLR determines the called subscriber is an intelligent network subscriber based on the called number, and sends contract information of the called subscriber to the O_MSC. Here, because the intelligent network triggering is adopted in the embodiment, the called subscriber is registered as an intelligent network subscriber. In this way, contract information of the called subscriber is stored as T-CSI information.

In step 503, after receiving T-CSI information of the called subscriber, the O_MSC determines that the called subscriber is an intelligent network subscriber, and submits the SCP call information which at least includes a calling number and a called number. From above, it is clear that the three steps mentioned above are the same with those in the prior process of triggering intelligent services.

In step 504, the SCP judges whether the called subscriber is a ring back tone service registered subscriber according to the ring back tone service register information of the called subscriber saved by itself. If so, step 505 and following steps shown in FIG. 5A will be executed. Else, step 525 and following steps shown in FIG. 5B will be executed, simply speaking, connections between the O_MSC and the T_MSC will be established.

In steps 505 to 508, the SCP transmits a Send Routing Information (SRI) request to the HLR to which called terminal B is attached. After receiving the request, the HLR sends a request for obtaining roaming number of the called subscriber to the T_MSC. The T_MSC assigns a MSRN for the called subscriber and sends the MSRN to the HLR. The HLR transmits the MSRN assigned by the T_MSC to the SCP through a SRI response.

In step 509, the SCP sends the called number and the original called number to the O_MSC via a connecting operation (CONNECT) command. Here, the called number is MSRN with a routing prefix which is an address of the RBTS, while the original called number is MSISDN.

In step 510, after receiving the CONNECT command from the SCP, the O_MSC routes the call to the RBTS based on the routing prefix in the command, and at the same time sends an Initial Address Message (JAM) to the RBTS in forwarding style. Here, the IAM includes a calling number, a called number and an original called number, where the called number is MSRN with a routing prefix while the original called number is MSISDN.

In step 511, after receiving the IAM sent from the O_MSC, the RBTS removes the routing prefix before the MSRN, and extracts the original called number, and sends the calling number and the MSRN of the called subscriber to the T_MSC through an IAM.

In step 512, T_MSC pages the called subscriber, and sends state information of the called terminal to the RBTS through an Address Complete Message (ACM).

In step 513, the RBTS judges whether the called terminal is idle based on the ACM. If so, in step 514, the RBTS sends an ACM to the O_MSC, and searches the ring back tone customized by the called subscriber based on the MSISDN number of the called subscriber, and then plays the ring back tone customized by the called subscriber to the calling subscriber through the O_MSC, meanwhile screens the traditional ring back tone played by the T_MSC. After the processing, the following steps will be executed. If the called terminal is not idle, for example, busy, shutdown or out of service range, then the RBTS will transparently transmit the voice prompt played by the T_MSC that represents busyness, shutdown or out of service range to the calling terminal via the O_MSC rather than play the ring back tone to the calling subscriber.

In step 515, when the called subscriber picks up and answers the phone, the T_MSC sends an Answer Message (ANM) to the RBTS. After receiving the ANM, in step 516, the RBTS sends the ANM to the O_MSC and stops playing the ring back tone to the calling subscriber at the same time, and establishes a voice channel between the O_MSC and the T_MSC through its relay so that the calling subscriber and the called subscriber can communicate to each other.

In step 525 shown in FIG. 5B, the SCP sends a CONTINUE signaling with no parameter to the O_MSC.

In step 526, after receiving the signaling, the O_MSC handles the call in normal ways, that is, the O_MSC sends a request for obtaining roaming number of the called subscriber to the HLR, with parameters for restraining T_CSI information in the request.

Operations in steps 527 to 534 are the same with those in steps 202 to 209 in the prior art, so no details will be elaborated further hereinafter.

Of course, in order to avoid playing ring back tone to the called subscriber for a long duration, it is reasonable to judge whether the called subscriber picks up and answers the phone within a preset period of time before step 515. If it is true, step 515 will be executed; else a busy tone or a voice prompt representing no reply from the called subscriber will be played to the calling subscriber.

After the voice channel between the calling subscriber and the called subscriber has been established, if any of the two parties rings off, the voice channel will be disconnected. This procedure is well known to one skilled in the art, and no details will be described hereinafter.

It can be seen from the first embodiment that the ring back tone customized by the subscriber can be played to the calling subscriber through providing a RBTS in the communication network.

Figure 6:
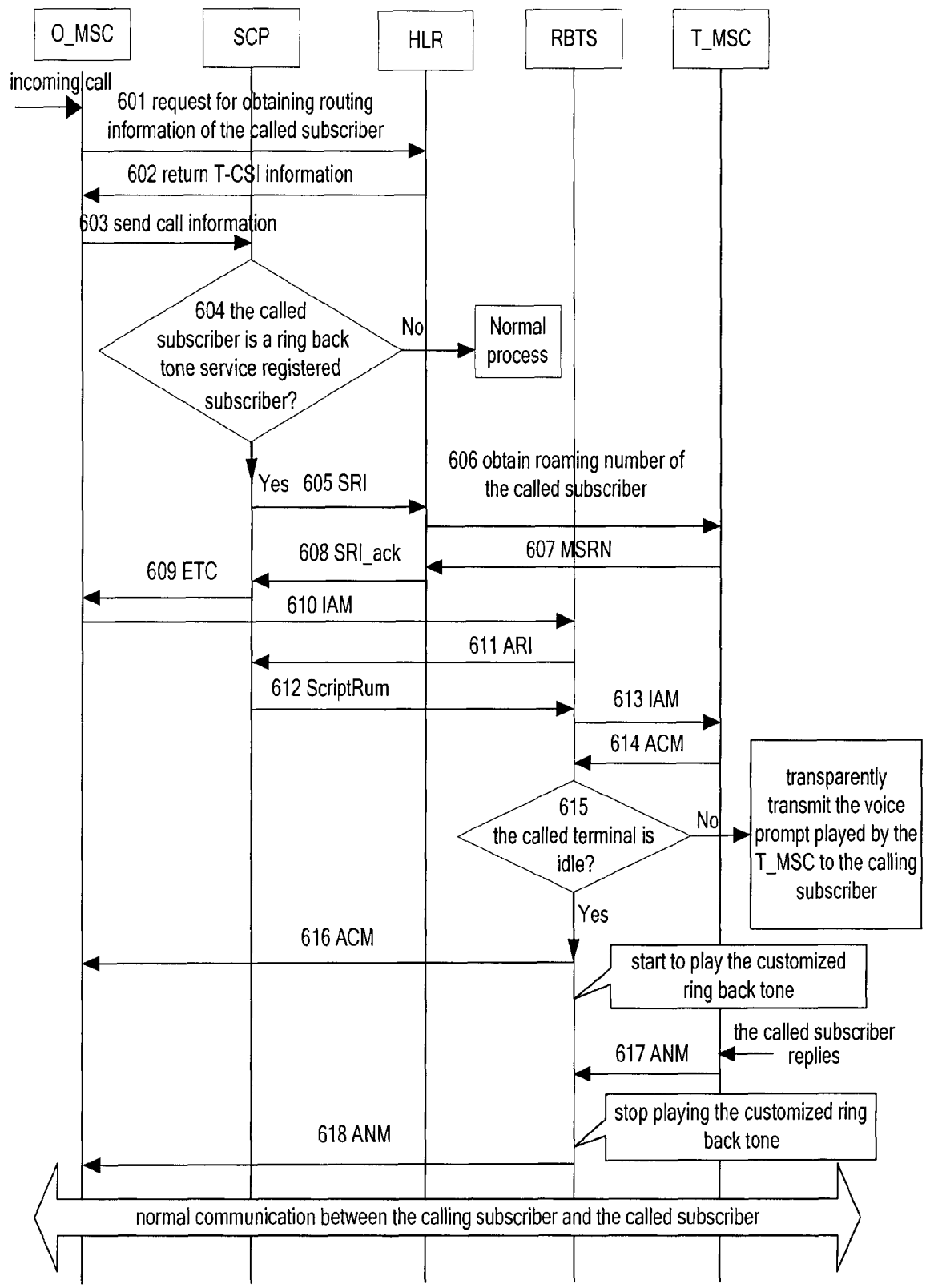
FIG. 6 is a signaling flowchart according to the second embodiment of the present invention.

In the first embodiment, the SCP sends the original called number and the roaming number of the called subscriber with a routing prefix to the O_MSC, which routes the call to the RBTS based on the routing prefix, and sends the calling number, the original called number and the roaming number of the called subscriber with a routing prefix to the RBTS by means of sending an JAM. In practice, the SCP can also send the calling number, the original called number and the roaming number of the called subscriber to the RBTS directly. So, the second embodiment is provided in the invention, and its specific implementation procedure is shown in FIG. 6. Steps 601 to 608 are the same with steps 501 to 508 in the first embodiment mentioned above, no details thereof will be described hereinafter.

In step 609, the SCP sends an Establish Temporary Connection (ETC) request to the O_MSC, with the routing number of the RBTS included in the request.

In step 610, after receiving the ETC request, the O_MSC routes the voice channel to the RBTS, and sends an IAM to the RBTS simultaneously.

In step 611, the RBTS sends an Assisted Request Instruction (ARI) to the SCP.

In step 612, the SCP sends a script run instruction ScriptRun to the RBTS to instruct the RBTS to run scripts of the corresponding Voice eXtensible Markup Language (VXML), and sends the calling number, the original called number and the roaming number of the called subscriber to the RBTS simultaneously.

In step 613, the RBTS runs VXML scripts, and sends an IAM to the T_MSC under construction of the VXML scripts. The IAM includes the calling number and the roaming number of the called subscriber.

Operations in steps 614 to 618 are the same with those in steps 512 to 516 in the first embodiment, so no details will be described hereinafter.

In the first and the second embodiments, the current state of the called terminal can be further judged before obtaining roaming number of the called subscriber in order to reduce signaling interaction. In detail, the SCP sends an Any Time Interrogation (ATI) to the HLR to which the called terminal is attached, after receiving the ATI, the HLR sends a Provide Subscriber Information (PSI) request to the T_MSC. The T_MSC pages the called subscriber, and sends current state of the called terminal to the HLR by way of a PSI response. The HLR sends the state information to the SCP in turn by way of an ATI response. The SCP can determine the current state of the called terminal based on the ATI response. If the called terminal is idle, the subsequent step, i.e. obtaining roaming number of the called subscriber from the HLR, will be executed. Else, the SCP sends a CONTINUE signaling without any parameters to the O_MSC, i.e., informing the O_MSC to operate in the same way as prior call procedure in steps 526 to 534 shown in FIG. 5.

Figure 7:
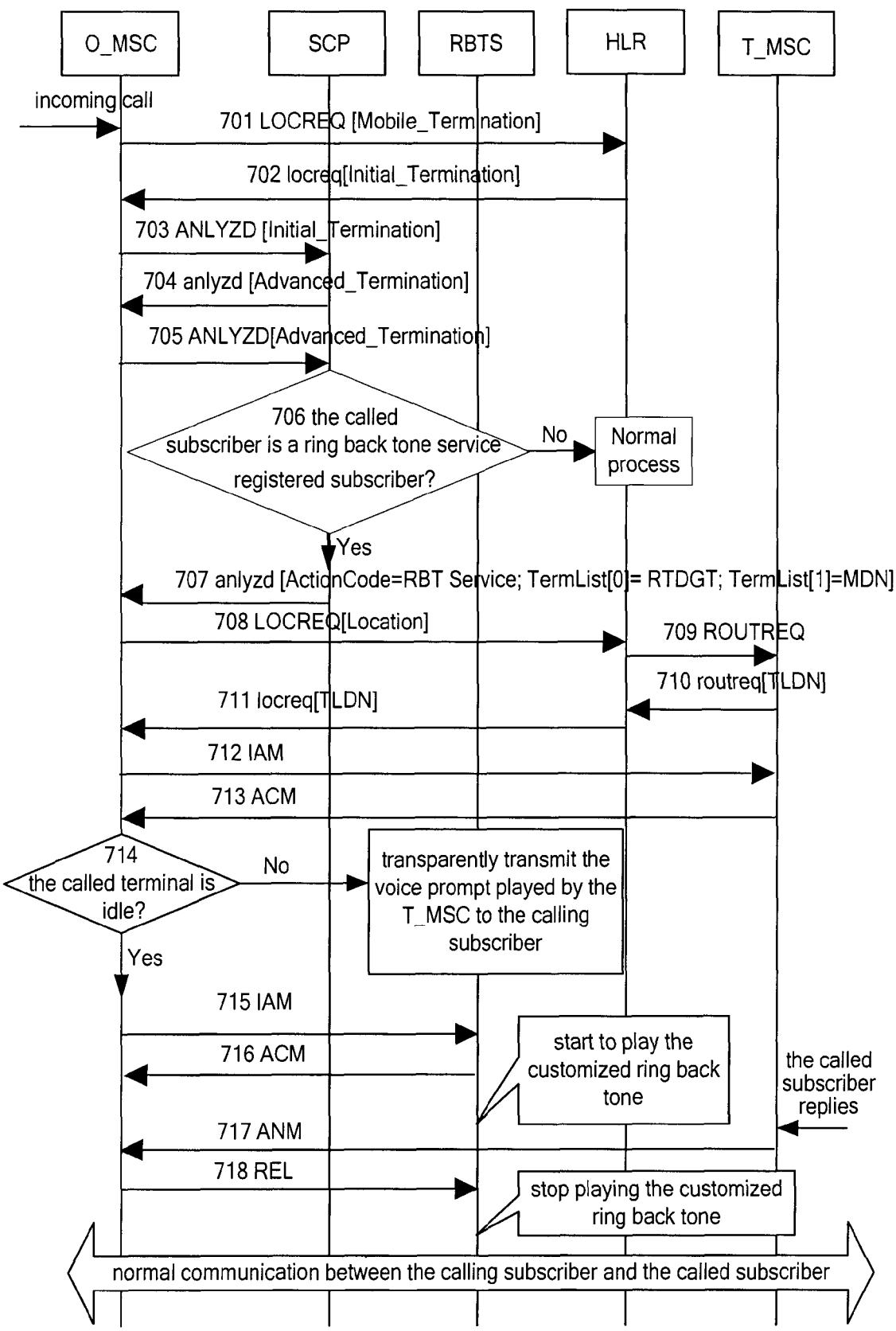
FIG. 7 is a signaling flowchart according to the third embodiment of the present invention.

The first and the second embodiments are described with the GSM system as example, the core idea of which can be easily applied to the CDMA system since the only distinction is that specific messages are different. FIG. 7 shows the third embodiment of the present invention, which illustrates a method for providing ring back tone service by means of intelligent network triggering in a CDMA system. The system structure shown in FIG. 4 is adopted in the third embodiment.

In step 701, when the calling subscriber initiates a call to called terminal B via calling terminal A, the O_MSC receives the call request from calling terminal A, triggers a Mobile_Termination trigger, and then sends LOCREQ message to the HLR to which the called terminal is attached in order to ask for contract information of the called subscriber, wherein the LOCREQ message includes number of the called subscriber and other information.

In step 702, the HLR searches contract information of the called subscriber based on the called number, and then sends contract information of the called subscriber to the O_MSC through an answer message locreq that at least includes an Initial_Termination trigger. If the called subscriber has also registered other intelligent services, the message may further includes a Location trigger and a Called Route Address Available (CDRAA) etc. Here, because the triggering mode adopted in the embodiment is intelligent network triggering, the called subscriber is registered as an intelligent network subscriber, in this way, contract information of the called subscriber includes the information that indicates the called subscriber is an intelligent network subscriber.

In steps 703, 704, after receiving contract information of the called subscriber, the O_MSC finds that the called subscriber is an intelligent network subscriber, so triggers the Initial_Termination trigger and sends an analysis message (ANLYZD) to the SCP so as to ask the SCP to authenticate the called subscriber. The analysis message at least includes a trigger type of the Initial_Termination trigger, a calling number, a called number, an identifier of serving MSC (MSCID) and location information of service triggering site etc. After authentication, the SCP sends authentication result message to the O_MSC, which also includes an Advanced_Termination trigger. It is reasonable that if the called subscriber fails in the authentication, the procedure will be ended immediately. The procedure in the embodiment is described hereinafter under the condition that the called subscriber passes through the authentication.

In step 705, the O_MSC triggers the Advanced_Termination trigger, and sends the SCP an ANLYZD message which at least includes a calling number and a called number.

In step 706, the SCP judges whether the called subscriber is a ring back tone service registered subscriber according to the ring back tone service register information of the called subscriber saved by itself. If so, the following steps will be executed. Else, the operation which is the same with the prior calling routine will be executed, that is, steps 526 to 534 shown in FIG. 5 will be executed.

In step 707, the SCP sends the called number and the routing number of the RBTS to the O_MSC through an Answer Message anlyzd, in which the action code ActionCode denotes the ring back tone service, TermList[0] refers to routing number RTDGT of the RBTS, and TermList[1] is the called number MDN.

In steps 708 to 711, the O_MSC sends a LOCREQ message to the HLR to which the called terminal is attached based on the called number in order to obtain roaming number of the called subscriber. Through sending ROUTREQ to the T_MSC and receiving Answer Message routreq sent from the T_MSC, the HLR obtains the roaming number TLDN of the called subscriber assigned by the T_MSC. And then the HLR sends TLDN of the called subscriber to the O_MSC via an Answer Message locreq.

In step 712, the O_MSC sends an IAM message to the T_MSC with TLDN as called number in order to route the call to the T_MSC.

In step 713, the T_MSC pages the called subscriber and sends state information of the called subscriber to the O_MSC by means of an ACM.

In step 714, the O_MSC judges whether the called terminal is idle based on the ACM. If so, screens the traditional ring back tone played to the calling subscriber by the T_MSC, and executes the following steps; else, the O_MSC transparently transmits the voice prompt played by the T_MSC to the calling subscriber via the O_MSC, the voice prompt representing the called terminal is busy, shutdown or out of service range.

In step 715, the O_MSC sends an IAM to the RBTS, and sends the calling number, the called number and other information to the RBTS through an IAM. Here, the called number is a routing number of the RBTS plus MDN of the called subscriber.

In step 716, the RBTS searches the ring back tone customized by the called subscriber based on the called number, and sends an ACM to the calling terminal. After that, the RBTS plays the ring back tone customized by the called subscriber to the calling subscriber via the O_MSC.

In step 717, when the called subscriber picks up the phone, the T_MSC sends an Answer Message ANM to the O_MSC.

In step 718, after receiving the ANM, the O_MSC disconnects the voice channel to the RBTS immediately so as to stop playing the customized ring back tone to the calling subscriber. At the same time, the O_MSC maintains the route between the O_MSC and the T_MSC, connects voice channel between the O_MSC and the T_MSC in order to keep call connection between the calling subscriber and the called subscriber.

In this embodiment, because the O_MSC establishes call connections to the RBTS and the T_MSC simultaneously, so it is enough to inform the O_MSC with routing number of the RBTS in step 707, and then obtain roaming number of the called subscriber through steps 708 to 711 from the O_MSC. The channel between the O_MSC and the T_MSC may also be relayed by the RBTS, similar with the first and the second embodiments. In this way, the SCP can also obtain roaming number of the called subscriber from the HLR, and send the roaming number to the O_MSC in step 707.

Figure 8A:
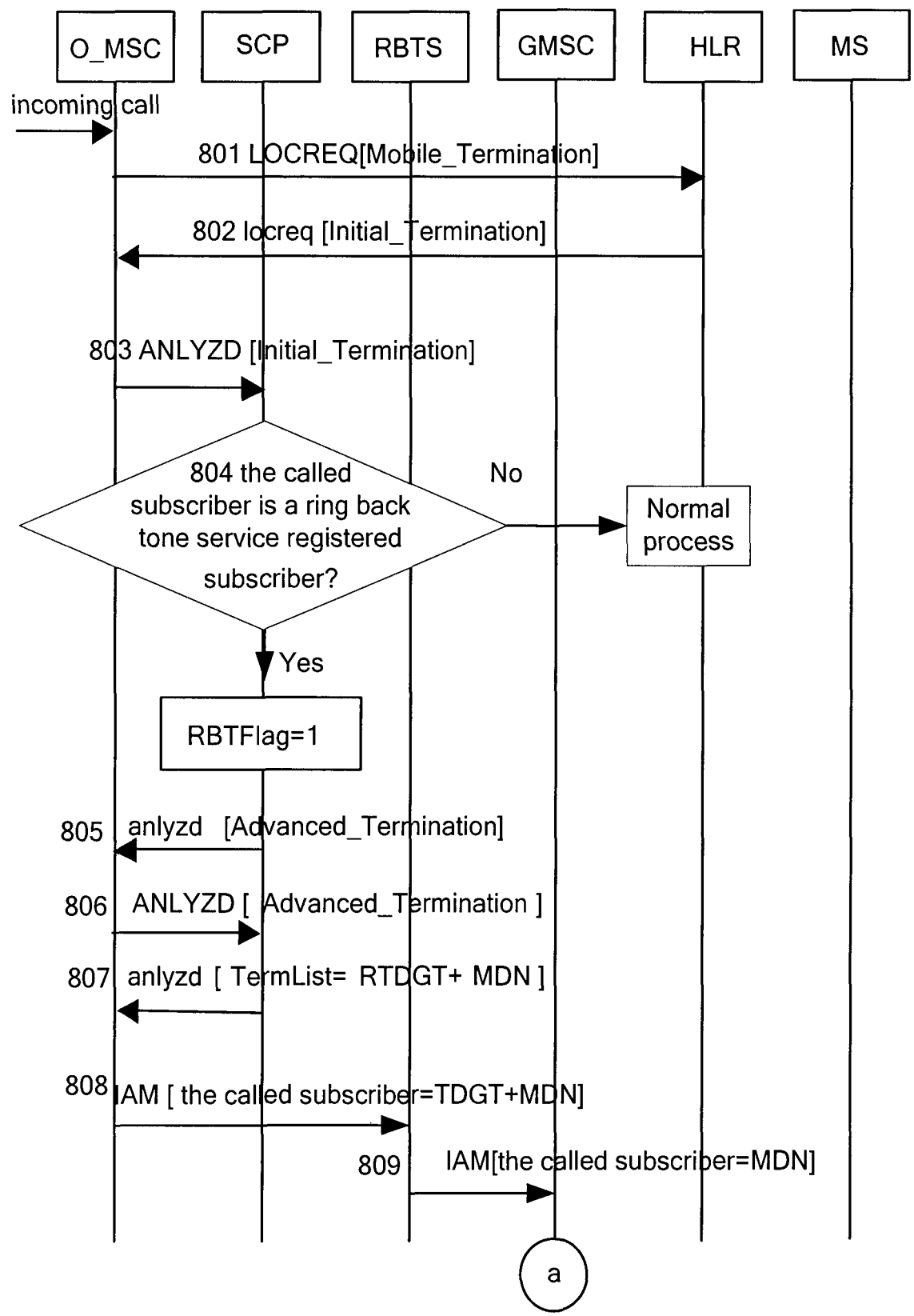
FIG. 8A and FIG. 8B are signaling flowcharts according to the fourth embodiment of the present invention.
Figure 8B:
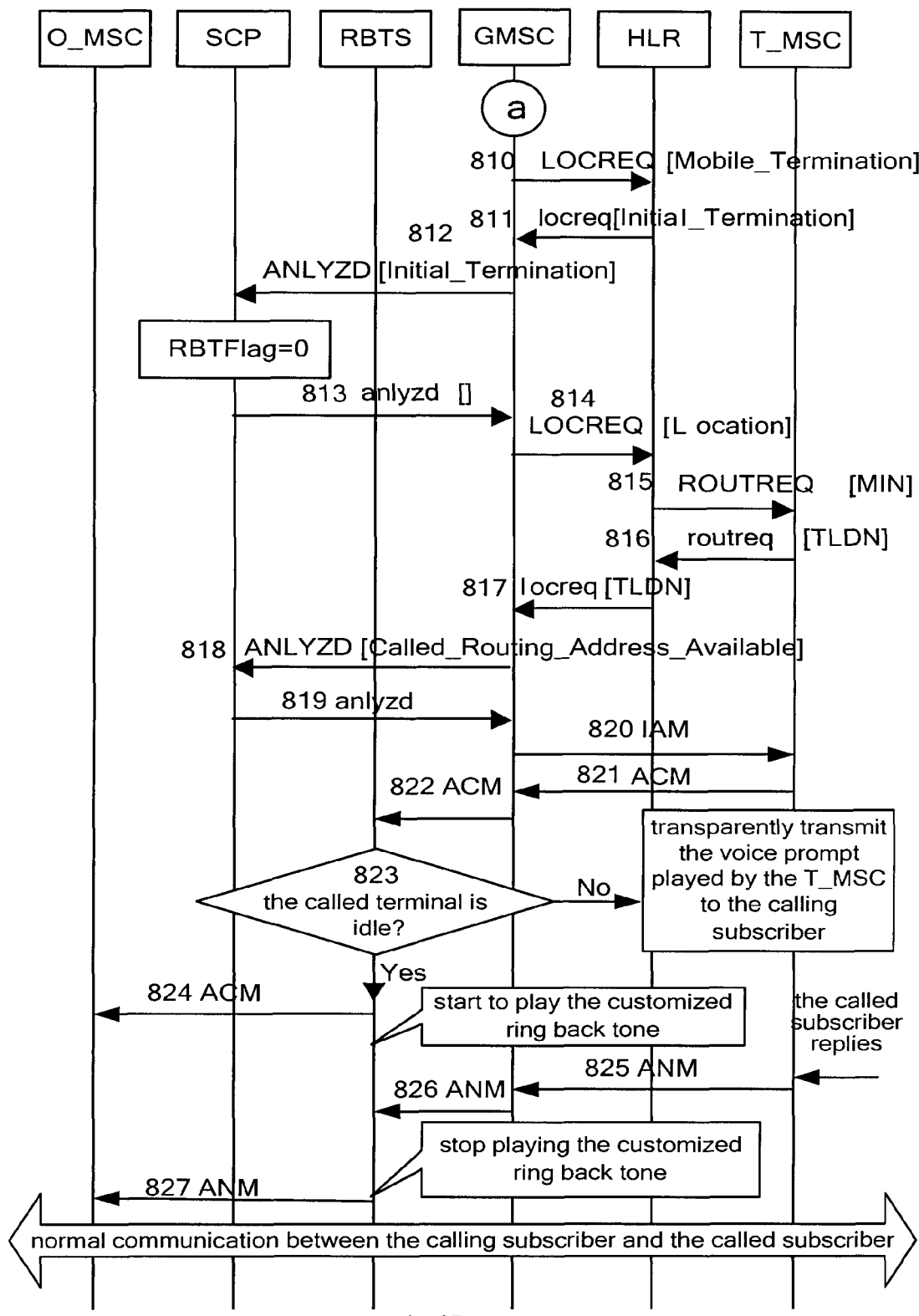

In the third embodiment, the O_MSC routes the call to the RBTS while establishing call connection to the T_MSC, therefore, the O_MSC needs to be reconstructed and updated, which increases cost of system update. In order to avoid this update for the MSC in the system, the fourth embodiment shown in FIG. 8A and FIG. 8B is provided in the invention. The fourth embodiment needs twice triggering procedures of the intelligent service. Different from the third embodiment, the fourth embodiment employs the system structure shown in FIG. 3.

In step 801, when the calling subscriber initiates a call to called terminal B through calling terminal A, the O_MSC receives the call from calling terminal A, and triggers a Mobile_Termination trigger, sends a LOCREQ message to the HLR to which the called terminal is attached in order to ask for routing information of the called subscriber. Here, the LOCREQ message includes a called number of the called subscriber and other information.

In step 802, The HLR searches contract information of the called subscriber based on the called number, and then sends contract information of the called subscriber to the O_MSC through an answer message locreq that at least includes an Initial_Termination trigger. If the called subscriber has already registered other intelligent services, the message may further include trigger information such as Location and CDRAA etc. Here, because the triggering mode adopted in the embodiment is intelligent network triggering, the called subscriber is registered as an intelligent network subscriber, and contract information of the called subscriber includes the information indicating whether the called subscriber is an intelligent network subscriber.

In step 803, after receiving the contract information of the called subscriber, the O_MSC may find that the called subscriber is an intelligent network subscriber, thereby activating the Initial_Termination trigger and sending the SCP an analysis message ANLYZD which at least includes trigger type of Initial_Termination trigger, a calling number, a called number, a MSCID and location information of service triggering site etc.

In step 804, the SCP judges whether the called subscriber is a ring back tone service registered subscriber according to the ring back tone service register information of the called subscriber saved by itself. If so, the SCP changes the value of RBTFlag from 0 to 1, and then goes to subsequent procedures. Else, prior call procedures will be executed.

A ring back tone service flag (RBTFlag) is preset in ring back tone service register information of subscribers in the SCP in this embodiment. The value of RBTFlag can be 0 which represents ring back tone service has not been triggered, or 1 which represents ring back tone service has been triggered. The main object of presetting RBTFlag lies in that it can be determined that a ring back tone service has been triggered during triggering the second service to the SCP afterwards, so the ring back tone service will not be triggered again. Here, because it is the first attempt to trigger the SCP, the value of RBTFlag is 0.

In step 805, the SCP sends the O_MSC an answer message anlyzd which includes an Advanced_Termination trigger.

In step 806, the O_MSC triggers the Advanced_Termination trigger, and sends ANLYZD message to the SCP.

In step 807, after receiving the ANLYZD message, the SCP sends routing number of the RBTS and the called subscriber number MDN to the O_MSC through an answer message anlyzd. Here, the routing number of the RBTS and the called subscriber number MDN are included in TermList, i.e. TermList=RTDGT+MDN.

In step 808, the O_MSC connects the call to the RBTS according to the routing number of the RBTS, meanwhile sends an IAM that includes the calling number and the called number to the RBTS. Here, the called number is MDN with a routing prefix which is a routing number of the RBTS.

In step 809, after receiving the IAM from the O_MSC, the RBTS sends the calling number and MDN of the called subscriber to a Gateway Mobile Switching Center (GMSC) of the called subscriber via an IAM.

Thus, the first service triggering operation has been finished, and then the GMSC implements the second service triggering procedure.

In step 810, after determining the called subscriber is a CDMA subscriber according to MDN of the called subscriber in the call, the GMSC triggers a Mobile_Termination trigger and sends a LOCREQ message to the HLR in order to obtain routing information of the called subscriber.

In step 811, the HLR obtains contract information of the subscriber according to the MDN, and returns an answer message locreq to the GMSC. The answer message at least includes Initial_Termination trigger information, if the called subscriber has already registered other intelligent services, the message may further include other trigger information such as Location and CDRAA.

In step 812, the GMSC triggers the Initial_Termination trigger, sends the SCP an ANLYZD message that at least includes trigger type of Initial_Termination trigger, calling number, called number and MSCID of the called subscriber triggering site.

In step 813, the SCP finds that the called subscriber has registered the ring back tone service through analyzing the called number in the ANLYZD message, and finds the value of RBTFlag is 1, and then changes the value of RBTFlag to 0. After that, the SCP sends an answer message anlyzd to the GMSC. Here, if the called subscriber has not registered other intelligent services, the SCP distributes the answer message directly; else, the SCP distributes the answer message after handling corresponding procedures of the intelligent services. In this way, the system can also implement other intelligent services registered by the subscriber while triggering the ring back tone service.

In step 814, the GMSC triggers the Location trigger, and sends a LOCREQ message to the HLR, in order to obtain routing information of the called subscriber from the HLR. Here, trigger type of the LOCREQ message in this step is Location trigger, and the message can also include MSCID of the GMSC.

In step 815, because the GMSC as service triggering site is different from the T_MSC as the called subscriber visiting site in the embodiment of the present invention, the HLR finds that MSCID of the service triggering site is different from that of the T_MSC as the called subscriber visiting site that is stored in the HLR through analyzing the MSCID of the GMSC as the second service triggering site in the received LOCREQ message, the HLR sends a route request message (ROUTREQ) that includes MIN of the called subscriber to the T_MSC.

In step 816, the T_MSC distributes TLDN number for the called subscriber based on the MIN, and returns the number to the HLR through an answer message routreq.

In step 817, the HLR returns the TLDN number as a called number to the GMSC through an answer message locreq for the LOCREQ message.

In step 818, the GMSC triggers the CDRAA trigger, and sends an ANLYZD message to the SCP after determining that routing number of the current called subscriber is valid. Here, the called number is TLDN.

In step 819, the SCP sends an answer message anlyzd for ANLYZD message to the GMSC to instruct the GMSC to continue call processing.

In step 820, the GMSC sends an IAM to the T_MSC to connect the call to the T_MSC. Here, the called number is TLDN.

In steps 821 and 822, the T_MSC pages the called subscriber, and sends the state information of the called subscriber to the RBTS via the GMSC through an ACM.

In step 823, the RBTS judges whether the called terminal is idle based on the ACM. If so, the RBTS searches the ring back tone customized by the called subscriber in step 824 according to the called number, and plays the ring back tone to the calling subscriber through the O_MSC while screening the traditional ring back tone, and the subsequent steps are executed. If the called terminal is not idle, for example, busy, shutdown or out of service range, the RBTS will transparently transmit the voice message played by the T_MSC that represents busyness, shutdown or out of service range to the calling subscriber via the O_MSC rather than playing the ring back tone to the calling subscriber.

In steps 825 to 827, when the called subscriber picks up the phone and answers the call, the T_MSC sends an ANM to the RBTS via the GMSC. After receiving the ANM, the RBTS sends the ANM to the O_MSC, and stops playing ring back tone to the calling subscriber simultaneously, establishes a voice channel from the O_MSC to the RBTS and further to the T_MSC, thereby enabling communication between the calling subscriber and the called subscriber.

Figure 9A:
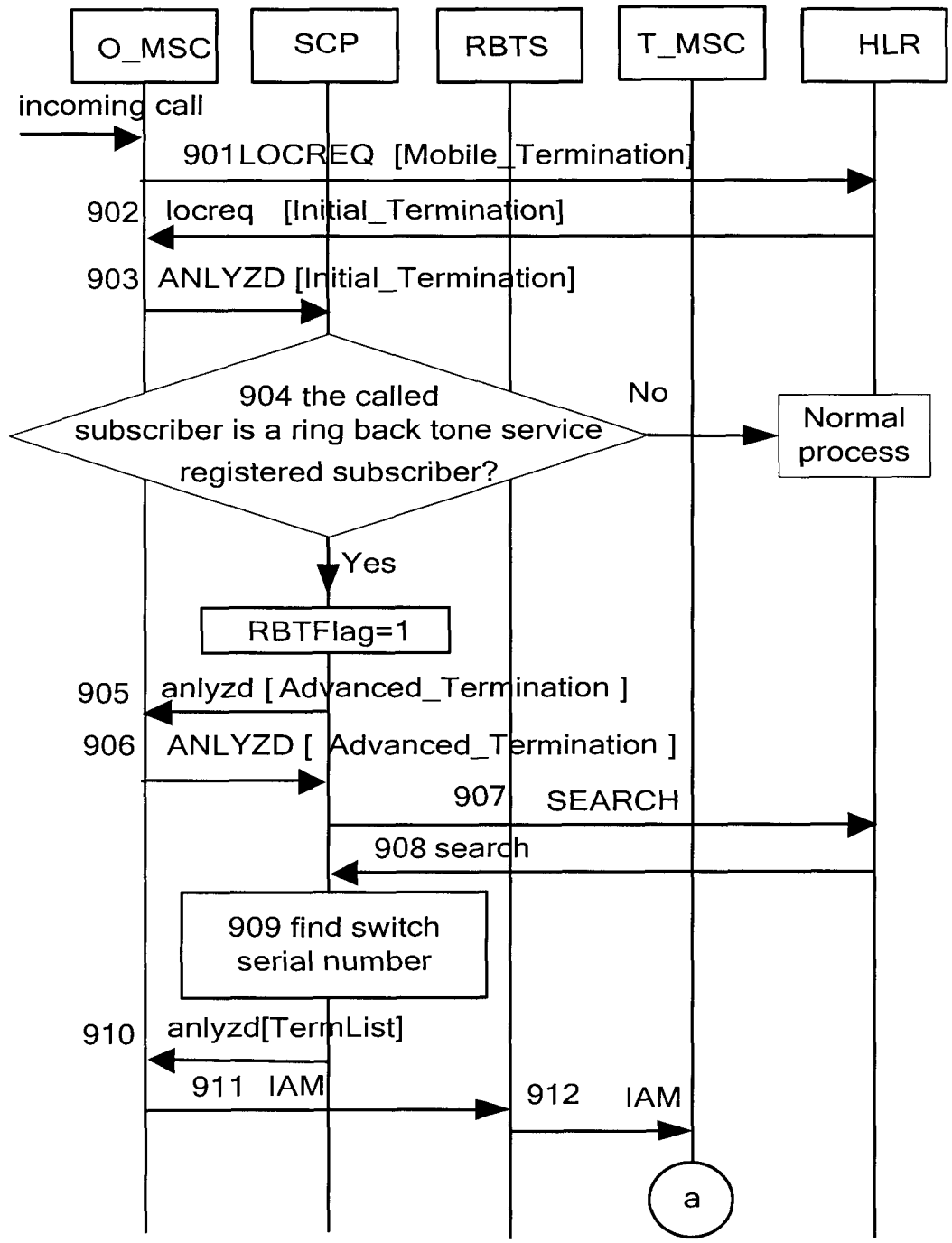
FIG. 9A and FIG. 9B are signaling flowcharts according to the fifth embodiment of the present invention.
Figure 9B:
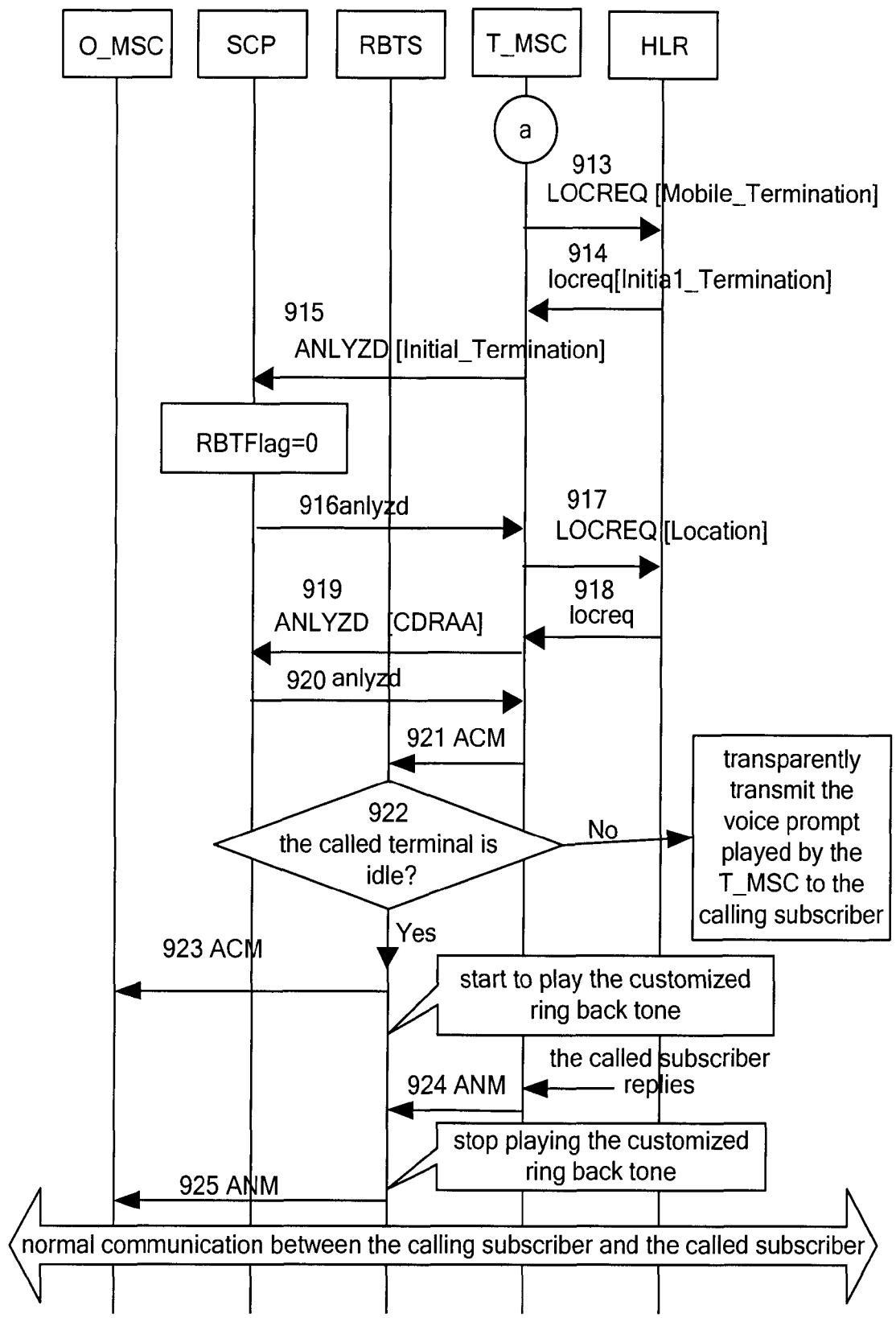

In the fourth embodiment, because of being unable to confirm T_MSC, the RBTS routes the call to the GMSC of the called subscriber, and then the GMSC confirms the routing number of the called subscriber to route the call to the T_MSC, which will result in channel detouring. In order to solve the defect, the fifth embodiment shown in FIG. 9A and FIG. 9B is provided according to the present invention.

Steps 901 to 906 in the fifth embodiment are absolutely same with steps 801 to 806 in the fourth embodiment, and detailed description thereof will be omitted.

In step 907, after receiving the ANLYZD message, the SCP sends a search (SEARCH) request that at least includes MDN of the called subscriber to the HLR.

In step 908, the HLR obtains MSCID of the T_MSC of the called subscriber based on the MDN, and sends MSCID to the SCP through an answer message, i.e. search, which is a response message of the SEARCH message.

In step 909, based on the MSCID, the SCP finds a switch serial number corresponding to the MSCID in its own system. A MSCID is distributed uniformly by the system provider and used for identifying a MSC. A switch serial number is used to exclusively identify a MSC needing connecting during the procedure of connecting the RBTS to the T_MSC.

In step 910, the SCP sends routing number of the RBTS, switch serial number and the called subscriber number MDN to the O_MSC through an answer message anlyzd. Here, TermList=RTDGT+switch serial number+MDN.

In step 911, the O_MSC handshakes the call to the RBTS according to said routing number of the RBTS, and sends IAM that comprises the calling number and called number to the RBTS, wherein the called number is MDN with a routing prefix which is routing number of the RBTS and H0H1H2H3.

In step 912, after receiving the IAM from the O_MSC, the RBTS routes the call to the T_MSC identified by the switch serial number according to the switch serial number in the IAM, and meanwhile sends the calling number and MDN of the called subscriber to the T_MSC through an IAM.

Thus, the first service triggering operation has been completed, and then the T_MSC implements the second service triggering procedure.

In step 913, the T_MSC triggers a Mobile_Termination trigger, sends a LOCREQ message to the HLR in order to obtain routing information of the called subscriber.

In step 914, the HLR obtains contract information of the subscriber based on MDN, and returns an answer message locreq to the T_MSC. The answer message locreq at least includes Initial_Termination trigger information. If the called subscriber has already registered other intelligent services, the message may further include trigger information such as Location and CDRAA.

In step 915, the T_MSC triggers an Initial_Termination trigger, and sends the SCP an ANLYZD message which at least includes trigger type of Initial_Termination trigger, calling number, called number and MSCID of the called subscriber triggering site.

In step 916, the SCP finds that the called subscriber has registered the ring back tone service through analyzing the called number in the ANLYZD message and finds that the value of RBTFlag is 1, then changes the value of RBTFlag to 0, and then sends an answer message anlyzd to the T_MSC. Here, if the called subscriber has not registered other intelligent services, the SCP distributes the answer message directly; if the subscriber has registered other intelligent services also, the SCP distributes the answer message after corresponding disposal procedure for the intelligent services. In this way, the system can also implement other intelligent services registered by the subscriber while triggering the ring back tone service.

In step 917, the T_MSC triggers Location trigger and sends a LOCREQ message to the HLR in order to obtain routing information of the called subscriber from the HLR. Here, trigger type of the LOCREQ message in this step is Location trigger.

In step 918, because the T_MSC as the service triggering site is the same with the T_MSC as the called subscriber visiting site in the embodiment of the present invention, the HLR finds that MSCID of the service triggering site is the same as that of the T_MSC as the called subscriber visiting site that is stored in the HLR through analyzing the MSCID of the GMSC as the second service triggering site in the received LOCREQ message. Consequently, the HLR directly returns the distributed TLDN to the T_MSC through an answer message locreq which is a response message of the LOCREQ message.

In step 919, the T_MSC triggers the CDRAA trigger and sends an ANLYZD message to the SCP after determining the current called number is valid. Here, the called number is TLDN.

In step 920, the SCP sends an answer message anlyzd in ANLYZD message to the T_MSC, instructing the T_MSC to continue call processing.

In step 921, the T_MSC pages the called subscriber and sends state information of the called terminal to the RBTS by means of an ACM.

In step 922, the RBTS judges whether the called terminal is idle based on the ACM. If so, the RBTS sends an ACM to the O_MSC in step 923, searches the ring back tone customized by the called subscriber according to the called number, and plays the ring back tone to the calling subscriber via the O_MSC, and screens the traditional ring back tone simultaneously. After that, the subsequent steps will be executed. In contrast, if the called terminal is not idle, for example, busy, shutdown or out of service range, the RBTS will transparently transmit the voice prompt played by the T_MSC that represents busyness, shutdown or out of service range to the calling subscriber via the O_MSC rather than playing the ring back tone to the calling subscriber.

In steps 924 and 925, when the called subscriber picks up the phone and answers the call, the T_MSC sends an ANM to the RBTS. After receiving the ANM, the RBTS sends an ANM to the O_MSC and stops playing ring back tone to the calling subscriber simultaneously, and establishes a voice channel between the O_MSC and the T_MSC to enable communication between the calling subscriber and the called subscriber.

Figure 10:
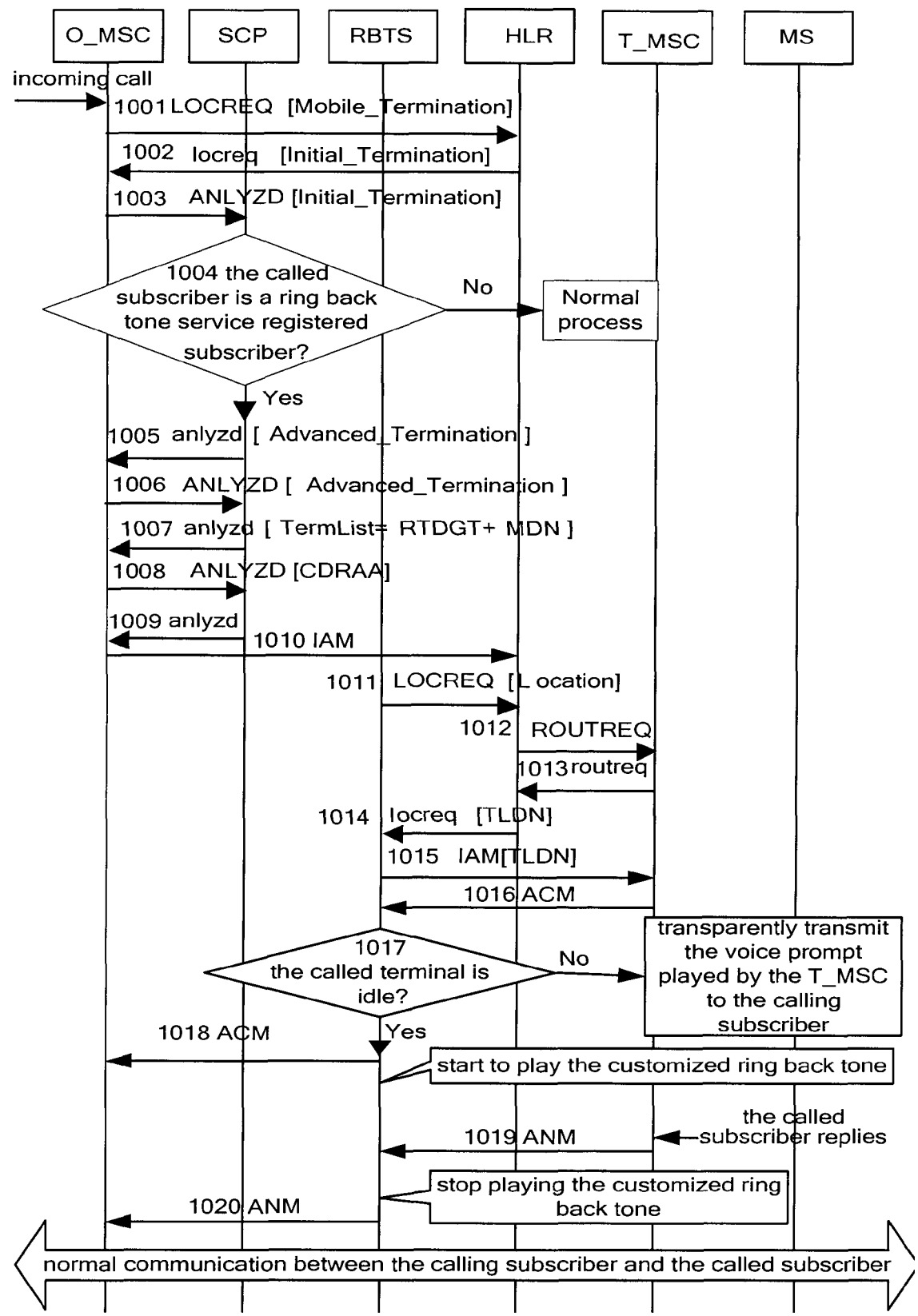
FIG. 10 is a signaling flowchart according to the sixth embodiment of the present invention.

In the fourth and the fifth embodiments mentioned above, twice service triggering is needed, resulting in complicated procedure. In order to solve this problem, the present invention provides the sixth embodiment shown in FIG. 10, in which the above twice service triggering procedures are integrated and operation procedure is simplified, but it is necessary for the RBTS to support LOCREQ operation in Mobile Application Part (MAP) protocol for CDMA system.

Steps 1001 to 1003 in the sixth embodiment are the same as steps 801 to 803 in the fourth embodiment, and detailed description thereof is omitted.

In step 1004, the SCP judges whether the called subscriber is a ring back tone service registered subscriber according to the ring back tone service register information of the called subscriber saved by itself. If so, the following steps will be executed; else, prior calling processing will be executed.

In step 1005, the SCP sends the O_MSC an answer message anlyzd including an Advanced_Termination trigger and a CDRAA trigger.

In step 1006, the O_MSC triggers the Advanced_Termination trigger, and sends ANLYZD message to the SCP.

In step 1007, after receiving the ANLYZD message, the SCP sends routing number of the RBTS and the called subscriber number MDN to the O_MSC through an answer message anlyzd. Here, the routing number of the RBTS and the called subscriber number MDN is included in TermList, i.e. TermList=RTDGT+MDN.

In steps 1008 and 1009, the O_MSC triggers the CDRAA trigger and sends ANLYZD message to the SCP. After confirming the called number is valid, the SCP sends an answer message anlyzd to the O_MSC.

In step 1010, the O_MSC connects the call to the RBTS according to routing number of the RBTS, and sends an IAM that includes a calling number, a called number and an original called number to the RBTS. Here, the called number is MDN with a routing prefix which is a routing number of the RBTS.

In steps 1011 to 1014, after receiving the IAM from the O_MSC, the RBTS sends a LOCREQ message to the HLR in order to obtain route information of the called subscriber. The HLR sends a route request message ROUTREQ including MIN of the called subscriber to the T_MSC. After receiving the message, the T_MSC distributes TLDN number to the called subscriber, and sends the TLDN number through an answer message routreq to the HLR, which in turn sends the TLDN number to the RBTS by means of an answer message locreq.

In step 1015, the RBTS sends an IAM to the T_MSC in order to connect the call to the T_MSC. Here, the called number is TLDN.

In step 1016, the T_MSC pages the called subscriber and sends state information of the called subscriber to the RBTS by means of the ACM.

In step 1017, the RBTS judges whether the called terminal is idle based on the ACM. If so, in step 1018, the RBTS searches the ring back tone customized by the called subscriber according to the called number, and plays the ring back tone to the calling subscriber via the O_MSC, screens the traditional ring back tone simultaneously, and then the subsequent steps will be executed. If the called terminal is not idle, for example, busy, shutdown or out of service range, then the RBTS will transparently transmit the voice prompt played by the T_MSC that represents busyness, shutdown or out of service range to the calling subscriber via the O_MSC rather than playing the ring back tone to the calling subscriber.

In steps 1019 and 1020, when the called subscriber picks up the phone and answers the call, the T_MSC sends an ANM to the RBTS. After receiving the ANM, the RBTS sends the ANM to the O_MSC, stops playing ring back tone to the calling subscriber simultaneously, and establishes a voice channel between the O_MSC and the T_MSC to enable communication between the calling subscriber and the called subscriber.

In the fifth and the sixth embodiments, while triggering ring back tone service, other intelligent services such as prepaid service can also be triggered under the condition that the ring back tone service and other intelligent services are registered in the same SCP. As for the case that those services are registered at different SCPs, the present invention provides the seventh embodiment shown in FIG. 11 and FIG. 12. The embodiment takes the Pre-Paid Charging (PPC) service as an example of other intelligent services.

Figure 11:
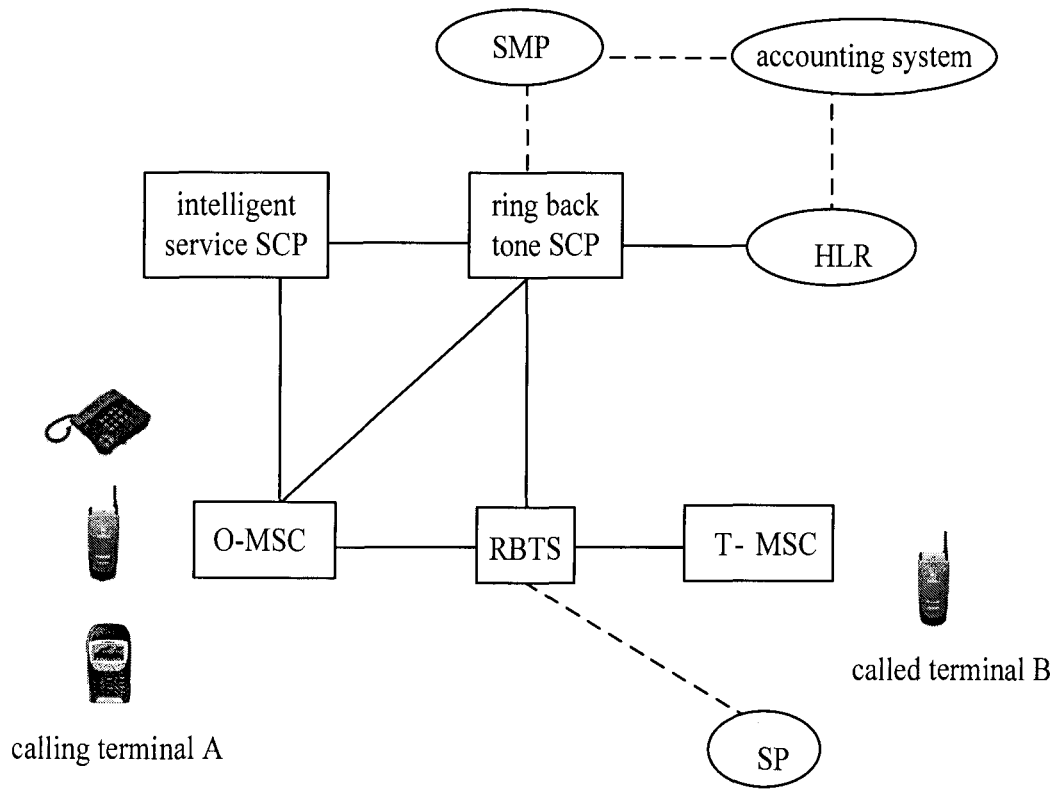
FIG. 11 illustrates a system structure according to the seventh embodiment of the present invention.

As shown in FIG. 11, the system and method in the seventh embodiment relates to two SCPs. Ring back tone service is registered in one SCP that is called ring back tone SCP hereinafter, and other intelligent services such as PPC service are registered in another SCP that is called intelligent service SCP hereinafter.

The seventh embodiment is applicable for the case that MSC supports CDRAA trigger renumbering and the HLR supports different triggers registered to different SCPs. In a CDMA network, the SCP can be identified with a GT code, which is similar with IP address in Internet and is used to represent address of SCP. In the HLR, a separate datasheet is stored for each subscriber, GT codes of the SCPs corresponding to different triggers relating with calling procedure are list in this datasheet. If different triggers can correspond to GT codes of different SCPs, the MSC can thereby send messages corresponding to different triggers to different SCPs during the calling procedure, which means the HLR supports different triggers registered to different SCPs. On the contrary, if it is required that all triggers correspond to a GT code of the same SCP, we can say the HLR does not support different triggers registered to different SCPs.

In the embodiment, because the HLR supports different triggers registered to different SCPs, the GT code of the SCP to which the CDRAA trigger corresponds can be changed to that of the ring back tone SCP, while the GT codes of SCPs to which other triggers correspond are still that of the formerly registered intelligent service SCP.

Figure 12B:
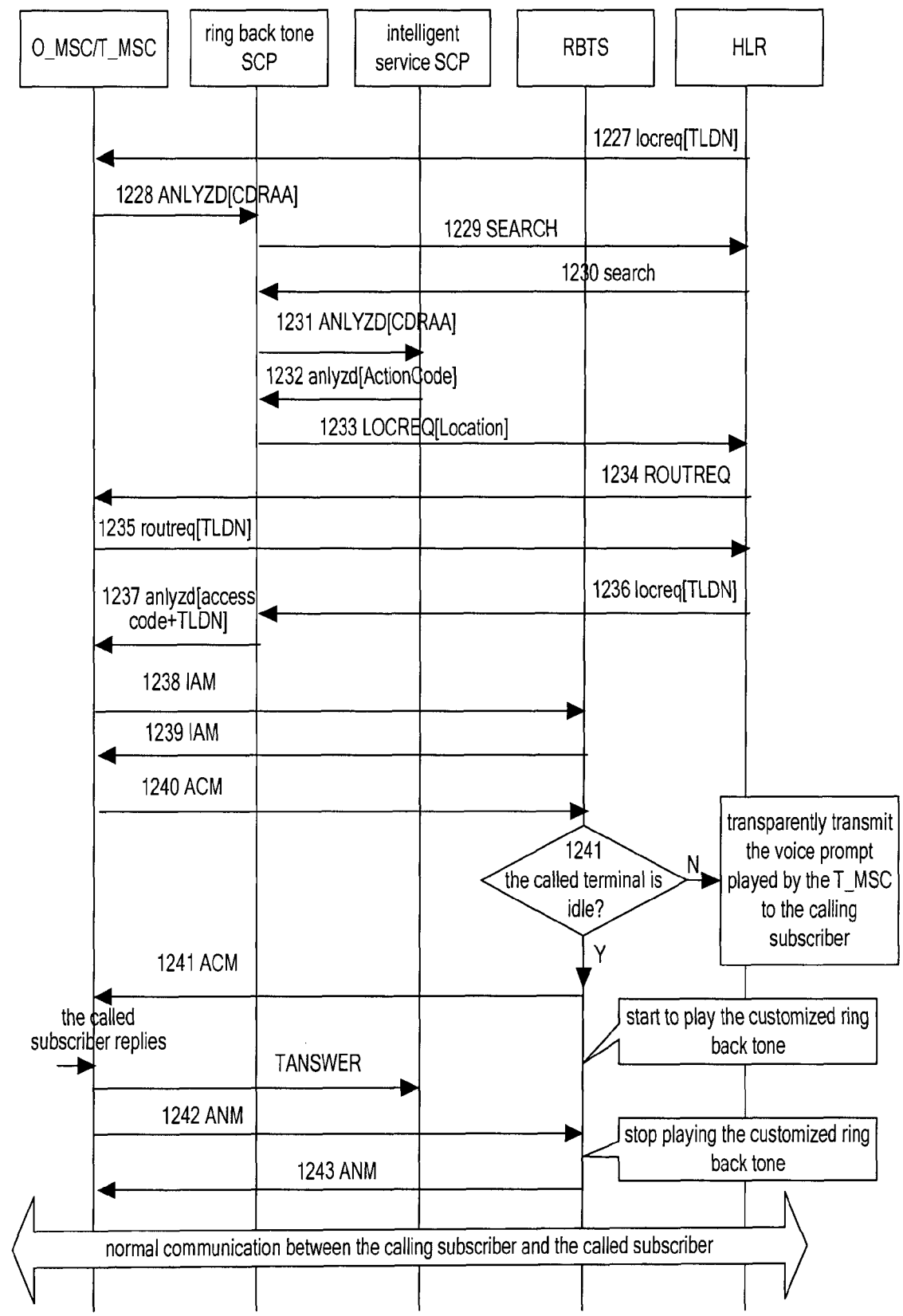

In the procedures shown in FIG. 12A and FIG. 12B, in step 1201, when the calling subscriber initiates a call to called terminal B via calling terminal A, the O_MSC receives the call from calling terminal A, triggers a Mobile_Termination trigger, and sends a LOCREQ message to the HLR to which the called terminal is attached in order to ask for routing information of the called subscriber. Here, the LOCREQ message includes a called number of the called subscriber and other information.

In step 1202, the HLR searches the contract information of the called subscriber according to the called number, and then sends the contact information to the O_MSC by means of an answer message locreq which includes at least an Initial_Termination trigger whose corresponding SCP is an intelligent service SCP. Here, because the triggering mode adopted in the embodiment is intelligent network triggering, the called subscriber is registered as an intelligent network subscriber, and contract information of the called subscriber includes the information indicating the called subscriber is an intelligent network subscriber.

In steps 1203 and 1204, after receiving the contract information of the called subscriber, the O_MSC determines the called subscriber is an intelligent network subscriber, and then triggers an Initial_Termination trigger in order to ask the SCP to authenticate the called subscriber. Because the SCP to which the Initial_Termination trigger corresponds is the intelligent service SCP, the O_MSC sends ANLYZD to the intelligent service SCP to ask this SCP make authentication for the called subscriber. After the authentication is completed, the intelligent service SCP sends authentication result message to the O_MSC by means of anlyzd. If the called subscriber fails in the authentication, the procedure will be ended immediately. The procedure in the embodiment is described hereinafter under the condition that the called subscriber passes the authentication successfully.

In step 1205, the O_MSC sends a LOCREQ message to the HLR to which the called terminal is attached in order to ask for obtaining roaming number of the called subscriber.

In step 1206, after receiving the message, the HLR judges whether the MSCID in LOCREQ is the same with that of the T_MSC corresponding to the called subscriber stored in itself, if so, step 1207 and its subsequent steps shown in FIG. 12A will be executed; else, step 1227 and its subsequent steps shown in FIG. 12B will be executed.

In steps 1207 to 1209, the HLR sends ROUTREQ message to the T_MSC. The T_MSC assigns a TLDN for the called subscriber and returns the TLDN to the HLR by means of a routreq message, and the HLR returns the TLDN of the called subscriber to the O_MSC by means of an answer message locreq for LOCREQ message.

In step 1210, the O_MSC finds CDRAA trigger and triggers the trigger, and sends ANLYZD message to the ring back tone SCP according to the SCP address in the trigger.

In step 1211, the ring back tone SCP judges whether the called subscriber is a ring back tone service registered subscriber according to the ring back tone service register information of the called subscriber saved in itself. If so, the SCP sends SEARCH message to the HLR to which the called terminal is attached in order to obtain the SCP address which is used for the called subscriber to implement other intelligent services. Else, prior call procedure will be executed. Here, assume the called subscriber has registered the ring back tone service.

In step 1212, after receiving the message, the HLR returns the SCP address which is used for the called subscriber to implement other intelligent services to the ring back tone SCP through answer message search.

In step 1213, the ring back tone SCP forwards the ANLYZD message received in step 1210 to the intelligent service SCP according to the received SCP address for other intelligent services.

In step 1214, after receiving the ANLYZD message, the intelligent service SCP returns answer message anlyzd to the ring back tone SCP. Here, the parameter of action code ActionCode is used to represent processing result of the intelligent service SCP.

In step 1215, after receiving anlyzd message from the intelligent service SCP, the ring back tone SCP sends response message anlyzd for ANLYZD message to the O_MSC according to the ActionCode in the message, and instructs the O_MSC to operate correspondingly according to the processing result of the intelligent service SCP. Here, assume the ring back tone SCP instructs the O_MSC to continue call processing. Of course, it can be understood that if the instruction to the O_MSC is to stop operation, the procedure will be ended. Under the condition of instructing the O_MSC to continue call processing, anlyzd message may further include RBTS access code and roaming number of the called subscriber.

In step 1216, the O_MSC connects the call to the RBTS according to called number received from the ring back tone SCP, and sends an IAM that includes calling number, original called number and called number to the RBTS simultaneously. Here, the original called number is MDN of the called subscriber, and the called number is roaming number of the called subscriber with a routing prefix which is an access code of the RBTS, while roaming number of the called subscriber is TLDN.

In step 1217, the RBTS connects the call to the T_MSC, meanwhile sends an IAM in which the called number is TLDN to the T_MSC.

In step 1218, the T_MSC pages the called subscriber and sends state information of the called terminal to the RBTS by means of an ACM.

In step 1219, the RBTS judges whether the called terminal is idle based on the ACM. If so, in step 1220, the RBTS searches the ring back tone customized by the called subscriber based on the MDN number of the called subscriber, and plays the ring back tone to the calling subscriber through the O_MSC, and meanwhile screens the traditional ring back tone played by the T_MSC. Then the subsequent steps will be executed. If the called terminal is not idle, for example, busy, shutdown or out of service range, the RBTS will transparently transmit the voice prompt played by the T_MSC that represents busyness, shutdown or out of service range to the calling subscriber via the O_MSC, rather than playing the ring back tone to the calling subscriber.

In step 1221, when the called subscriber picks up the phone and answers the call, the T_MSC sends TANSWER message to the intelligent service SCP, notifying the intelligent service SCP to start charging operation, and sends an ANM to the RBTS at the same time.

In step 1222, after receiving the ANM, the RBTS sends an ANM to the O_MSC, stops playing ring back tone to the calling subscriber simultaneously, and establishes a voice channel between the O_MSC and the T_MSC to enable communication between the calling subscriber and the called subscriber.

In step 1227 shown in FIG. 12B, because the MSC corresponding to the calling subscriber is the same as that corresponding to the called subscriber is determined, the HLR directly sends the O_MSC a locreq which includes MSCID of the called MSC but does not include TLDN.

The following steps 1228 to 1232 are similar with steps 1210 to 1214, therefore, no details will be further described.

In steps 1233 to 1236, after receiving the anlyzd message from the intelligent service SCP, the ring back tone SCP sends LOCREQ message to the HLR to which the called terminal is attached in order to obtain roaming number of the called subscriber. The HLR then sends ROUTREQ message to the T_MSC which subsequently sends TLDN of the called subscriber to the ring back tone SCP via the HLR. Because the MSC corresponding to the calling subscriber is the same as that corresponding to the called subscriber, it can be understood that the T_MSC here is just the O_MSC.

In step 1237, according to the anlyzd received from the intelligent service SCP, the ring back tone SCP instructs the O_MSC to implement operations corresponding to the processing result of the intelligent service SCP. Under the circumstance of instructing the O_MSC to continue call processing, the anlyzd message further includes RBTS access code and roaming number of the called subscriber.

In steps 1238 and 1239, the T_MSC sends an ACM to the RBTS which sends subsequently an ACM to the O_MSC, thereby the connection among the O_MSC, RBTS and T_MSC will be established.

In step 1240, the T_MSC pages the called subscriber and sends state information of the called terminal to the RBTS by means of ACM.

In step 1241, the RBTS judges whether the called terminal is idle based on the ACM. If so, in step 1242, the RBTS searches the ring back tone customized by the called subscriber according to the MDN number of the called subscriber, and plays the ring back tone to the calling subscriber via the O_MSC, while screening the traditional ring back tone played by the T_MSC at the same time. And then the subsequent steps will be executed. If the called terminal is not idle, for example, busy, shutdown or out of service range, then the RBTS will transparently transmit the voice prompt played by the T_MSC that represents busyness, shutdown or out of service range to the calling subscriber via the O_MSC, rather than playing the ring back tone to the calling subscriber.

In step 1242, when the called subscriber picks up the phone and answers the call, the T_MSC sends a TANSWER message to the intelligent service SCP, notifying the intelligent service SCP to start charging operation, and sends an ANM to the RBTS at the same time.

In step 1243, after receiving the ANM, the RBTS sends an ANM to the O_MSC, stops playing ring back tone to the calling subscriber simultaneously, and establishes a voice channel between the O_MSC and the T_MSC to enable communication between the calling subscriber and the called subscriber.

In subsequent procedures, if the calling subscriber or the called subscriber hangs up, relay channel between the calling subscriber or the called subscriber and the intelligent service SCP will be released. Here, the embodiment takes hang up procedure for the called subscriber as an example, and hang up procedure for the calling subscriber is similar with the procedure above.

When the called subscriber hangs up, the T_MSC sends a TDISCONNECT message to the intelligent service SCP which in turn returns an answer message tdisconnect for the TDISCONNECT to the T_MSC after receiving the message. And then, the T_MSC sends release message to the O_MSC via the RBTS, and the O_MSC returns release success message to the T_MSC via the RBTS in order to release the relay channel between the calling subscriber and called subscriber.

Through triggering to the intelligent service SCP and ring back tone SCP, the ring back tone service and other intelligent services registered at different SCPs can be implemented at the same time.

Figure 13A:
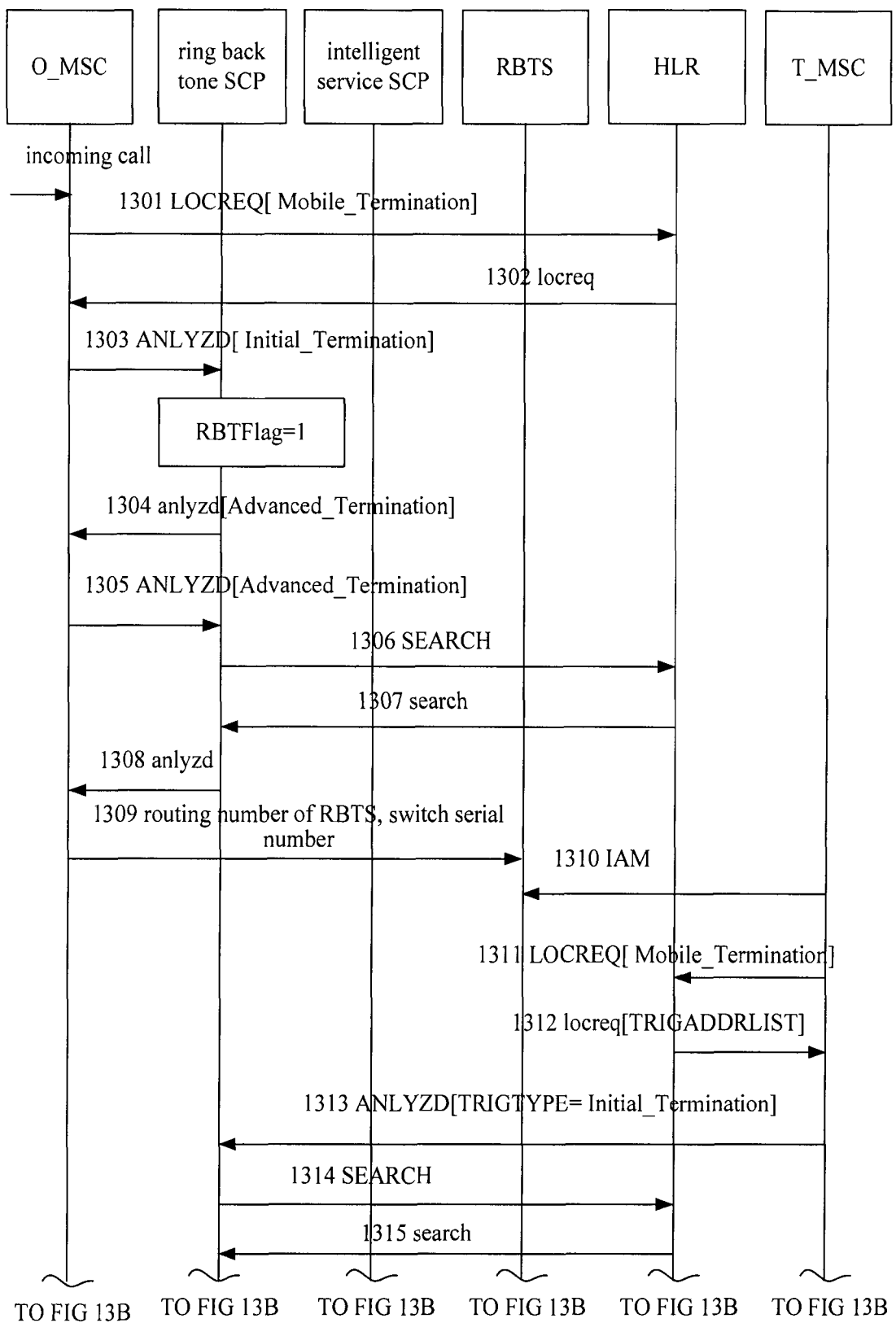
FIG. 13 is a signaling flowchart according to the eighth embodiment of the present invention.
Figure 13B:
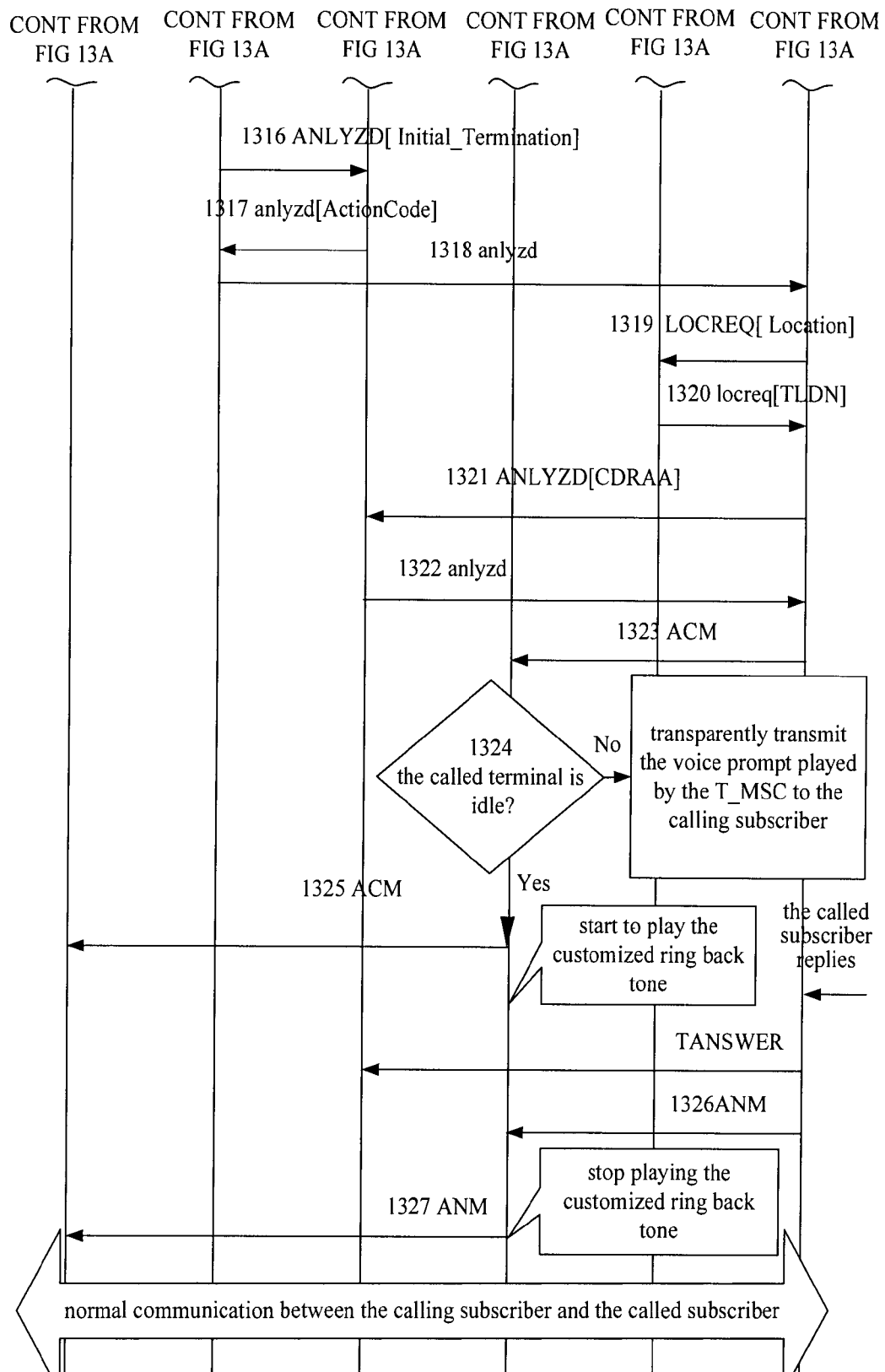

In the embodiment mentioned above, the MSC supports renumbering of the CDRAA trigger, and meanwhile, the HLR supports different triggers registered at different SCPs. However, the MSC may be unable to support renumbering of the CDRAA trigger in practice, so the present invention provides the eighth embodiment. In this embodiment, MSC cannot support renumbering of the CDRAA trigger, the HLR supports different triggers registered at different SCPs. At this time, the GT code of the SCP corresponding to Initial_Termination trigger can be changed to that of the ring back tone SCP, while the GT code of SCPs for other triggers will keep the GT code of originally registered intelligent service SCPs. The method according to the eighth embodiment is shown in FIG. 13.

In step 1301, when the calling subscriber initiates a call to called terminal B through calling terminal A, the O_MSC receives the call from calling terminal A, triggers a Mobile_Termination trigger, and sends LOCREQ message to the HLR to which the called terminal is attached in order to ask for routing information of the called subscriber. Here, the LOCREQ message includes called number of the called subscriber and other information.

In step 1302, the HLR searches the contract information of the called subscriber according to the called number, and then sends the information to the O_MSC by means of an answer message locreq which at least includes Initial_Termination trigger whose corresponding SCP is the intelligent service SCP. Here, because the triggering mode adopted in the embodiment is intelligent network triggering, the called subscriber is registered as an intelligent network subscriber, and contract information of the called subscriber includes the information indicating the called subscriber is an intelligent network subscriber.

In step 1303, after receiving the contract information of the called subscriber, the O_MSC finds the called subscriber is an intelligent network subscriber, therefore, the O_MSC triggers an Initial_Termination trigger, asking the SCP to authenticate the called subscriber. Because the SCP to which Initial_Termination trigger corresponds is ring back tone SCP, the O_MSC sends ANLYZD to ring back tone SCP to ask the SCP to make authentication for the called subscriber.

In step 1304, after the authentication is completed, the ring back tone SCP judges whether the called subscriber is a ring back tone service registered subscriber according to the ring back tone service register information of the called subscriber stored in the SCP. If so, the value of RBTFlag will be changed from 0 to 1, and then an anlyzd message will be returned to the O_MSC. Here, the parameters in the trigger list includes Advanced_Termination trigger whose corresponding SCP address is the address of the ring back tone SCP. Else, prior call procedure will be executed.

Like the fourth embodiment, a RBTFlag is also set in the ring back tone service register information in the ring back tone SCP in this embodiment. Here, the value of RBTFlag can be 0 which represents no ring back tone service is triggered, or 1 which indicates a ring back tone service is triggered. The main object of setting RBTFlag is to enable knowing the ring back tone service has already triggered during the second triggering operation on the SCP afterwards, in order to avoid repeating triggering operation on the ring back tone service. Because it is the first attempt to trigger the SCP, the value of RBTFlag is 0 in this time.

In step 1305, the O_MSC triggers Advanced_Termination trigger, and sends ANLYZD to the ring back tone SCP.

In step 1306, after receiving the message, the ring back tone SCP sends a search (SEARCH) request that at least includes MDN of the called subscriber to the HLR.

In step 1307, the HLR obtains MSCID of the T_MSC corresponding to the called subscriber based on the MDN, and sends MSCID to the SCP by means of an answer message search for the SEARCH message.

In step 1308, the SCP finds switch serial number corresponding to the MSCID in itself based on the MSCID. The MSCID used to identify the MSC is assigned by the system provider uniformly. Switch serial number is used to identify exclusively the MSC needing connecting during the connect procedure from the RBTS to the T_MSC. Then the SCP sends routing number of the RBTS, switch serial number and the called subscriber number MDN to the O_MSC by means of answer message anlyzd. Here, TermList=RTDGT+switch serial number+MDN.

In step 1309, the O_MSC connects the call to the RBTS according to routing number of the RBTS, and sends an IAM including the calling number and the called number to the RBTS. Here, the called number is MDN with a routing prefix which is the routing number of the RBTS plus switch serial number.

In step 1310, after receiving the IAM from the O_MSC, the RBTS routes the call to the T_MSC identified by the switch serial number in the IAM, and at the same time sends the calling number and MDN of the called subscriber to the T_MSC by means of IAM.

In steps 1311 and 1312, the T_MSC sends LOCREQ message to the HLR to which the called terminal is attached to ask for routing information of the called subscriber. Because the called subscriber is an intelligent service subscriber, the HLR returns contract information of the called subscriber including Initial_Termination trigger to the T_MSC.

In step 1313, the T_MSC triggers the Initial_Termination trigger, and sends ANLYZD message to the ring back tone SCP.

In step 1314, the ring back tone SCP makes authentication for the called subscriber, after the authentication, the value of RBTFlag will be changed from 1 to 0. And then the SCP sends SEARCH message to the HLR to which the called terminal is attached in order to obtain the SCP address which is used in providing other intelligent services to the called subscriber.

In step 1315, after receiving the message, the HLR returns the SCP address which is used in providing other intelligent services to the called subscriber to the ring back tone SCP through answer message search.

In step 1316, the ring back tone SCP forwards the ANLYZD message received in step 1303 to the intelligent service SCP according to the received SCP address for other intelligent services.

In step 1317, after receiving the ANLYZD message, the intelligent service SCP returns answer message anlyzd to the ring back tone SCP. Here, the parameter in ActionCode is used to represent processing result of the intelligent service SCP.

In step 1318, after receiving anlyzd message from the intelligent service SCP, the ring back tone SCP sends ANLYZD response message anlyzd to the T_MSC according to ActionCode in the message, in order to instruct the T_MSC to implement operations corresponding to processing result of the intelligent service SCP. Here, assume the ring back tone SCP instructs the T_MSC to continue call processing is supposed. Of course, it can be understood that if the instruction for the T_MSC is to stop operation, the procedure will be ended.

In step 1319, the T_MSC sends LOCREQ message to the HLR to which the called terminal is attached in order to obtain roaming number of the called subscriber.

In step 1320, the HLR determines that the MSCID in LOCREQ message is the same as that of the T_MSC, therefore, the HLR sends MSCID of the T_MSC directly to the T_MSC through answer message locreq.

In step 1321, after confirming that the received MSCID is the same as that of itself, the T_MSC assigns a TLDN to the called subscriber directly. After that, the T_MSC detects CDRAA trigger, because corresponding SCP address is intelligent service SCP, therefore, the T_MSC triggers the CDRAA trigger and sends ANLYZD message to the intelligent service SCP.

In step 1322, after analyzing the message, the intelligent service SCP returns answer message anlyzd to the T_MSC. Here, the parameter in ActionCode is used to represent processing result of the intelligent service SCP. Here, assume the intelligent service SCP instructs the T_MSC to continue call processing.

In step 1323, the T_MSC pages the called subscriber and sends state information of the called terminal to the RBTS by means of an ACM.

In step 1324, the RBTS judges whether the called terminal is idle based on the ACM. If so, in step 1325, the RBTS sends an IAM to the O_MSC, searches ring back tone customized by the called subscriber according to the MDN number of the called subscriber, and plays the ring back tone to the calling subscriber via the O_MSC, meanwhile screens the traditional ring back tone played by the T_MSC. And then the subsequent steps will be executed. If the called terminal is not idle, for example, busy, shutdown or out of service range, the RBTS will transparently transmit the voice prompt played by the T_MSC representing busyness, shutdown or out of service range to the calling subscriber via the O_MSC, rather than playing the ring back tone to the calling subscriber.

In step 1326, when the called subscriber picks up the phone and answers the call, the T_MSC sends a TANSWER message to the intelligent service SCP, notifying the intelligent service SCP to start charging operation, and sends an ANM to the RBTS at the same time.

In step 1327, after receiving the ANM, the RBTS sends an ANM to the O_MSC, stops playing ring back tone to the calling subscriber simultaneously, and establishes a voice channel between the O_MSC and the T_MSC to enable communication between the calling subscriber and the called subscriber.

In the eighth embodiment, after the call is connected to the T_MSC, the T_MSC initiates the intelligent service in the intelligent service SCP via the ring back tone SCP. In practice, the T_MSC can also initiate intelligent service via the ring back tone SCP before the call is connected to the T_MSC.

Figure 14A:
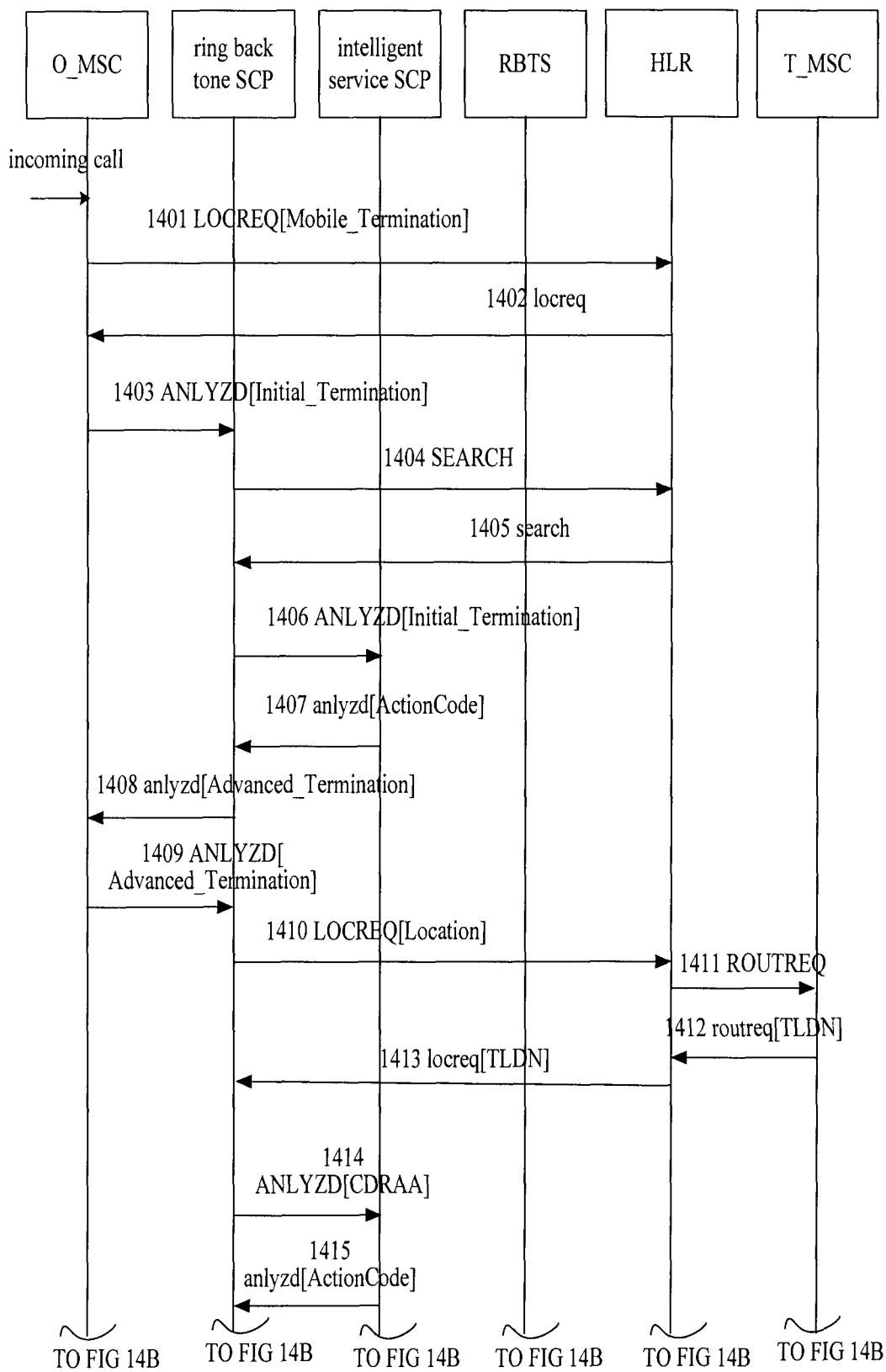
FIG. 14 is a signaling flowchart according to the ninth embodiment of the present invention.
Figure 14B:
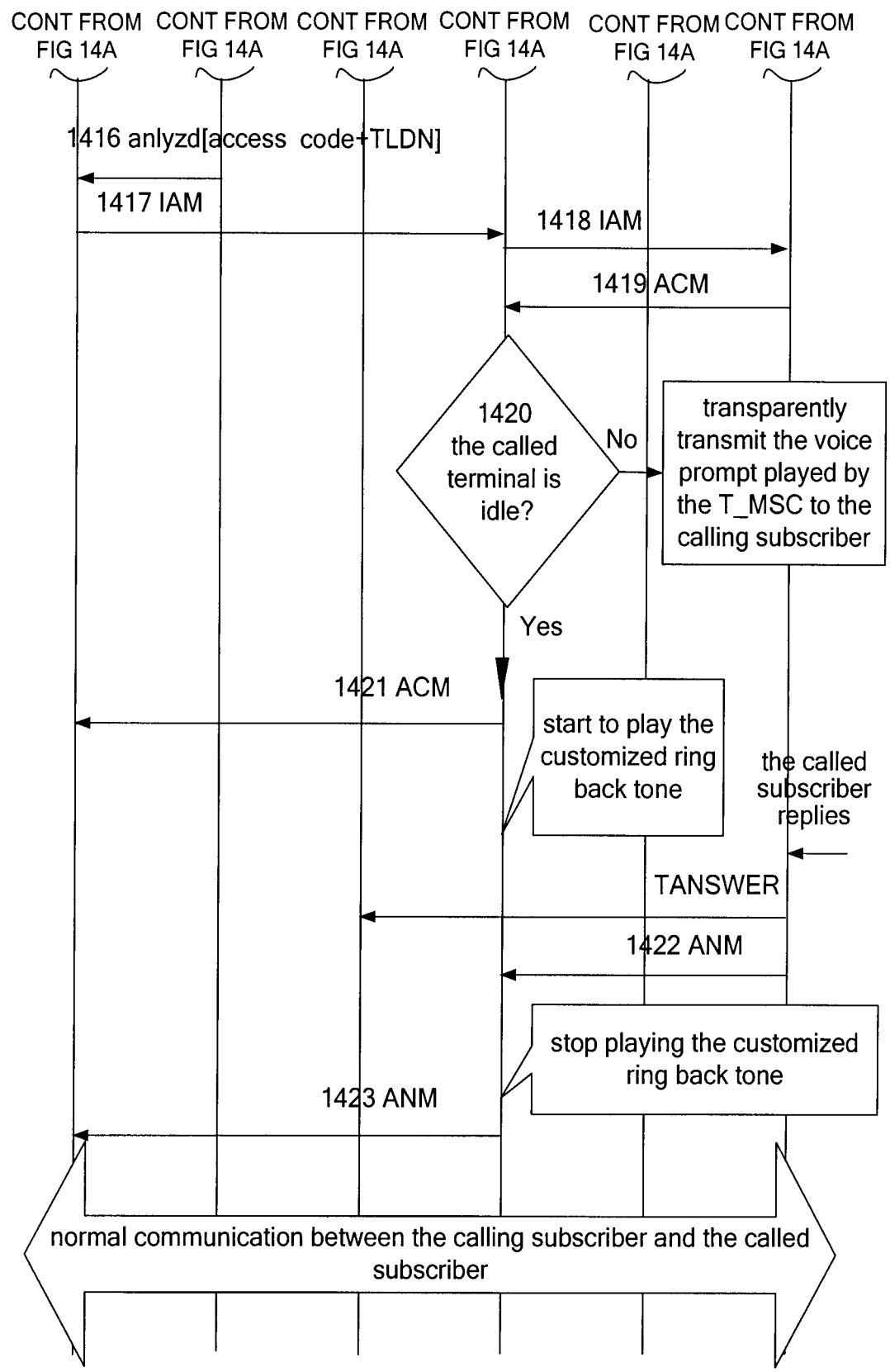

In the method according to the ninth embodiment shown in FIG. 14, in step 1401, when the calling subscriber initiates a call to called terminal B via calling terminal A, the O_MSC receives the call from calling terminal A, triggers a Mobile_Termination trigger, and sends LOCREQ message to the HLR to which the called terminal is attached in order to ask for routing information of the called subscriber. Here, the LOCREQ message includes called number of the called subscriber and other information.

In step 1402, the HLR searches the contract information of the called subscriber according to the called number, and then sends the information to the O_MSC through answer message locreq which at least includes Initial_Termination trigger whose corresponding SCP is intelligent service SCP. Here, because the triggering mode adopted in the embodiment is intelligent network triggering, the called subscriber is registered as an intelligent network subscriber, contract information of the called subscriber includes the information indicating the called subscriber is an intelligent network subscriber.

In step 1403, after receiving the contract information of the called subscriber, the O_MSC finds that the called subscriber is an intelligent network subscriber, and therefore triggers an Initial_Termination trigger to ask the SCP to authenticate the called subscriber. Because the SCP to which the Initial_Termination trigger corresponds is ring back tone SCP, the O_MSC sends ANLYZD to the ring back tone SCP to ask the SCP to make authentication for the called subscriber.

In step 1404, after the authentication is completed, the ring back tone SCP judges whether the called subscriber is a ring back tone service registered subscriber according to ring back tone service register information of the called subscriber stored in the SCP. If so, the ring back tone SCP sends SEARCH message to the HLR to which the called terminal is attached. Else, prior call procedure will be executed.

In step 1405, the HLR returns address of the intelligent service SCP for the called subscriber to the ring back tone SCP by means of answer message search.

In step 1406, the ring back tone SCP forwards the ANLYZD message received in step 1403 to the intelligent service SCP according to the received address of the intelligent service SCP.

In step 1407, after receiving the ANLYZD message, the intelligent service SCP returns answer message anlyzd to the ring back tone SCP. Here, the parameter of ActionCode is used to represent processing result of the intelligent service SCP.

In step 1408, after receiving anlyzd message from the intelligent service SCP, the ring back tone SCP sends message anlyzd which is a response message corresponding to ANLYZD message to the O_MSC according to the ActionCode in the message, and instructs the O_MSC to implement operations corresponding to the processing result of the intelligent service SCP. Here, assume the ring back tone SCP instructs the O_MSC to continue call processing. Of course, it is known if the instruction to the O_MSC is to stop operation, the procedure will be ended. In case of the instruction to the O_MSC is to continue call processing, the trigger list of the anlyzd message includes Advanced_Termination trigger whose SCP address is the address of the ring back tone SCP.

In step 1409, the O_MSC triggers the Advanced_Termination trigger, and sends ANLYZD to the ring back tone SCP.

In steps 1410 to 1413, the ring back tone SCP sends LOCREQ message to the HLR in order to obtain route information of the called subscriber. The HLR sends route request message ROUTREQ to the T_MSC. After receiving the message, the T_MSC assigns a TLDN number to the called subscriber, and then sends the TLDN number to the HLR by means of answer message routreq. The HLR in turn transmits the TLDN number to the ring back tone SCP by means of answer message locreq.

In steps 1414 and 1415, the ring back tone SCP sends the intelligent service SCP an ANLYZD in which the trigger is CDRAA. And the intelligent service SCP returns the Action-Code that represents the processing result. Here, assume the processing result is to continue the call processing.

In step 1416, the ring back tone SCP sends anlyzd message to the O_MSC. Here, the called number is roaming number of the called subscriber with a routing prefix which is a routing number of the RBTS, while the roaming number of the called subscriber is TLDN.

The steps 1417 to 1423 are similar with steps 1216 to 1222 shown in FIG. 12A, and the description thereof will be omitted.

Figure 15A:
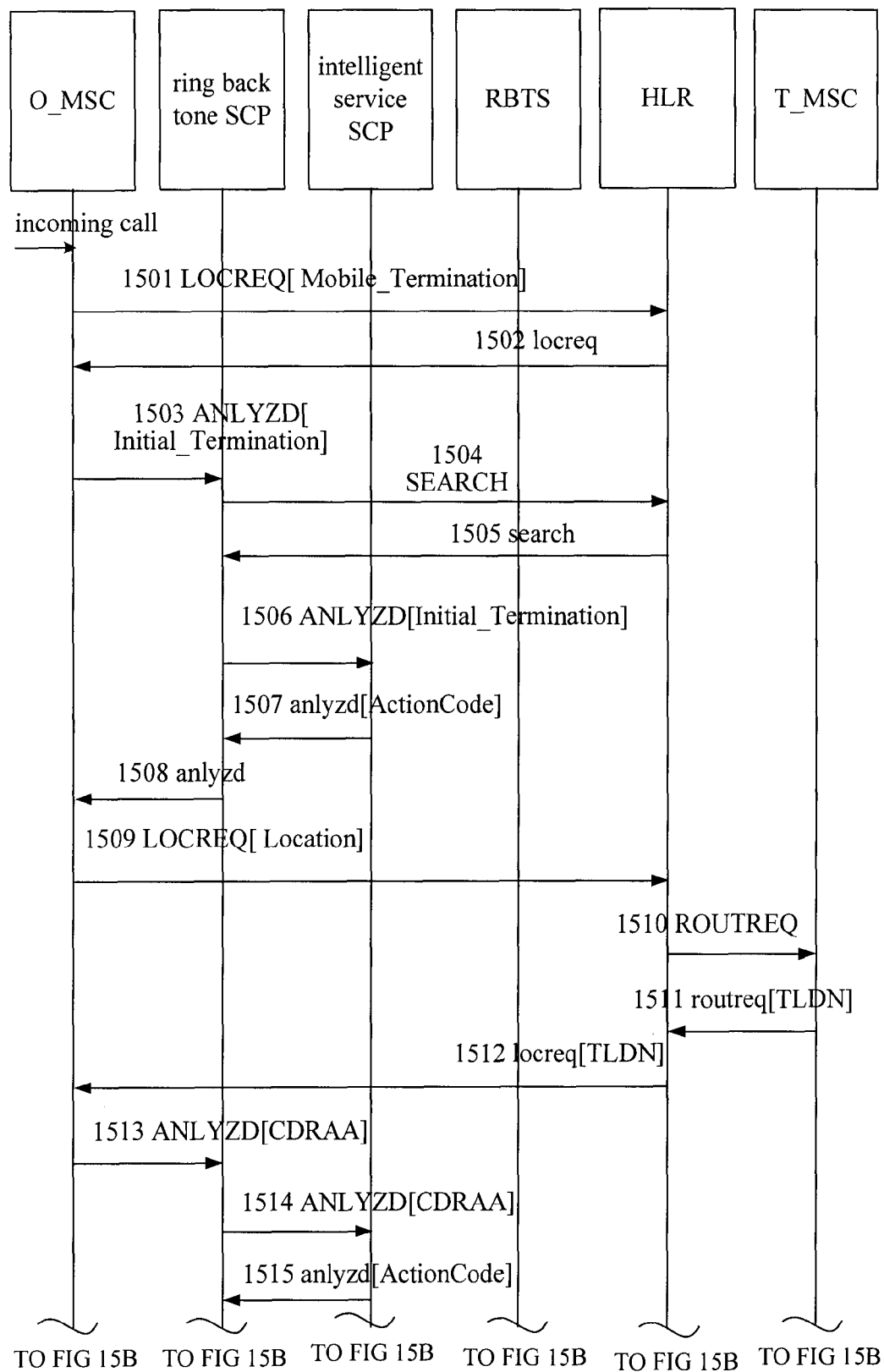
FIG. 15 is a signaling flowchart according to the tenth embodiment of the present invention.
Figure 15B:
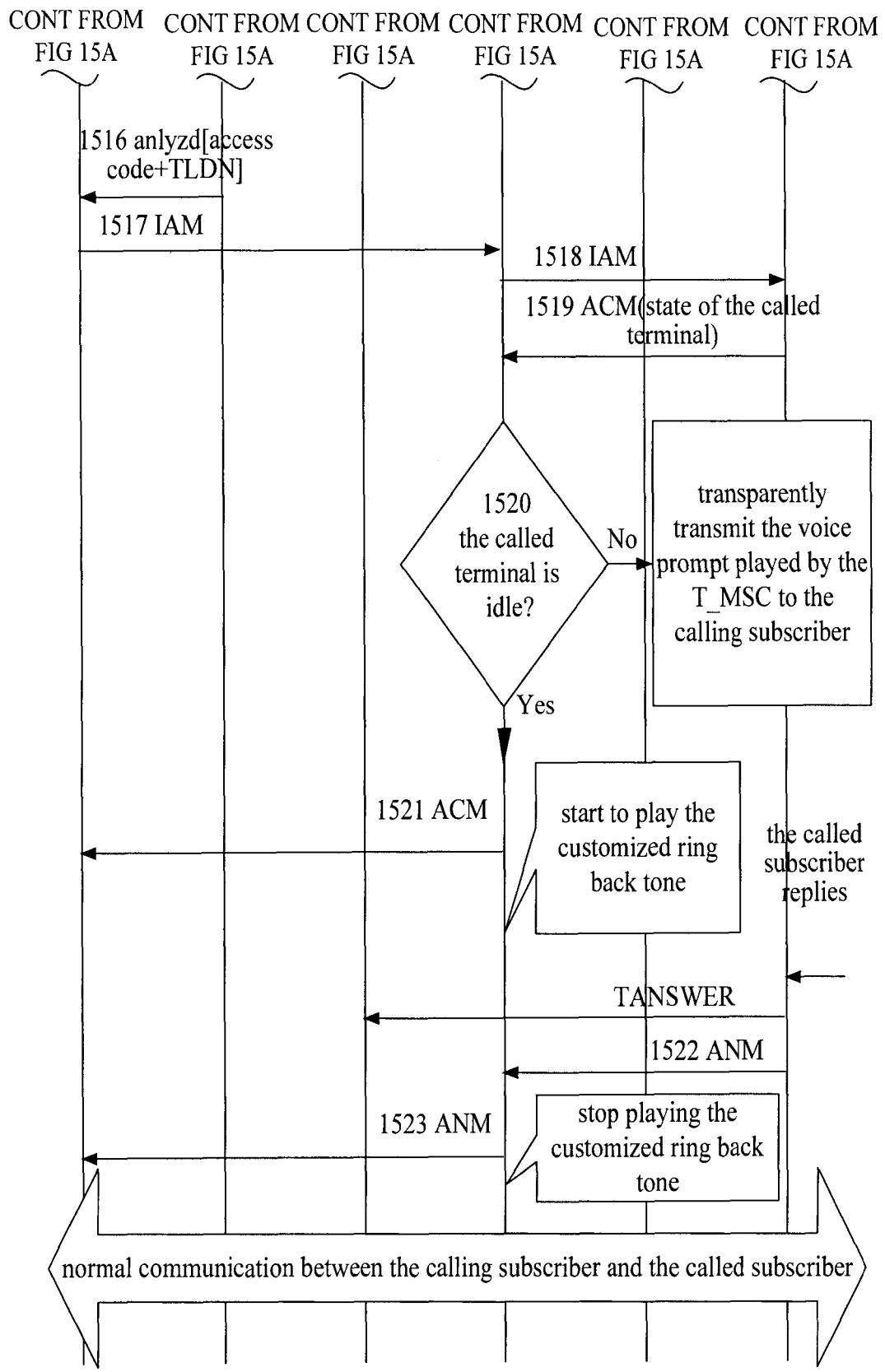

If the MSC supports CDRAA renumbering, while the HLR does not supports the case that different triggers registered at different SCPs, the seventh, eighth and ninth embodiments above will be unpractical. In order to solve this shortage, a method according to the tenth embodiment shown in FIG. 15 is proposed. In the tenth embodiment, all the addresses of the SCPs corresponding to the triggers of the HLR will be changed to the address of the ring back tone SCP.

In step 1501, when the calling subscriber initiates a call to called terminal B via calling terminal A, the O_MSC receives the call from calling terminal A, triggers a Mobile_Termination trigger, and sends LOCREQ message to the HLR to which the called terminal is attached in order to ask for routing information of the called subscriber, wherein the LOCREQ message includes called number of the called subscriber and other information.

In step 1502, the HLR searches the contract information of the called subscriber according to the called number, and then sends the information to the O_MSC through answer message locreq which at least includes Initial_Termination trigger whose corresponding SCP is intelligent service SCP. Here, because the triggering mode adopted in the embodiment is intelligent network triggering, and the called subscriber is registered as an intelligent network subscriber, contract information of the called subscriber includes the information indicating the called subscriber is an intelligent network subscriber.

In steps 1503 and 1504, after receiving the contract information of the called subscriber, the O_MSC finds the called subscriber is an intelligent network subscriber, and therefore triggers Initial_Termination trigger to ask the SCP to authenticate the called subscriber. Because the SCP to which Initial_Termination trigger corresponds is ring back tone SCP, the O_MSC sends ANLYZD to the ring back tone SCP to ask this SCP to make authentication for the called subscriber. After the authentication is completed, the ring back tone SCP judges whether the called subscriber is a ring back tone service registered subscriber according to the ring back tone service register information of the called subscriber stored in the SCP. If so, the ring back tone SCP sends SEARCH message to the HLR to which the called terminal is attached in order to obtain the SCP address which is used in providing other intelligent services to the called subscriber. Else, prior call procedure will be executed. Here, assume the called subscriber has already registered the ring back tone service.

In step 1505, after receiving the message, the HLR returns the SCP address which is used in providing other intelligent services to the called subscriber to the ring back tone SCP through answer message search.

In step 1506, the ring back tone SCP forwards the ANLYZD message received in step 1503 to the intelligent service SCP according to the received address of the intelligent service SCP.

In step 1507, after receiving the ANLYZD message, the intelligent service SCP returns answer message anlyzd to the ring back tone SCP. Here, the parameter of action code ActionCode is used to represent processing result of the intelligent service SCP.

In step 1508, after receiving anlyzd message from the intelligent service SCP, the ring back tone SCP sends response message anlyzd for ANLYZD message to the O_MSC according to the parameter ActionCode in the message, and instructs the O_MSC to implement operations corresponding to the processing result of the intelligent service SCP. Here, assume the ring back tone SCP instructs the O_MSC to continue call processing. Of course, it can be understood if the instruction to the O_MSC is to stop operation, the procedure will be ended. In case of the instruction to the O_MSC is to continue call processing, the anlyzd message further includes RBTS access code and roaming number of the called subscriber.

In steps 1509 to 1512, the O_MSC sends LOCREQ message to the HLR in order to obtain route information of the called subscriber. The HLR sends route request message ROUTREQ to the T_MSC. After receiving the message, the T_MSC assigns a TLDN number to the called subscriber, and then sends the TLDN number to the HLR by means of answer message routreq. After that, the HLR sends TLDN number to the O_MSC by means of answer message locreq.

In step 1513, the O_MSC detects CDRAA trigger and triggers this trigger, because the SCP address that the CDRAA trigger corresponds is address of the ring back tone SCP, the O_MSC sends ANLYZD message to the ring back tone SCP.

In steps 1514 and 1515, the ring back tone SCP sends ANLYZD to the intelligent service SCP. And then the intelligent service SCP returns ActionCode that represents processing result. Here, assume the processing result is to continue call processing.

In step 1516, the ring back tone SCP sends the O_MSC anlyzd message in which the ActionCode instructs the O_MSC to continue call processing. At the same time, the called number with a routing prefix is sent to the O_MSC as a called number. Here, the routing prefix is routing number of the RBTS, while roaming number of the called subscriber is TLDN.

The steps 1517 to 1523 are similar with steps 1216 to 1222 shown in FIG. 12A, the description thereof will be omitted.

Figure 16A:
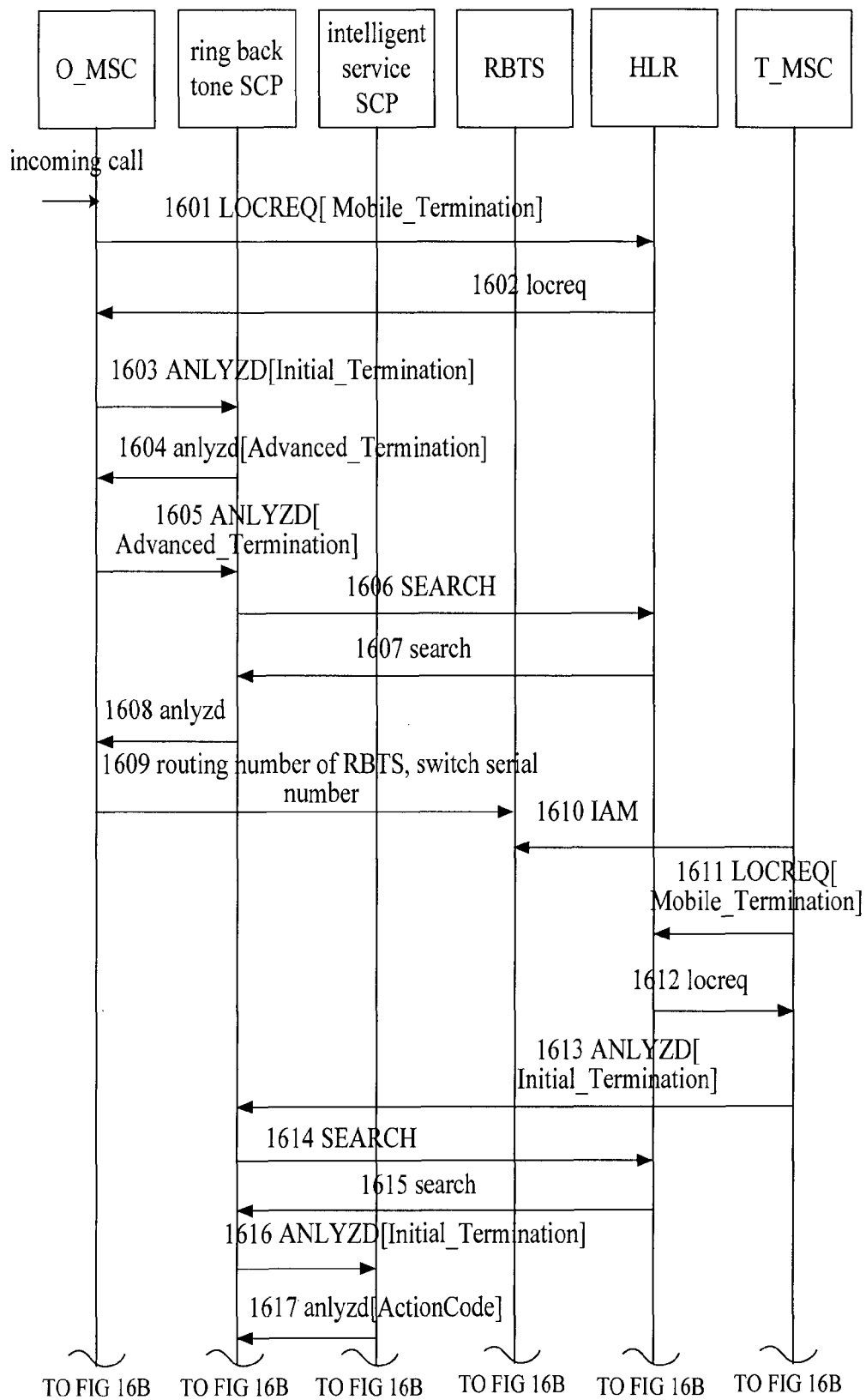
FIG. 16 is a signaling flowchart according to the eleventh embodiment of the present invention.
Figure 16B:
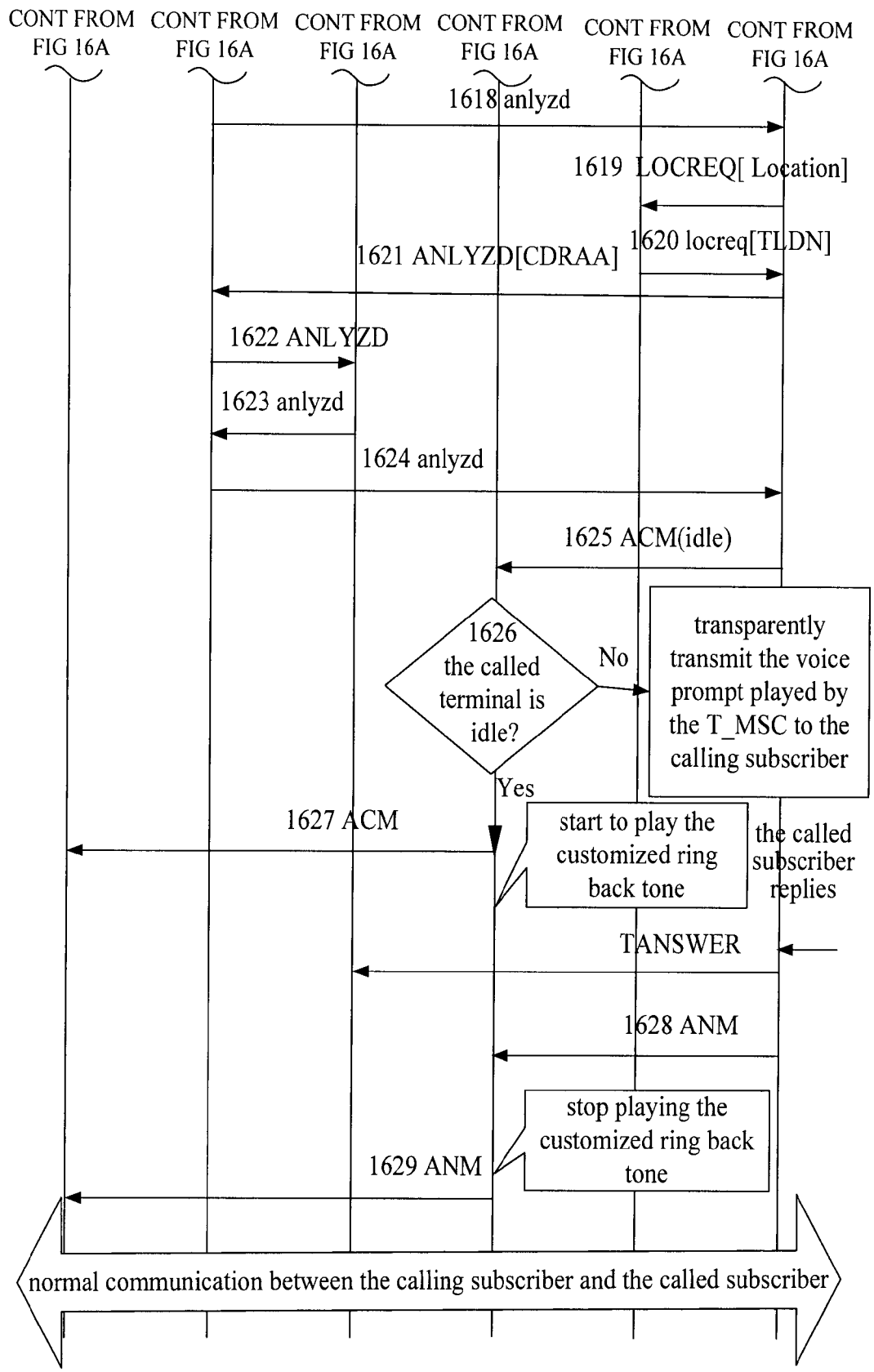

In case that the MSC does not support CDRAA renumbering, and the HLR does not support the case that different triggers registered at different SCPs, a method according to the eleventh embodiment shown in FIG. 16 is proposed. In the eleventh embodiment, like the case above, all the addresses of the SCPs corresponding to the triggers of the HLR will be changed to the address of the ring back tone SCP.

Steps 1601 to 1620 are similar with steps 1301 to 1320 shown in FIG. 13, the description thereof will be omitted.

In step 1621, the T_MSC detects CDRAA trigger, because its corresponding SCP address is a ring back tone SCP, the T_MSC triggers the CDRAA trigger and sends ANLYZD message to the ring back tone SCP.

In step 1622, after receiving the message, the ring back tone SCP forwards the message to the intelligent service SCP.

In steps 1623 and 1624, after analyzing the message, the intelligent service SCP returns answer message anlyzd to the T_MSC via the ring back tone SCP. Here, the parameter of action code ActionCode is used to represent processing result of the intelligent service SCP. Here, assume the processing result is to instruct the T_MSC to continue the call processing.

In step 1625, the T_MSC pages the called subscriber and sends state information of the called terminal to the RBTS by means of the ACM.

In step 1626, the RBTS judges whether the called terminal is idle based on the ACM. If so, in step 1627, the RBTS sends an IAM to the O_MSC, searches ring back tone customized by the called subscriber according to the MDN number of the called subscriber, and plays the ring back tone to the calling subscriber via the O_MSC, meanwhile screens the traditional ring back tone played by the T_MSC. And then the subsequent steps will be executed. If the called terminal is not idle, for example, busy, shutdown or out of service range, the RBTS will transparently transmit the voice prompt played by the T_MSC that represents busyness, shutdown or out of service range to the calling subscriber via the O_MSC, rather than playing the ring back tone to the calling subscriber.

In step 1628, when the called subscriber picks up the phone and answers the call, the T_MSC sends TANSWER message to the intelligent service SCP via the ring back tone service SCP, notifying the intelligent service SCP to start charging operation, and sends an ANM to the RBTS at the same time.

In step 1629, after receiving the ANM, the RBTS sends an ANM to the O_MSC, stops playing ring back tone to the calling subscriber simultaneously, and establishes a voice channel between the O_MSC and the T_MSC to enable communication between the calling subscriber and the called subscriber.

In addition, under the condition that the SCP sends roaming number of the called subscriber with routing prefix to the O_MSC or original number of the called subscriber with routing prefix, the routing prefix is routing number of the RBTS. Because MSCs of different areas are configured separately in practice, when a roaming call is initiated in a certain area, it is possible that no route data of the MSCs have been configured in other areas, making roaming through out the whole network difficult to be implemented. Therefore, the present invention provides the twelfth embodiment shown in FIG. 17.

In this embodiment, a roaming number segment is assigned to the RBTS in advance, the format of the roaming numbers in the roaming number segment is the same as that of a conventional roaming number. The roaming numbers in the roaming number segment are reserved numbers with configured routing data in the mobile network, therefore, the roaming number segment is supported by the MSCs throughout the whole network, and a call can be routed to the RBTS based on a number in the segment.

In step 1701, when the calling subscriber initiates a call to called terminal B via calling terminal A, the O_MSC receives the call from calling terminal A, and sends a request for obtaining route information of the called subscriber to the HLR to which the called terminal is attached. Here, the request includes information such as number of the called subscriber etc.

In step 1702, the HLR finds that the called subscriber is an intelligent network subscriber according to the called number, and sends T-CSI information of the called subscriber to the O_MSC. Because the triggering operation is implemented through intelligent network triggering in this embodiment, the called subscriber is registered as an intelligent network subscriber, and contact information of the called subscriber is stored in the HLR.

In step 1703, after obtaining contract information of the called subscriber, the O_MSC finds the called subscriber is an intelligent network subscriber, and therefore sends the call related information to the SCP. Here, the call related information at least includes a calling number and a called number. As for GSM network, the call related information is sent by means of IDP message, while as for CDMA network, the information is sent by means of ANLYZD message.

In step 1704, after making authentication for the called subscriber, the SCP judges whether the called subscriber is a ring back tone service registered subscriber according to the ring back tone service register information of the called subscriber stored in the SCP. If so, the following steps will be executed. Else, prior call processing will be implemented.

In step 1705, the SCP assigns an unoccupied roaming number that points to the RBTS for the called subscriber in the roaming number segment, which is called a first roaming number hereinafter, and sets the number as "busy", which indicates the roaming number is in use. At the same time, the SCP records the correspondence relationship between the first roaming number and original called number. And then, the SCP sends the first roaming number to the O_MSC.

In step 1706, through analyzing the received first roaming number, the O_MSC finds that routing address of the number is RBTS, and sends an IAM to the RBTS. Here, the called number is the first roaming number and the calling number is the number of the calling subscriber. At the same time, the call is connected to the RBTS.

In step 1707, after receiving the IAM, the RBTS sends a request for obtaining subscriber number to the SCP. Here, the message includes the first roaming number.

In steps 1708 to 1711, the SCP obtains called number from the correspondence relationship recorded in advance according the first roaming number, and sets the first roaming number as "idle" to enable its usage for the ring back tone service. After that, the SCP sends a request for obtaining routing number to the HLR to which the called terminal is attached. After receiving the request, the HLR sends a request for obtaining roaming number of the called subscriber to the T_MSC which assigns a roaming number for the called subscriber and then sends the roaming number to the HLR. By means of a response message for the request for obtaining routing number, the HLR sends the roaming number assigned for the called subscriber by the T_MSC to the SCP. As for GSM network, the roaming number is MSRN, while for CDMA network, the roaming number is TLDN.

In steps 1712 and 1713, the SCP sends MSRN/TLDN to the RBTS. After receiving the roaming number from the SCP, the RBTS sends the calling number and MSRN/TLDN of the called subscriber to the T_MSC by means of IAM.

Steps 1714 to 1718 are similar with steps 512 to 516 shown in FIG. 5, the description thereof will be omitted hereinafter.

Figure 18A:
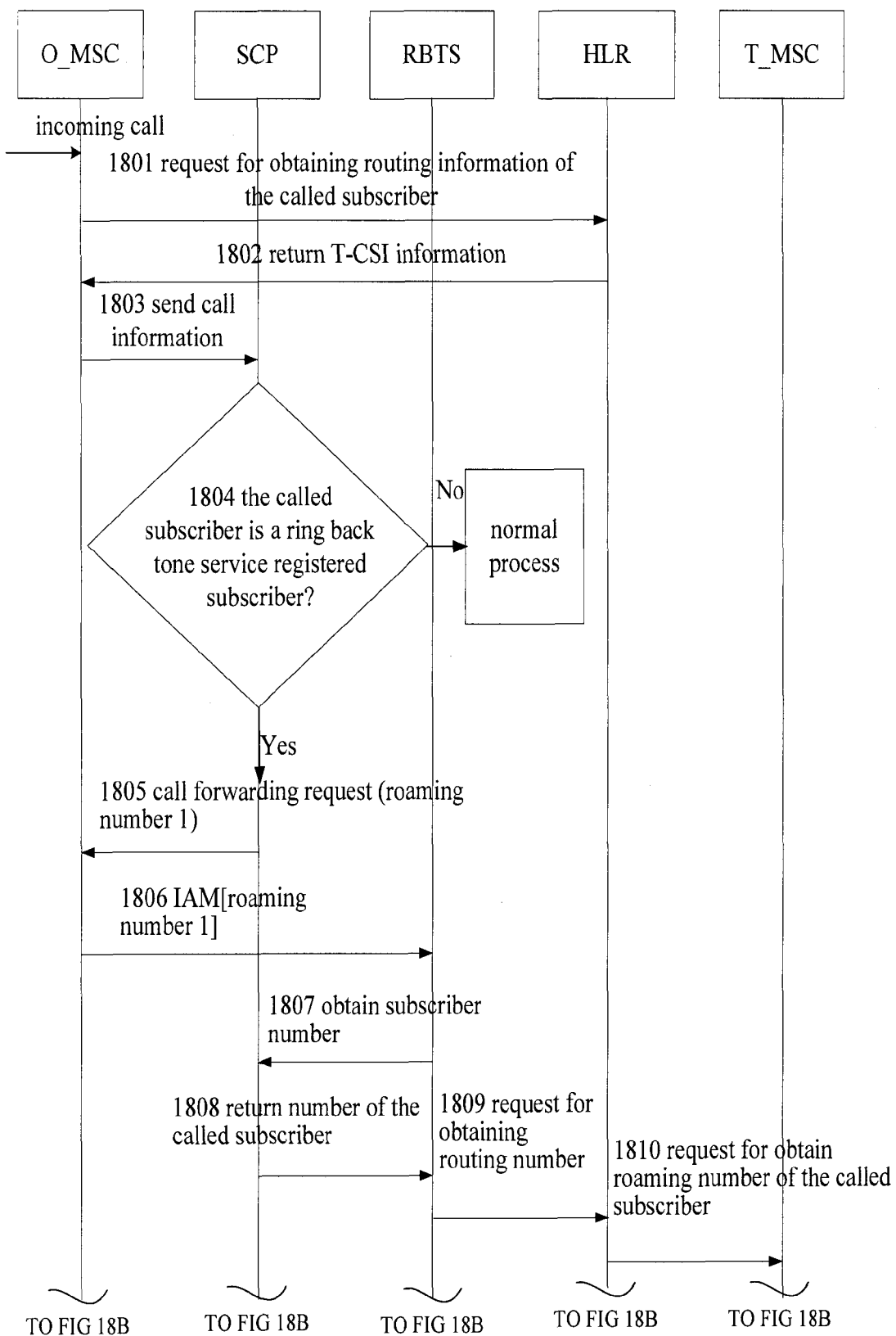
FIG. 18 is a signaling flowchart according to the thirteenth embodiment of the present invention.
Figure 18B:
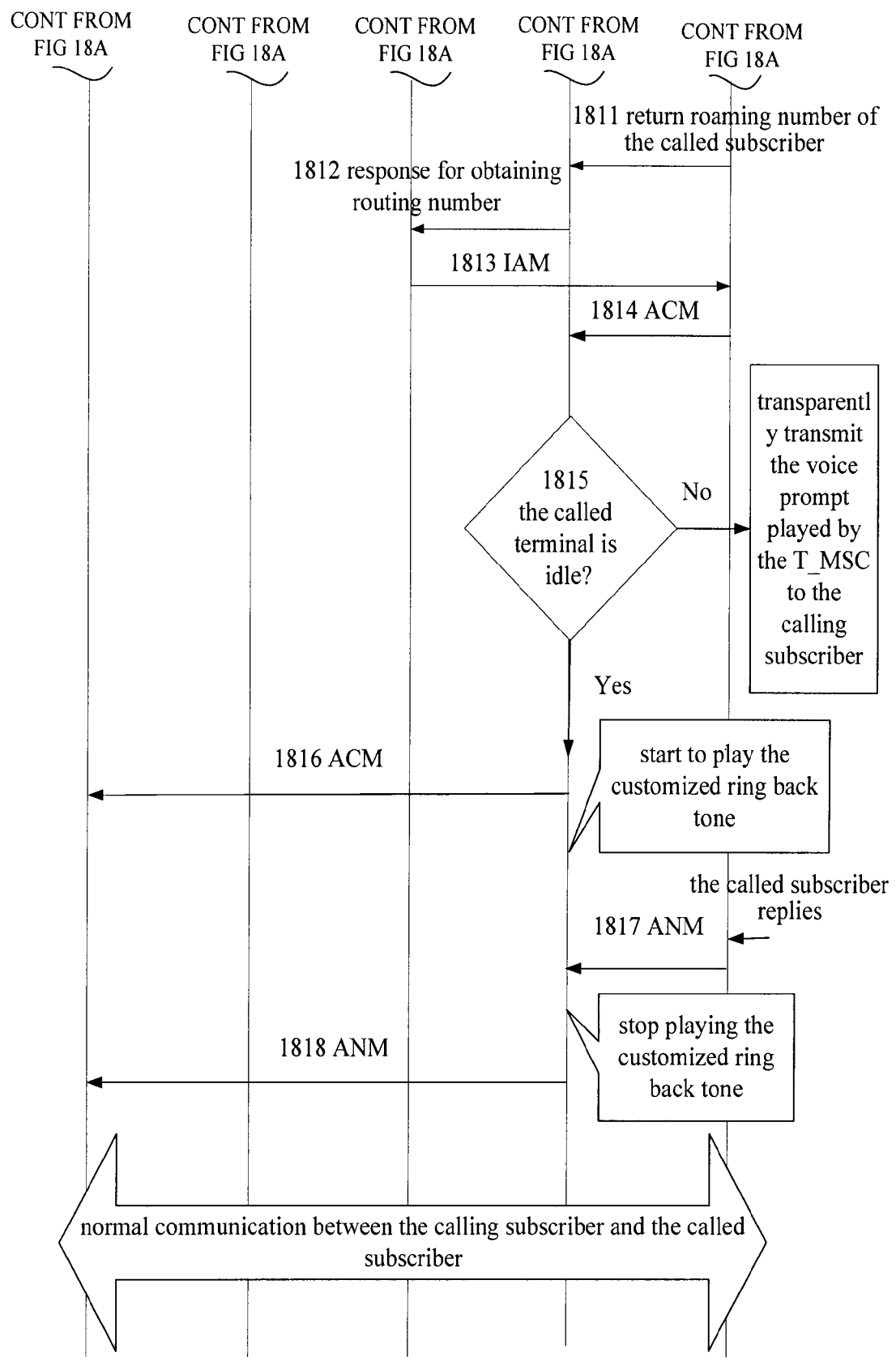

In this embodiment, the SCP obtains roaming number of the called subscriber from the HLR, and sends the roaming number to the RBTS. In practice, with reference to the thirteenth embodiment shown in FIG. 18, the RBTS can also obtain the roaming number directly from the HLR.

Figure 17A:
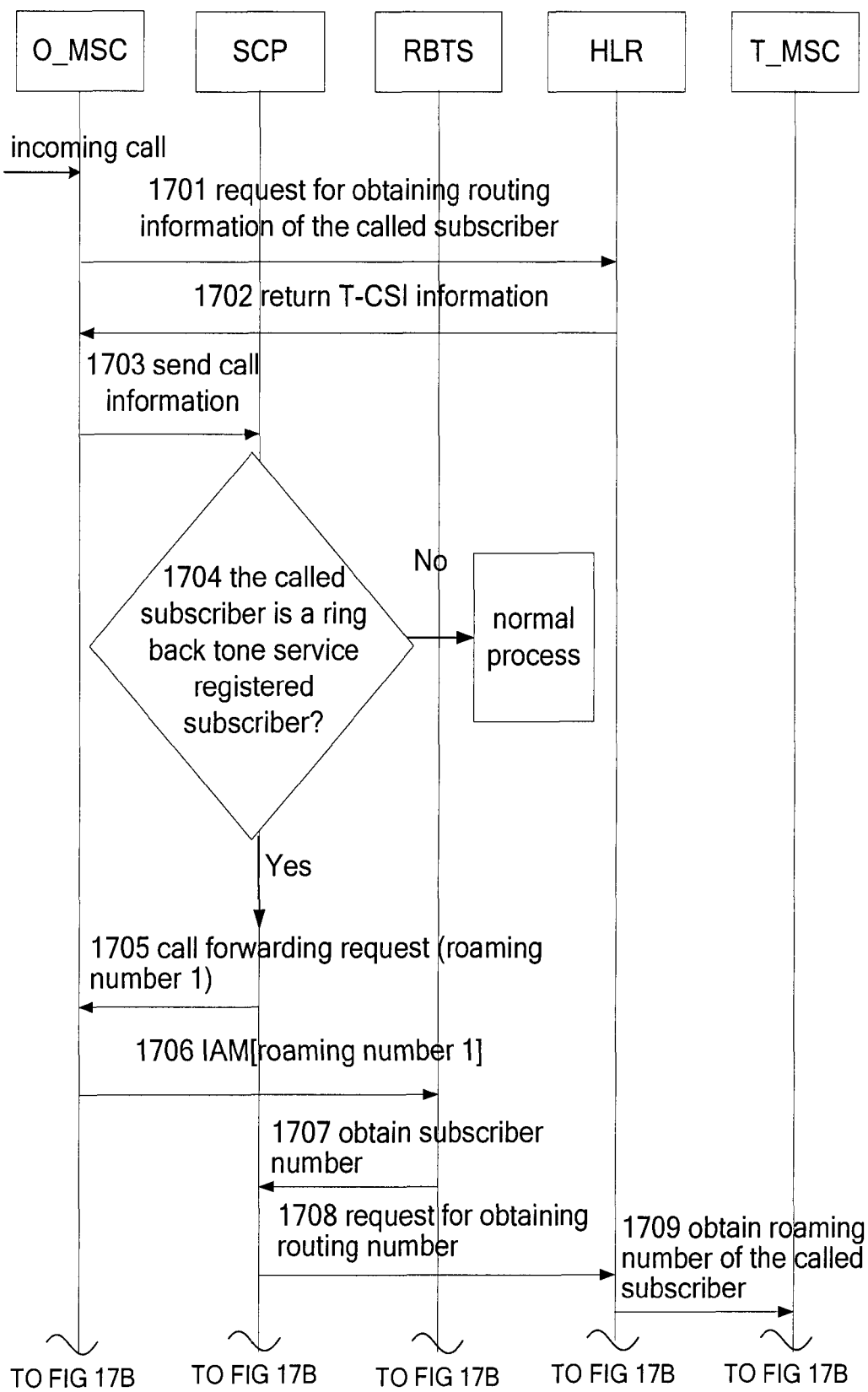
FIG. 17 is a signaling flowchart according to the twelfth embodiment of the present invention.
Figure 17B:
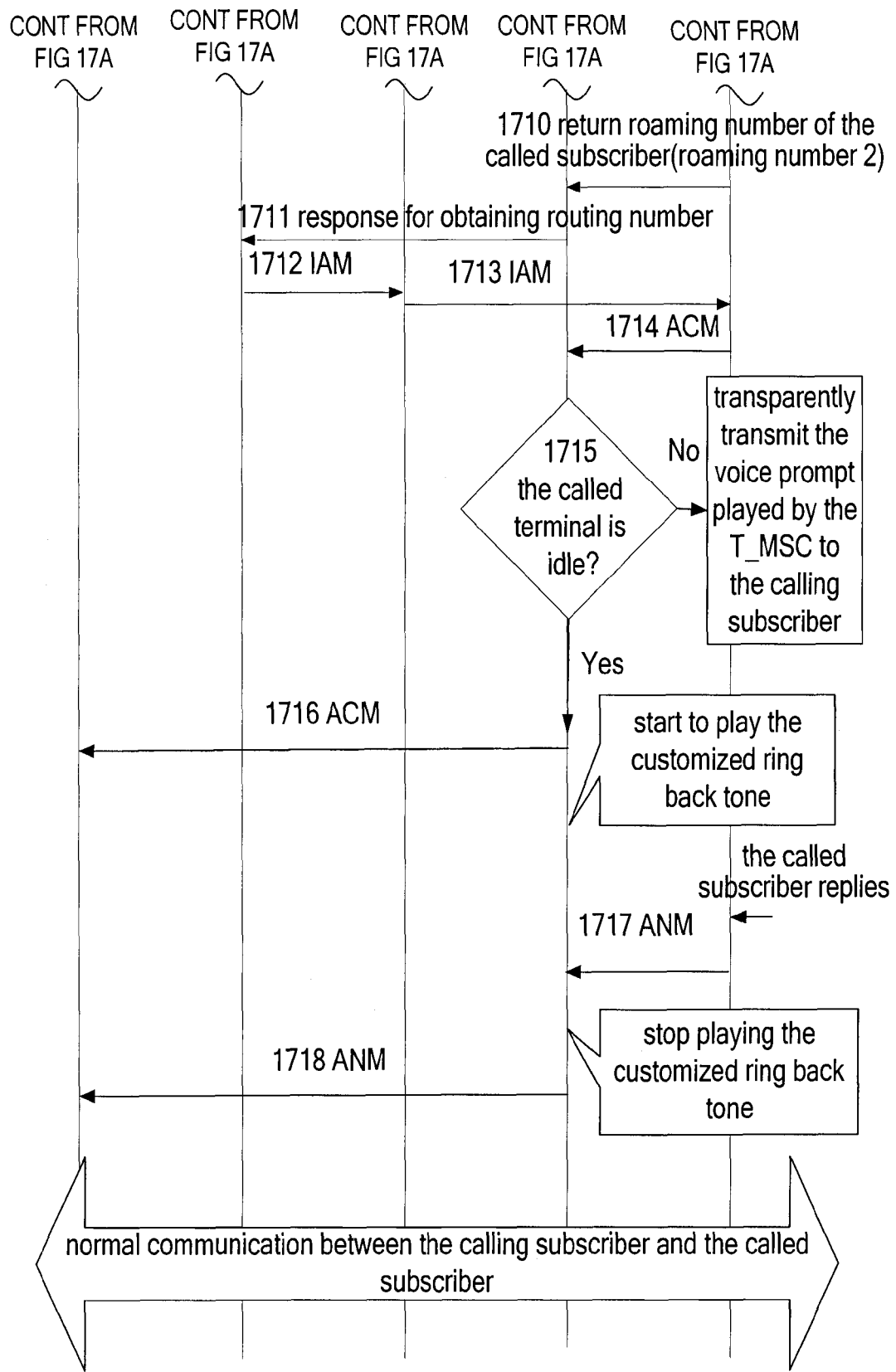

In this embodiment, steps 1801 to 1807 are similar with steps 1701 to 1707 shown in FIG. 17, the description thereof will be omitted herein.

In step 1808, the SCP obtains called number from the correspondence relationship recorded in advance according the first roaming number, and sets the first roaming number as "idle" to enable its usage for new ring back tone services, and then returns the called number to the RBTS.

In steps 1809 to 1812, the RBTS sends a request for obtaining routing number to the HLR to which the called terminal is attached. After receiving the request, the HLR sends a request for obtaining roaming number of the called subscriber to the T_MSC, and the T_MSC assigns a roaming number for the called subscriber, and then sends the roaming number to the HLR which afterwards sends the roaming number assigned by the T_MSC for the called subscriber by means of a response message for the request for obtaining routing number to the RBTS. As for GSM network, the roaming number is MSRN, while as for CDMA network, the roaming number is TLDN.

In step 1813, after receiving the roaming number from the HLR, the RBTS sends calling number and roaming number of the called subscriber to the T_MSC by means of IAM.

The following steps 1814 to 1818 are similar with steps 1714 to 1718 shown in FIG. 17, the description thereof will be omitted herein.

It can be understood in the twelfth and the thirteenth embodiments, the RBTS can also leave the roaming number alone first, but send subscriber number to the GMSC or MSC of the called subscriber, and then obtain roaming number by means of two service triggering operations shown in the fourth or the fifth embodiment, thereby the call between the calling and the called subscribers can be connected.

In addition, not all MSCs in prior mobile communication network support the ring back tone service, therefore, it is reasonable to judge whether the O_MSC supports ring back tone service before confirming the called subscriber is an intelligent network subscriber in the intelligent network triggering mode. If so, the subsequent steps will be executed, else, the SCP notifies the O_MSC to operate according to the prior calling routine. Here, the way to judge whether the O_MSC supports the ring back tone service can be, but not limited to, judging whether the roaming place of the calling subscriber supports routing prefix of the area that the called subscriber locates.

Figure 19B:
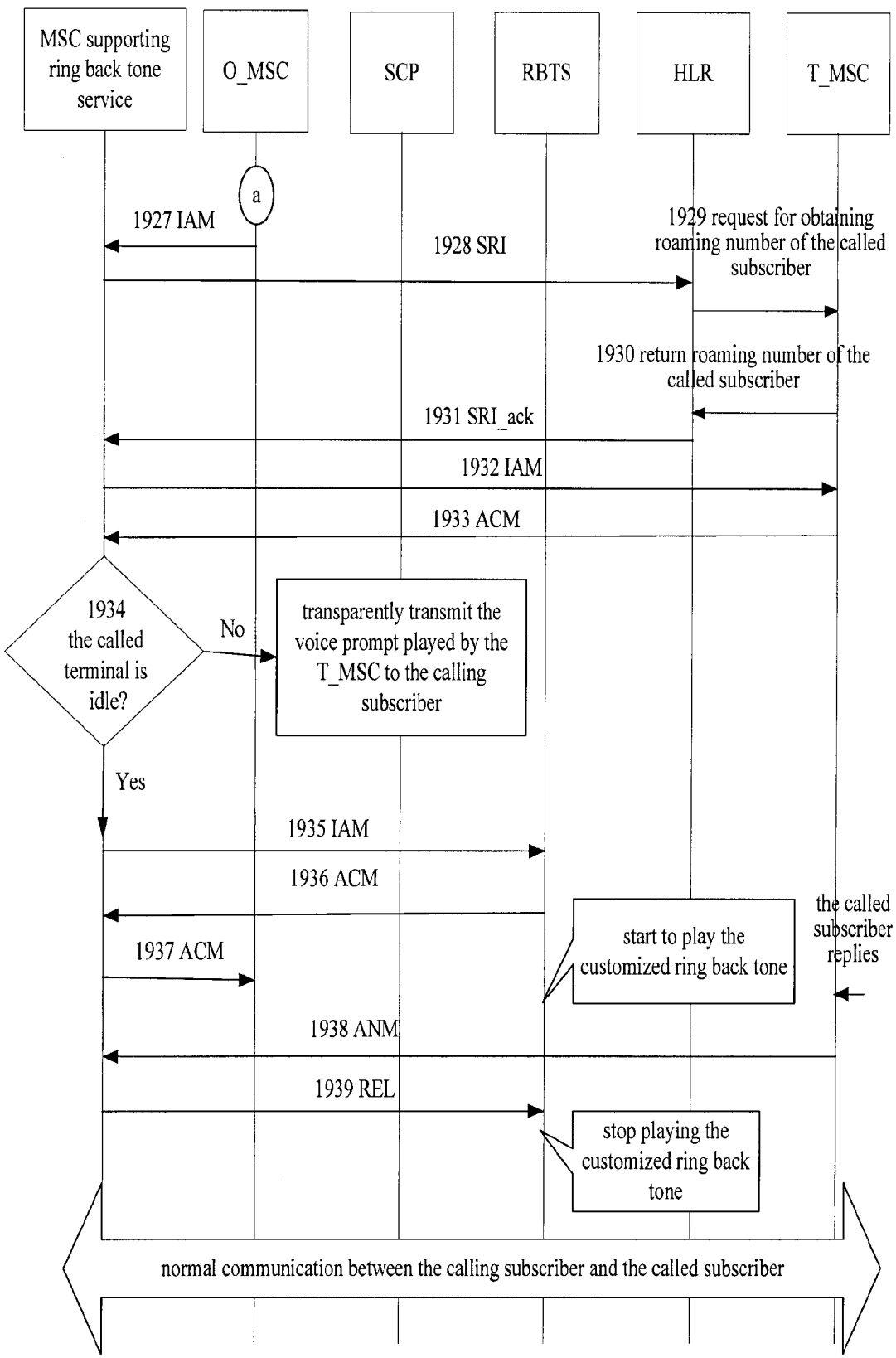

If only some of MSCs in the system can support the ring back tone service while others can not, it is advisable to route call to the MSC not supporting the ring back tone service to a MSC supporting the service. Under above circumstances, if the SCP confirms that an O_MSC can not support the ring back tone service, the SCP can select another MSC that supports ring back tone service, and instructs the O_MSC to route the call to the selected MSC, through which the RBTS play the ring back tone to the calling subscriber. Therefore, the present invention provides the fourteenth embodiment shown in FIGS. 19A and 19B. Here, FIG. 19A shows the calling routine under the condition that O_MSC supports the ring back tone service, while FIG. 19B shows the calling routine under the condition that O_MSC does not support the ring back tone service.

In step 1901, when the calling subscriber initiates a call to called terminal B via calling terminal A, the O_MSC sends a request for obtaining routing information of the called subscriber to the HLR to which the called terminal is attached after receiving the call request from calling terminal A. Here, the request includes the called number which is MSISDN of the called subscriber.

In step 1902, the HLR finds the called subscriber is an intelligent network subscriber based on the called number, and so sends contract information of the called subscriber to the O_MSC. Since the triggering operation is carried out with intelligent network triggering in the embodiment, the called subscriber is registered as an intelligent network subscriber. In this way, contract information of the called subscriber is stored as T-CSI information.

In step 1903, after receiving T-CSI information of the called subscriber, the O_MSC finds that the called subscriber is an intelligent network subscriber, and therefore sends the call related information to the SCP. The call related information at least includes calling number, called number and MSCID of the O_MSC.

In step 1904, the SCP judges whether the called subscriber is a ring back tone service registered subscriber according to the ring back tone register information of the called subscriber saved in itself. If so, the following steps will be executed. Else, the prior calling routine will be implemented.

In step 1905, based on the MSCID of the O_MSC, the SCP judges whether corresponding MSC supports the ring back tone service, if so, the SCP sends MSCID of the O_MSC, routing number of the RBTS and called number to the O_MSC. Else, the SCP selects a MSCID of the MSC that supports ring back tone service with a pre-defined algorithm, and sends the MSCID, routing number of the RBTS and called number to the O_MSC. The pre-defined algorithm can be load share method, which means selecting MSCID from the list of candidate that supports ring back tone service in order.

In step 1906, the O_MSC judges whether the received MSCID is the same as that of its own, if they are the same, as shown in FIG. 19A, the O_MSC directly sends SRI request for obtaining roaming number of the called subscriber to the HLR in step 1907. Else, as shown in FIG. 19B, the O_MSC sends an IAM via the MSC corresponding to the received MSCID in step 1927.

In steps 1908 to 1910, the HLR sends a request for obtaining roaming number of the called subscriber to the T_MSC which in turn assigns a roaming number to the called subscriber, and then sends the number to the HLR. And the HLR sends the roaming number to the O_MSC.

In step 1911, the O_MSC sends an IAM message that includes roaming number of the called subscriber to the T_MSC, and consequently connects the call to the T_MSC.

In step 1912, the T_MSC pages the called subscriber and sends state information of the called terminal to the O_MSC by means of an ACM.

In step 1913, the O_MSC judges whether the called terminal is idle based on the ACM, if so, the subsequent steps will be executed, else, the O_MSC transparently transmit the voice prompt played by the T_MSC which represents busyness, shutdown or out of service range to the calling subscriber via the O_MSC.

In step 1914, the O_MSC sends an IAM to the RBTS, and sends calling number, called number and other information to the RBTS via the IAM.

In step 1915, the RBTS searches the ring back tone customized by the called subscriber according to the called number, and then sends an ACM to the O_MSC. At the same time, the RBTS plays the ring back tone customized by the called subscriber to the calling subscriber via the O_MSC, and the O_MSC screens the traditional ring back tone played by the T_MSC in this time.

In step 1916, when the called subscriber picks up the phone and answers the call, the T_MSC sends an ANM to the O_MSC.

In step 1917, after receiving the ANM, the O_MSC disconnects route to the RBTS immediately, and subsequently stops playing the ring back tone to the calling subscriber, but maintains the route between the O_MSC and the T_MSC simultaneously, keeping voice channel between the calling and called subscribers.

While finding that the received MSCID is different from that of itself in step 1906, the O_MSC will send an IAM to the MSC corresponding to the received MSCID in step 1927. The IAM includes the received MSCID, routing number of the RBTS and the called number.

In step 1928, after the MSC that received the IAM confirms that the received MSCID is different from the MSCID of its own, the MSC sends a SRI request of obtaining roaming number of the called subscriber to the HLR.

In steps 1929 to 1931, the HLR sends a request for obtaining roaming number of the called subscriber to the T_MSC which in turn assigns a roaming number to the called subscriber, and then sends the number to the HLR which sends the roaming number afterwards to the MSC that supports ring back tone service.

In step 1932, the MSC that supports ring back tone service sends an IAM message including MSRN of the called subscriber to the T_MSC, and thereby connects the call to the T_MSC.

In step 1933, the T_MSC pages the called subscriber and sends state information of the called subscriber to the MSC that supports ring back tone service by means of ACM.

In step 1934, the MSC that supports ring back tone service judges whether the called terminal is idle according to the ACM, if so, the subsequent steps will be executed, else, the MSC transparently transmits the voice prompt that presents busyness, shutdown or out of service range played by the T_MSC, and ends the procedure.

In step 1935, the MSC that supports ring back tone service sends an IAM to the RBTS, and sends information such as calling number, called number to the RBTS by means of the IAM.

In step 1936, the RBTS searches the ring back tone customized by the called subscriber according to the called number, and sends an ACM to the MSC that supports ring back tone service.

In step 1937, the MSC that supports ring back tone service sends an ACM to the O_MSC, and the RBTS plays ring back tone customized by the called subscriber to the calling subscriber via the MSC, at the same time, the MSC screens the traditional ring back tone played by the T_MSC.

In step 1938, when the called subscriber picks up the phone and answers the call, the T_MSC sends an ANM to the MSC that supports ring back tone service.

In step 1939, after receiving the ANM, the MSC that supports ring back tone service disconnects the route to the RBTS immediately, and subsequently stops playing the ring back tone to the calling subscriber, but maintains the route between the O_MSC and the T_MSC, keeping the voice channel between the calling and called subscribers.

With help of the embodiment, under the condition that the O_MSC cannot support the ring back tone service, the system can select a MSC that supports ring back tone service to play subscriber-customized ring back tone to the calling subscriber, thereby the application scope of the present invention can be further enlarged.

Signaling Interception Triggering

In the fifteenth embodiment of the present invention, the signaling between the O_MSC and the HLR can be intercepted by a newly added device, i.e., Signaling Processing System (SPS), and thereby the object to route the call to the RBTS and play the ring back tone to the calling subscriber through the RBTS can be realized.

Figure 20:
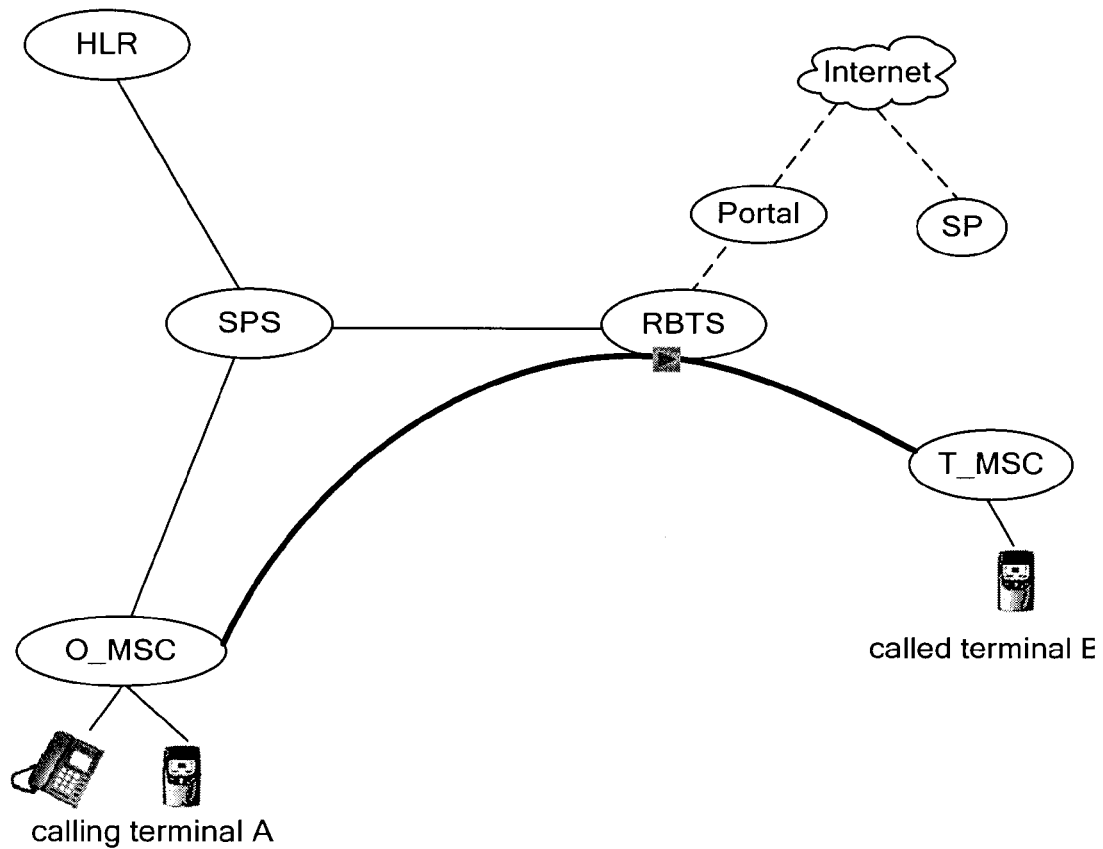
FIG. 20 illustrates a system structure according to the fifteenth embodiment of the present invention.

Now referring to FIG. 20 that shows a system structure of this embodiment, the system that provides ring back tone service comprises not only calling terminal A, called terminal B, an O_MSC, a T_MSC, a HLR and a RBTS, but also a SPS.

In this embodiment, the number of SPSs corresponds to the number of the HLRs in the mobile communication network, which means a SPS is added for each HLR in the mobile communication network. Of course, a SPS can also correspond to several HLRs. Ring back tone service register information for the subscribers belonging to the HLR connected with the SPS is recorded in the SPS. The ring back tone service register information at least includes identification information indicating whether a subscriber is a ring back tone service registered subscriber and routing information of the ring back tone device. The information will not be recorded in the HLR, therefore it is unnecessary to make any reconstruction for the HLR.

In addition, the system can also include SP that provides ring back tone resource to the RBTS through Internet with help of Portal.

In order to realize object of the present invention, the SPS is capable of changing calling address and called address in the received signaling and registering ring back tone service register information of the subscriber. The registration can be accomplished at business lobby or by other means.

Figure 21A:
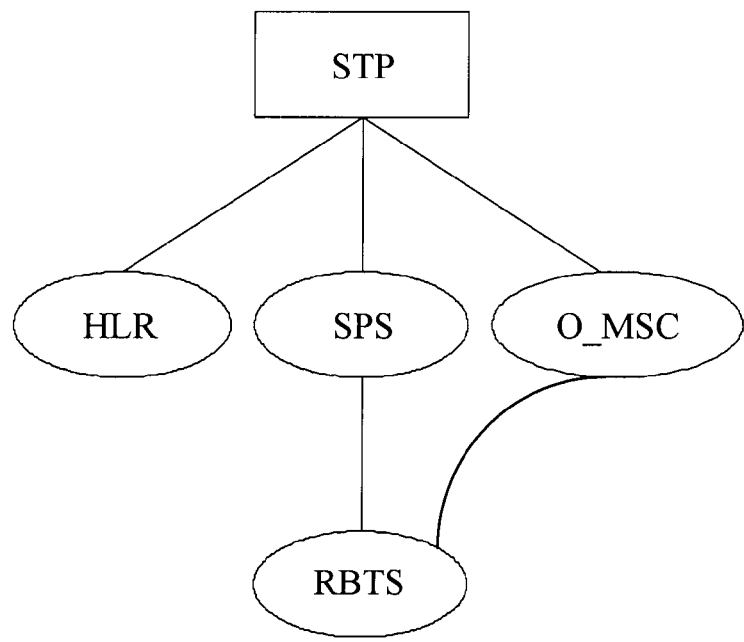
FIG. 21A is a schematic diagram illustrating connection relationship between SPS and HLR according to the fifteenth embodiment of the present invention.

There are several arrangements for the SPS in the system. As shown in FIG. 21A, Quasi-Direct connection mode is adopted in which the STP and the RBTS are connected via the SPS. In detail, the HLR is connected to GMSC/MSC via STP, and the STP is further connected to SPS provided by the present invention, the SPS is connected to the HLR and the GMSC/MSC through the STP corresponding to the HLR, the SPS device is directly connected to the RBTS by means of signaling. In this way, corresponding data configuration for signaling routing is accomplished on the STP and/or GMSC/MSC, therefore, part of signaling sent to the HLR will pass across the SPS first.

Figure 21B:
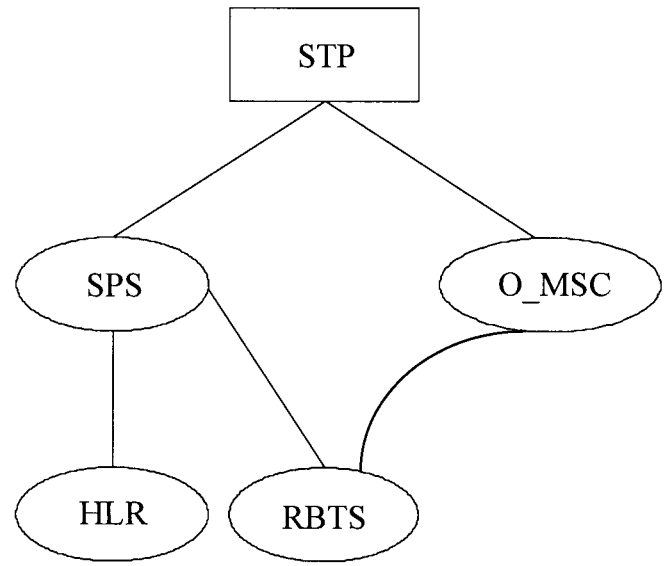
FIG. 21B is a schematic diagram illustrating connection relationship between SPS and HLR according to the fifteenth embodiment of the present invention.

As shown in FIG. 21B, the SPS is connected between the STP and the HLR. In detail, the HLR is connected to the SPS provided by the present invention, the SPS in turn links to the STP corresponding to the HLR, thereby, the HLR is connected to the STP corresponding to the HLR via the SPS. In this way, the messages sent to the HLR through the STP will pass the SPS first, and the messages returned from the HLR will also pass the SPS first. While making signaling connection directly with the RBTS, the SPS makes signaling connection with the GMSC/MSC via the STP corresponding to the HLR.

Figure 21C:
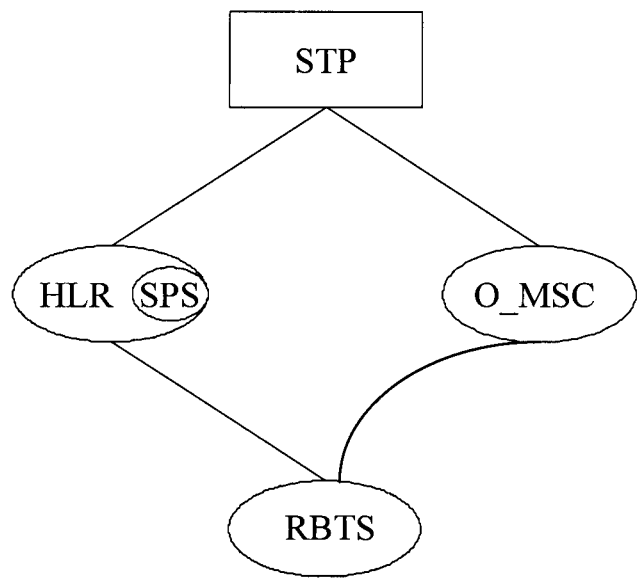
FIG. 21C is a schematic diagram illustrating connection relationship between SPS and HLR according to the fifteenth embodiment of the present invention.

In the system structure shown in FIG. 21C, the SPS is connected to the HLR as a function entity in the STP connected to the HLR. In detail, the SPS is directly connected to the HLR that links with the RBTS and GMSC/MSC immediately. In this way, the HLR is connected the RBTS and the GMSC/MSC via the SPS.

Figure 21D:
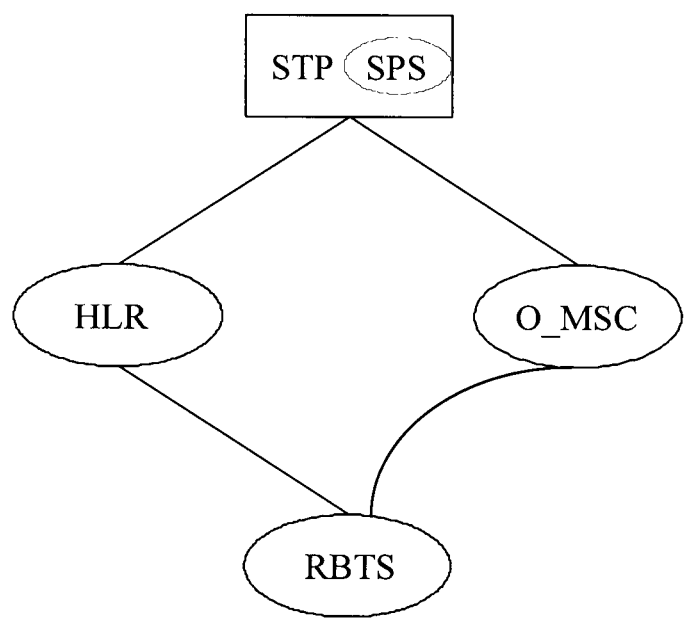
FIG. 21D is a schematic diagram illustrating connection relationship between SPS and HLR according to the fifteenth embodiment of the present invention.

In the system structure shown in FIG. 21D, function of the SPS is embedded directly into the STP corresponding to the HLR, and the SPS acts as a function entity of the STP. As a function entity of the STP, the SPS device makes signaling connection with HLR, GMSC/MSC and RBTS separately. In this structure, the STP needs to be updated in order to implant the function of the SPS device into the STP.

No matter which system structure shown in FIG. 21 is adopted, the method for providing ring back tone services in the system is similar.

Figure 22A:
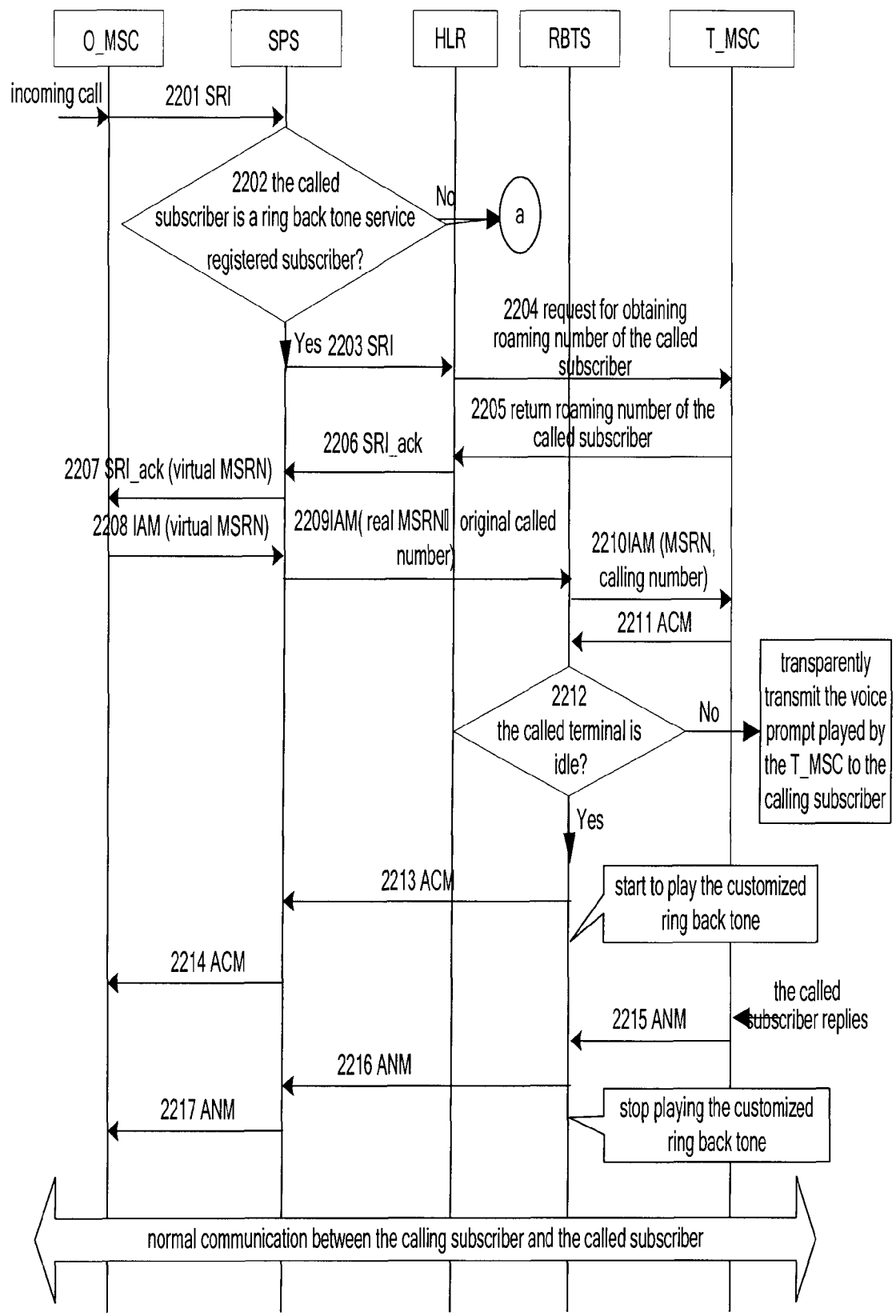
FIG. 22A and FIG. 22B are signaling flowcharts according to the fifteenth embodiment of the present invention.

The processing procedure of the embodiment will be described in detail with the flowchart shown in FIG. 22A and FIG. 22B hereinafter, and GSM system will be taken as an example in the embodiment.

In step 2201, when the calling subscriber initiates a call to called terminal B via calling terminal A, the O_MSC receives the call from calling terminal A, sends a SRI to the HLR to which the called terminal is attached in order to ask for obtaining routing information of the called subscriber. Because all the signaling sent from switching device will pass the SPS according to configuration of the No. 7 signaling routing data, the SRI message is sent first to the SPS connected with the HLR. Here, the information in the SRI message includes MSISDN of the called subscriber.

In step 2202, the SPS judges whether the called subscriber has registered the ring back tone service according to MSISDN of the called subscriber in the received SRI message and the ring back tone service register information of the subscriber recorded in the SPS in advance, if so, the SPS changes calling address information of Signaling Connection Control Part (SCCP) in the SRI message into address of itself, i.e., Global Title (GT) code of the SPS, and then sends the SRI message in which the address information of the calling subscriber has been changed to the HLR in step 2203. In this course, the SPS records the received MSISDN, and step 2204 and its subsequent steps are executed. If the called subscriber has not registered the ring back tone service, the SPS will carry out step 2223 and its subsequent steps shown in FIG. 22B without any change on calling address information, simply speaking, it means to establish a voice channel between the O_MSC and the T_MSC when the called terminal is idle.

In steps 2204 and 2205, after receiving SRI message sent via the SPS, the HLR sends a request for obtaining roaming number of the called subscriber to the T_MSC, and the T_MSC assigns a roaming number for the called subscriber. Here, the roaming number is MSRN in a GSM network. The T_MSC then sends the MSRN to the HLR.

In step 2206, the HLR returns SRI_ack message with MSRN of the called subscriber to the O_MSC, because the SPS has changed calling address to GT of the SPS in step 2202, the SRI_ack message is sent to the SPS.

In step 2207, after receiving the SRI_ack message, the SPS records the MSRN of the called subscriber in the SRI_ack message, and changes the MSRN to a virtual MSRN, which is the corresponding virtual address of the RBTS for implementing the ring back tone service, and then, the SPS sends the changed SRI_ack message to the O_MSC.

In step 2208, after receiving the SRI_ack message sent from the SPS, the O_MSC sends an IAM to the RBTS according to the virtual MSRN inside the message, and the JAM message is sent to the SPS first based on the current configuration of the No. 7 signaling routing data. The information in the IAM message includes virtual MSRN and the calling number, at the same time, destination address of the IAM message is the address of the RBTS corresponding to the virtual MSRN.

In step 2209, after receiving the IAM message sent from the O_MSC, the SPS changes virtual MSRN in the IAM message to real MSRN of the called subscriber utilizing real MSRN of the called subscriber recorded in step 2207, and adds MSISDN of the called subscriber recorded by the SPS into the IAM message, then sends the message to the RBTS.

In step 2210, after receiving the IAM message sent from RBTS, the SPS sends an IAM message to the T_MSC according to the real MSRN of the called subscriber in the message sent from RBTS. The IAM message sent to the T_MSC includes the calling number and real MSRN of the called subscriber.

In step 2211, the O_MSC pages the called subscriber, and sends state information of the called terminal to the RBTS by means of an ACM.

In step 2212, the RBTS judges whether the called terminal is idle based on the ACM. If so, in steps 2213 and 2214, the RBTS searches the ring back tone customized by the called subscriber according to MSISDN of the called subscriber, sends an ACM to the O_MSC via the SPS, and plays the ring back tone to the calling subscriber via the O_MSC, and meanwhile screens the traditional ring back tone played by the T_MSC. If the called terminal is not idle, for example, busy, shutdown or out of service range, the RBTS will transparently transmit the voice prompt played by the T_MSC that represents busyness, shutdown or out of service range to the calling subscriber via the O_MSC, rather than playing the ring back tone to the calling subscriber.

In steps 2215 to 2217, when the called subscriber picks up the phone and answers the call, the T_MSC sends an ANM to the RBTS, after receiving the ANM, the RBTS sends the ANM to the O_MSC, and stops playing the ring back tone to the calling subscriber at the same time, and establishes a voice channel between the O_MSC and the T_MSC through its relay in order to enable communication between the calling subscriber and the called subscriber.

Figure 22B:
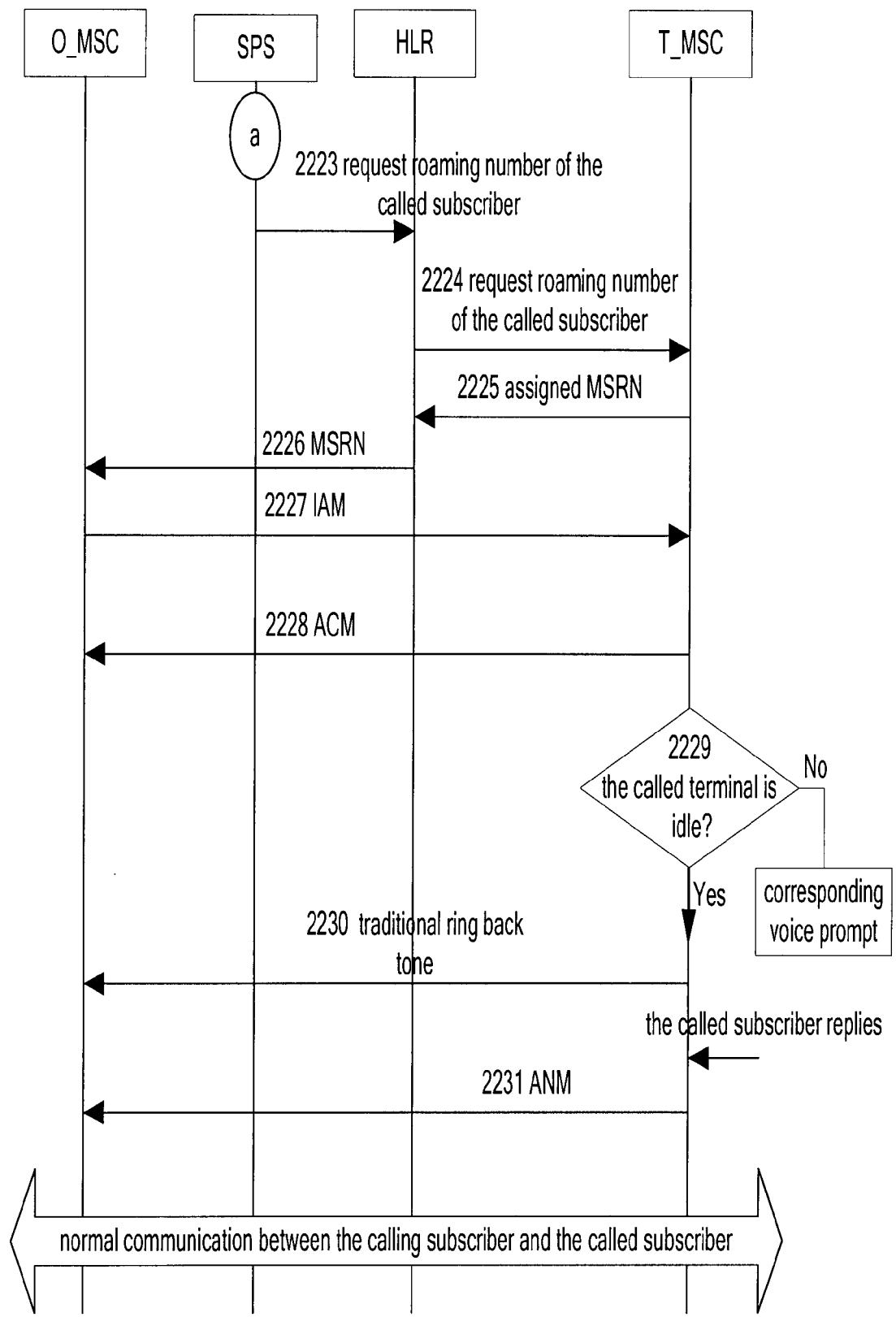

In step 2223 shown in FIG. 22B, the SPS sends a SRI to the HLR. And in step 2224, after receiving the message, the HLR sends a request for obtaining roaming number of the called subscriber to the T_MSC. Steps 2225 to 2231 are similar with steps 202 to 209, and no details will be elaborated further hereinafter.

Figure 23:
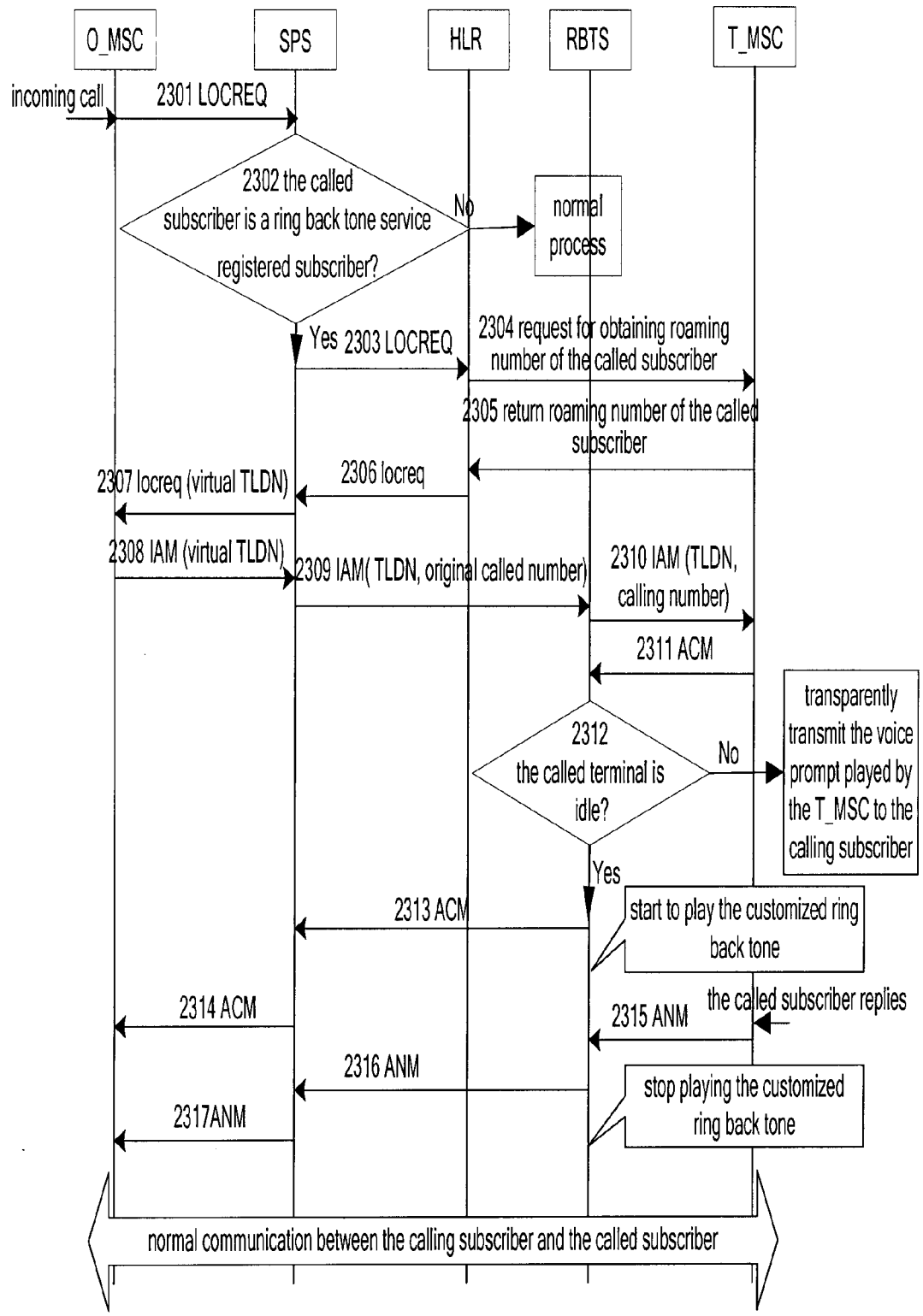
FIG. 23 is a signaling flowchart according to the sixteenth embodiment of the present invention.

As for the CDMA system, the present invention provides the sixteenth embodiment that is similar with the procedure above. The flowchart of the sixteenth embodiment is shown in FIG. 23.

In step 2301, when the calling subscriber initiates a call to called terminal B via calling terminal A, the O_MSC receives the call from calling terminal A, and sends a LOCREQ to the HLR to which the called terminal is attached in order to ask for route information of the called subscriber. The LOCREQ message is sent first to the SPS connected to the HLR based on configuration of the No. 7 signaling routing data. Here, information in the LOCREQ message includes MSISDN of the called subscriber and MSCID of the O_MSC.

In step 2302, the SPS judges whether the called subscriber has registered the ring back tone service according to the MSISDN of the called subscriber in the received LOCREQ message with help of the ring back tone service register information of the subscriber registered in advance, if so, in step 2303, the SPS changes the calling address information of the SCCP in the LOCREQ message to address information of the SPS itself, i.e. GT of the SPS, and sends the LOCREQ message with changed address information to the HLR. In this procedure, the SPS records the received MSISDN, and then step 2304 and its successive steps will be executed. Else, the prior calling routine will be executed, that is, directly establishing a voice channel between the O_MSC and the T_MSC when the called terminal is idle.

In this step, if the SPS determines that the called subscriber has registered the ring back tone service, the SPS sets the received MSCID at a preset value, which is exclusive in the CDMA network and different from MSCID of any MSC. The reason why adding this step in the embodiment lies in the particularity of the CDMA protocol. In CDMA protocol, when the calling and called subscribers belong to the same MSC, the HLR will not return TLDN of the called subscriber to the MSC, which can baffle implementing of the ring back tone service. Therefore, in this step, MSCID in the LOCREQ message is changed so as to notify the HLR that the calling and called subscribers do not belong to the same MSC, and thereby TLDN information of the called subscriber can be obtained.

In steps 2304 and 2305, after receiving LOCREQ message sent from the SPS, the HLR sends a request for roaming number of the called subscriber to the T_MSC, and the T_MSC assigns a roaming number, i.e. TLDN, for the called subscriber, and then returns the number to the HLR.

In step 2306, the HLR returns locreq message with MSRN of the called subscriber to the O_MSC. Because the SPS has changed calling address to GT of the SPS in step 2303, the locreq message is transmitted to the SPS.

In step 2307, after receiving the locreq message, the SPS records TLDN of the called subscriber in the received locreq message, and changes the TLDN into virtual TLDN corresponding virtual address of the RBTS for implementing the ring back tone service, and then the SPS sends the changed locreq message to the O_MSC.

In step 2308, after receiving the locreq message sent from the SPS, the O_MSC sends an IAM to the RBTS according to the virtual TLDN in the message, the O_MSC sends the IAM message to the SPS first based on the current configuration of the No. 7 signaling routing data. Information in the IAM message includes virtual TLDN and calling number, while destination address of the IAM message is address of the RBTS corresponding to the virtual TLDN.

In step 2309, after receiving the IAM message sent from the O_MSC, the SPS changes the virtual TLDN in the IAM message to real TLDN of the called subscriber with the help of the real TLDN of the called subscriber recorded in step 2307, and adds the MSISDN of the called subscriber recorded by the SPS into the IAM message, and then sends the message to the RBTS.

In step 2310, after receiving the IAM message sent from the RBTS, the SPS sends an IAM message to the T_MSC according to real TLDN of the called subscriber in the message sent from the RBTS. The IAM message sent to T_MSC includes calling number and real TLDN of the called subscriber.

In step 2311, the T_MSC pages the called subscriber and sends state information of the called terminal to the RBTS by means of an ACM.

In step 2312, the RBTS judges whether the called terminal is idle based on the ACM. If so, in steps 2313 and 2314, the RBTS sends ACM to the O_MSC via the SPS, searches the ring back tone customized by the called subscriber according to MSISDN of the called subscriber, and plays the ring back tone to the calling subscriber via the O_MSC, and meanwhile screens the traditional ring back tone played by the T_MSC. If the called terminal is not idle, for example, busy, shutdown or out of service range, the RBTS will transparently transmit the voice prompt played by the T_MSC that represents busyness, shutdown or out of service range to the calling subscriber via the O_MSC, rather than playing the ring back tone to the calling subscriber.

In steps 2315 to 2317, when the called subscriber picks up the phone and answers the call, the T_MSC sends an ANM to the RBTS. After receiving the ANM, the RBTS sends an ANM to the O_MSC, and stops playing the ring back tone to the calling subscriber at the same time, and establishes a voice channel between the O_MSC and the T_MSC through its relay, so as to enable communication between the calling subscriber and the called subscriber.

In the fifteenth and sixteenth embodiments, ACM message is sent via the SPS. In practice, ACM message can be sent to O_MSC directly other than via the SPS.

Call Forwarding Triggering

The seventeenth embodiment of the present invention employs call forwarding triggering mode to provide rich and colorful ring back tones customized by the calling subscriber or called subscriber to the calling subscriber.

Figure 24:
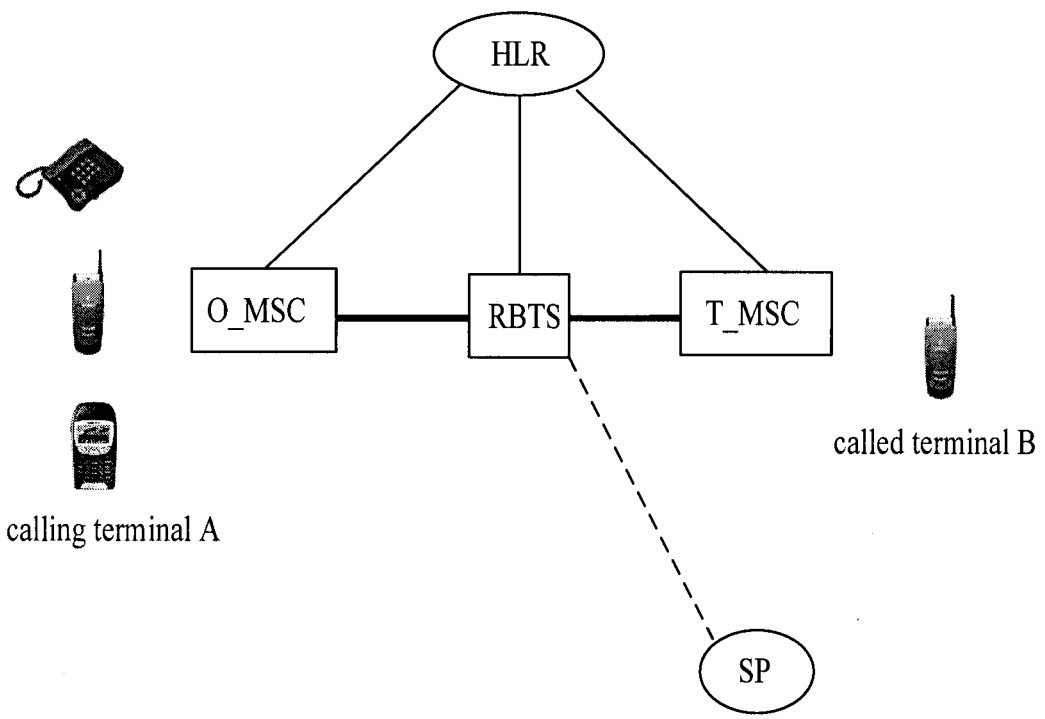
FIG. 24 illustrates a system structure according to the seventeenth embodiment of the present invention.

FIG. 24 shows an exemplary system structure of the GSM mobile communication network in the seventeenth embodiment that employs call forwarding triggering as triggering mode. As shown in FIG. 24, the system for providing ring back tone services not only includes an O_MSC, a T_MSC and a HLR, but also includes a RBTS that is used for storing and providing ring back tones.

The MSC here mainly implements functions such as service switching and call controlling. The O_MSC is a MSC or a GMSC corresponding to the calling subscriber, while the T_MSC is a MSC visited by the called subscriber, which is mainly used for storing current information of the called subscriber, and connecting the call to the called subscriber during the calling procedure.

The HLR is mainly used for storing basic information of the mobile terminal. In this embodiment, if a subscriber registers the ring back tone service, subscriber information will include an unconditional forwarding number that is used to instruct the MSC to connect the call to the RBTS.

In addition, the system can further comprise a SP, which can provide various ring back tones and upload the tones to the RBTS via Internet or alike for the RBTS to play for the subscriber.

Figure 25A:
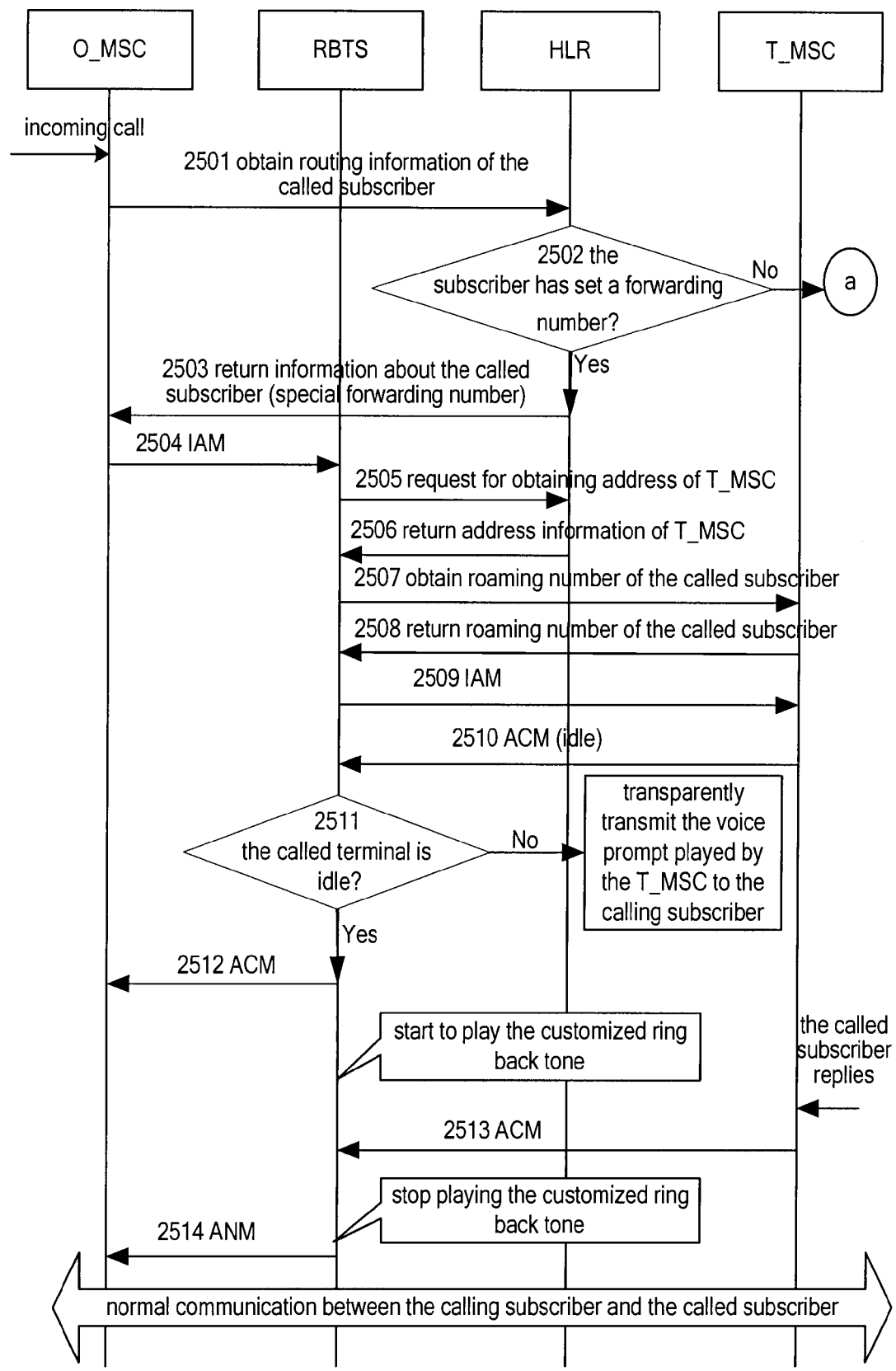
FIG. 25A and FIG. 25B are signaling flowcharts according to the seventeenth embodiment of the present invention.
Figure 25B:
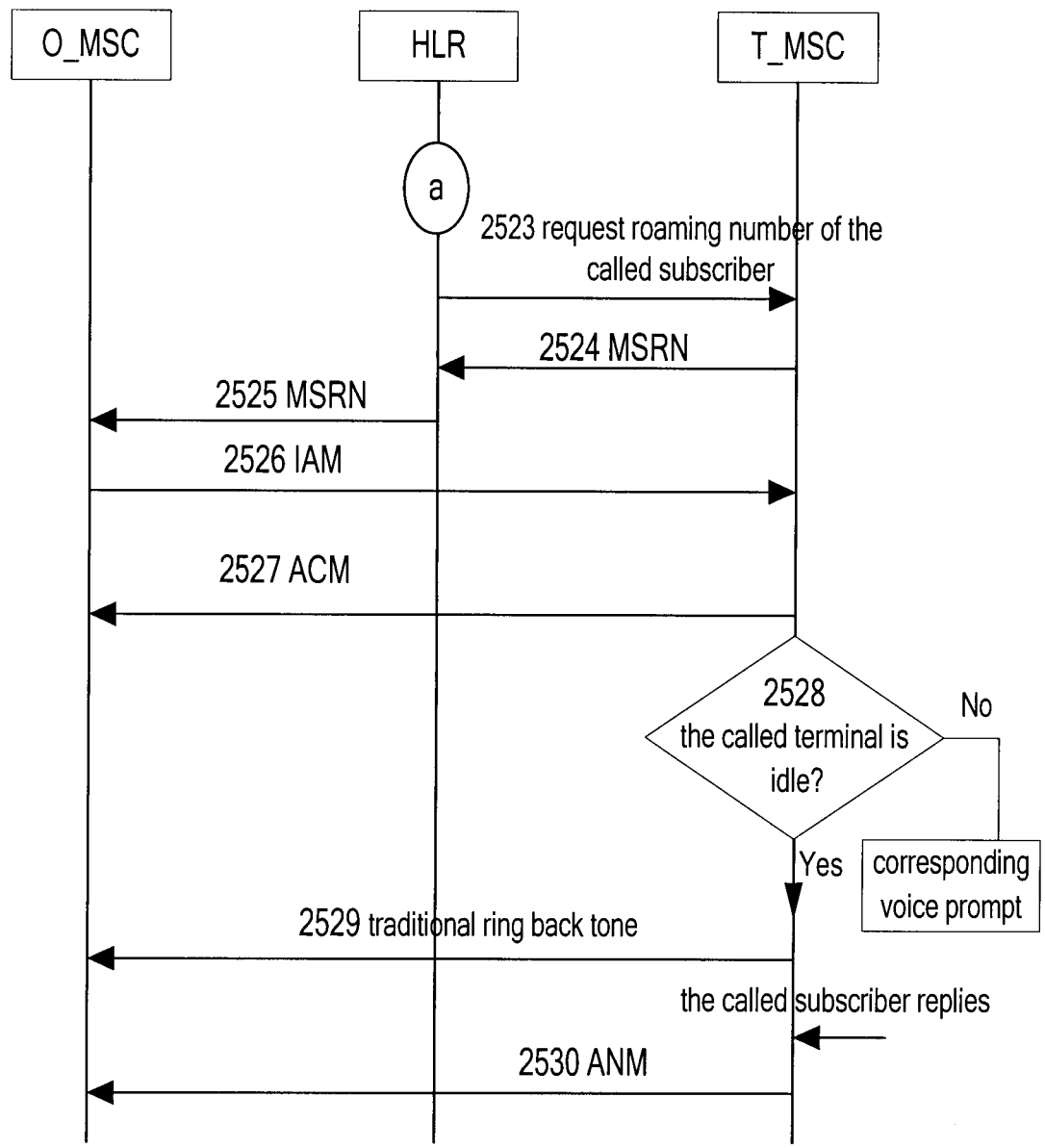

FIG. 25A and FIG. 25B illustrate the flowchart of the method in the embodiment. In the method, the routing number of the RBTS is set as an unconditional forwarding number.

In step 2501, when the calling subscriber initiates a call to called terminal B via calling terminal A, the O_MSC receives the call from calling terminal A, and sends a request for obtaining route information of the called subscriber to the HLR to which the called terminal is attached. Here, the request includes a called number of the called subscriber.

Figure 1:
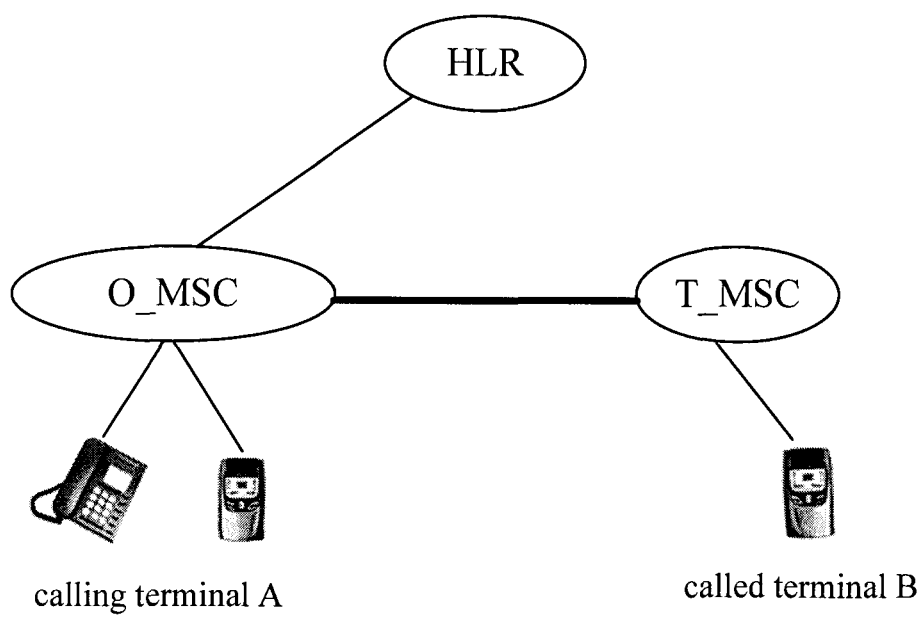
FIG. 1 is a schematic diagram illustrating a basic architecture of a conventional GSM mobile communication network.
Figure 2:
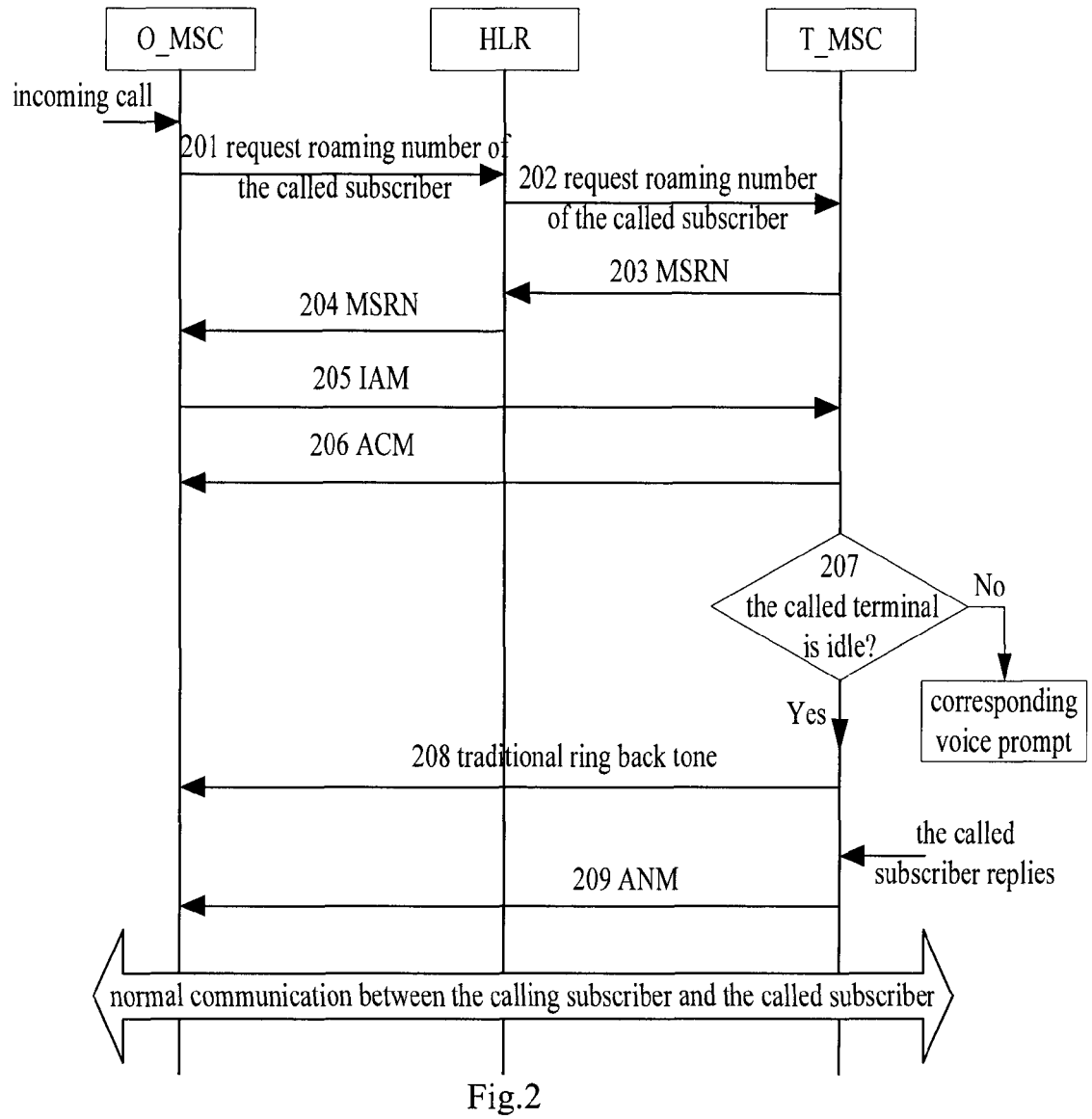
FIG. 2 is a flowchart illustrating a method for providing ring back tones to the subscribers in a conventional GSM mobile communication network.

In step 2502, the HLR searches subscriber information of the called subscriber according to the called number, and judges whether the subscriber has set a forwarding number. If a forwarding number has been configured, in step 2503 shown in FIG. 25A, the HLR sends the forwarding number to the O_MSC as a called number, and sends the calling number and original called number to the O_MSC at the same time. Here, the original called number is mobile terminal number of the called subscriber, in GMS network it is MSIDSN, as for CDMA network, it is MDN. The MSISDN of the GSM network will be taken as an example in this embodiment. If no forwarding number has been configured, in step 2523 shown in FIG. 25B, the HLR sends a request for obtaining roaming number of the called subscriber to the T_MSC. The subsequent steps 2524 to 2530 are similar with steps 202 to 209 shown in FIG. 2, thus no details will be elaborated further hereinafter.

In step 2504, because the called number that the O_MSC receives is a forwarding number, the O_MSC sends the call to corresponding communication device according to the forwarding number. If the called subscriber is a ring back tone service registered subscriber, the O_MSC confirms routing information of the RBTS, and then routes the call to the RBTS. At the same time, the O_MSC sends an IAM to the RBTS. The IAM here includes a calling number, a called number and an original called number. The called number is routing number of the RBTS, while the original called number is MSISDN.

In step 2505, after receiving the IAM from the O_MSC, the RBTS confirms that the called subscriber has registered the ring back tone service according to the original called number, and sends a request for obtaining address of T_MSC to the HLR.

In step 2506, the HLR returns address information of the T_MSC to the RBTS.

In step 2507, the RBTS applies for obtaining roaming number of the called subscriber from the T_MSC according to the obtained address of the T_MSC.

In step 2508, the T_MSC sends the MSRN assigned for the called subscriber to the RBTS.

In step 2509, the RBTS sends the T_MSC an IAM in which the called number is MSRN of the called subscriber, and routes the call to the T_MSC at the same time.

In step 2510, the T_MSC pages the called subscriber and sends state information of the called terminal to the RBTS by means of an ACM.

In step 2511, the RBTS judges whether the called terminal is idle based on the ACM. If so, in step 2512, the RBTS sends an ACM to the O_MSC, searches the ring back tone customized by the called subscriber according to the called number, and plays the ring back tone to the calling subscriber via the O_MSC, and screens the traditional ring back tone simultaneously. After that the subsequent steps will be executed. If the called terminal is not idle, for example, busy, shutdown or out of service range, the RBTS will transparently transmit a voice prompt played by the T_MSC that represents busyness, shutdown or out of service range to the calling subscriber via the O_MSC, rather than playing the ring back tone to the calling subscriber.

In steps 2513 and 2514, when the called subscriber picks up the phone and answers the call, the T_MSC sends an ANM to the RBTS. After receiving the ANM, the RBTS sends an ANM to the O_MSC, and stops playing ring back tone to the calling subscriber simultaneously, and establishes a voice channel between the O_MSC and the T_MSC to enable communication between the calling subscriber and the called subscriber.

Through setting an unconditional forwarding number to the subscriber who registered the ring back tone service in the HLR, all the calls are routed to the RBTS first, and then the RBTS determines roaming number of the called subscriber, and routes the call the terminating switching device. The embodiment is perfectly simple to implement.

Switching Device Triggering

Besides three kinds of triggering modes described above, the present invention also provides a switching device triggering mode. In this mode, the originating switching device judges whether the subscriber has registered the ring back tone service. If it is determined that the subscriber has registered the ring back tone service, the call is routed to the RBTS, and the RBTS plays the ring back tone to the calling subscriber.

Figure 26A:
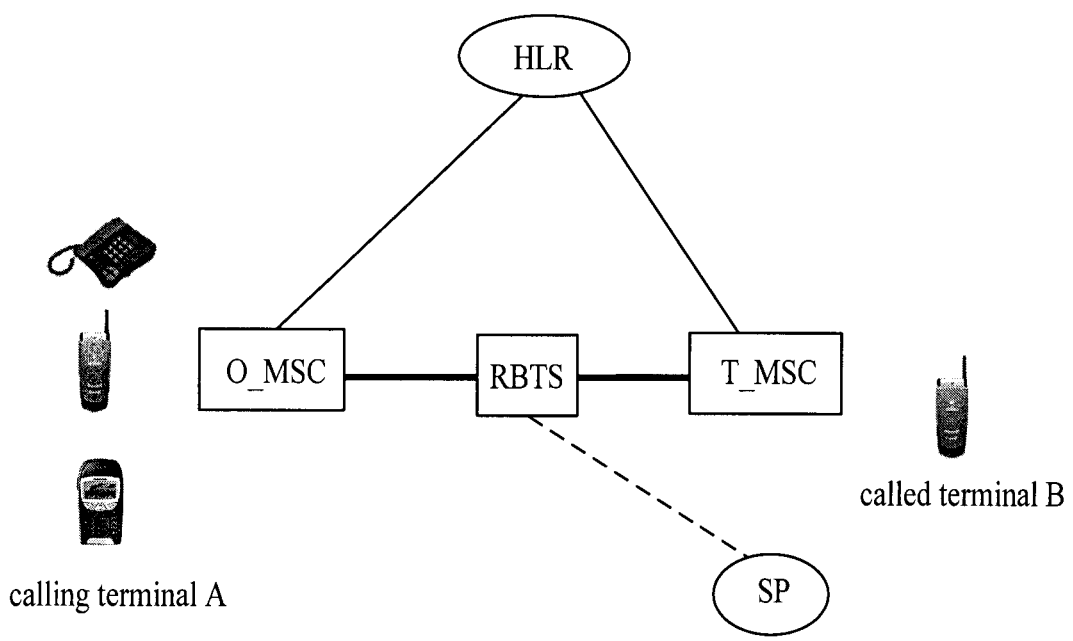
FIG. 26A and FIG. 26B illustrate system structures according to the eighteenth embodiment of the present invention.
Figure 26B:
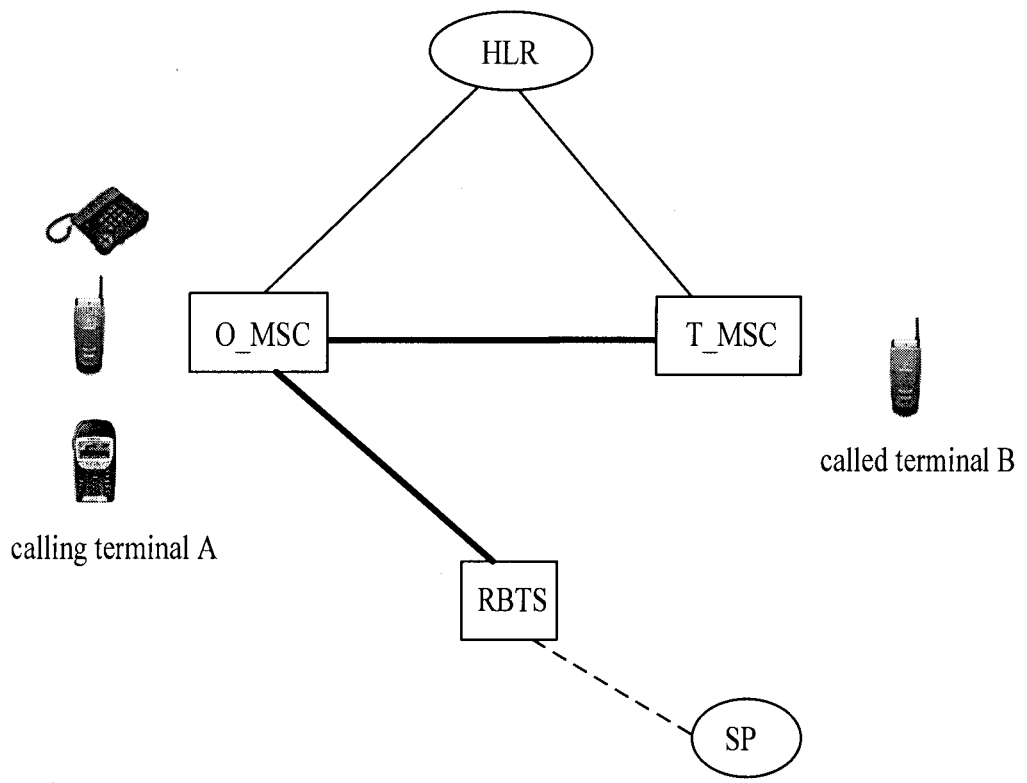

The system structure of initiating the ring back tone service with the switching device triggering mode is shown in FIG. 26A and FIG. 26B. Referring to FIG. 26A and FIG. 26B, the system for providing ring back tone services includes not only an O_MSC, a T_MSC and a HLR, but also a RBTS that is used for storing and providing ring back tones.

The MSC here mainly implements functions such as service switching and call controlling. The O_MSC is a MSC or a GMSC corresponding to the calling subscriber, while the T_MSC is a MSC visited by the called subscriber, which is mainly used for storing current information of the called subscriber, and connecting the call to the called subscriber during the calling procedure.

The HLR is mainly used for storing basic information of the mobile terminal, in the embodiment, if the subscriber registered the ring back tone service, identification information indicating whether the subscriber is a ring back tone service registered subscriber, as well as routing number of the RBTS, will be included in subscriber information.

In addition, the system can further comprise a SP, which can provide various ring back tones and upload the tones to the RBTS via Internet or alike for the RBTS to play for the subscriber.

In the system structure shown in FIG. 26A, terminals A and B are connected to O_MSC and T_MSC respectively, while voice channel between A and B is connected via the RBTS, which means the RBTS acts as an intermediate device to connect calls between the O_MSC and the T_MSC. In this structure, the RBTS not only plays ring back tones to the calling subscriber via the O_MSC, but also relays channels between the calling subscriber and the called subscriber. In the system structure shown in FIG. 26B, the voice channel is established between the O_MSC and the T_MSC directly, while no relay of RBTS is needed. In addition, the O_MSC establishes a voice channel individually to the RBTS, and the RBTS plays the ring back tones to the called subscriber via another separately channel, while communication between the calling subscriber and the called subscriber is implemented through the channel between the O_MSC and the T_MSC.

Figure 27A:
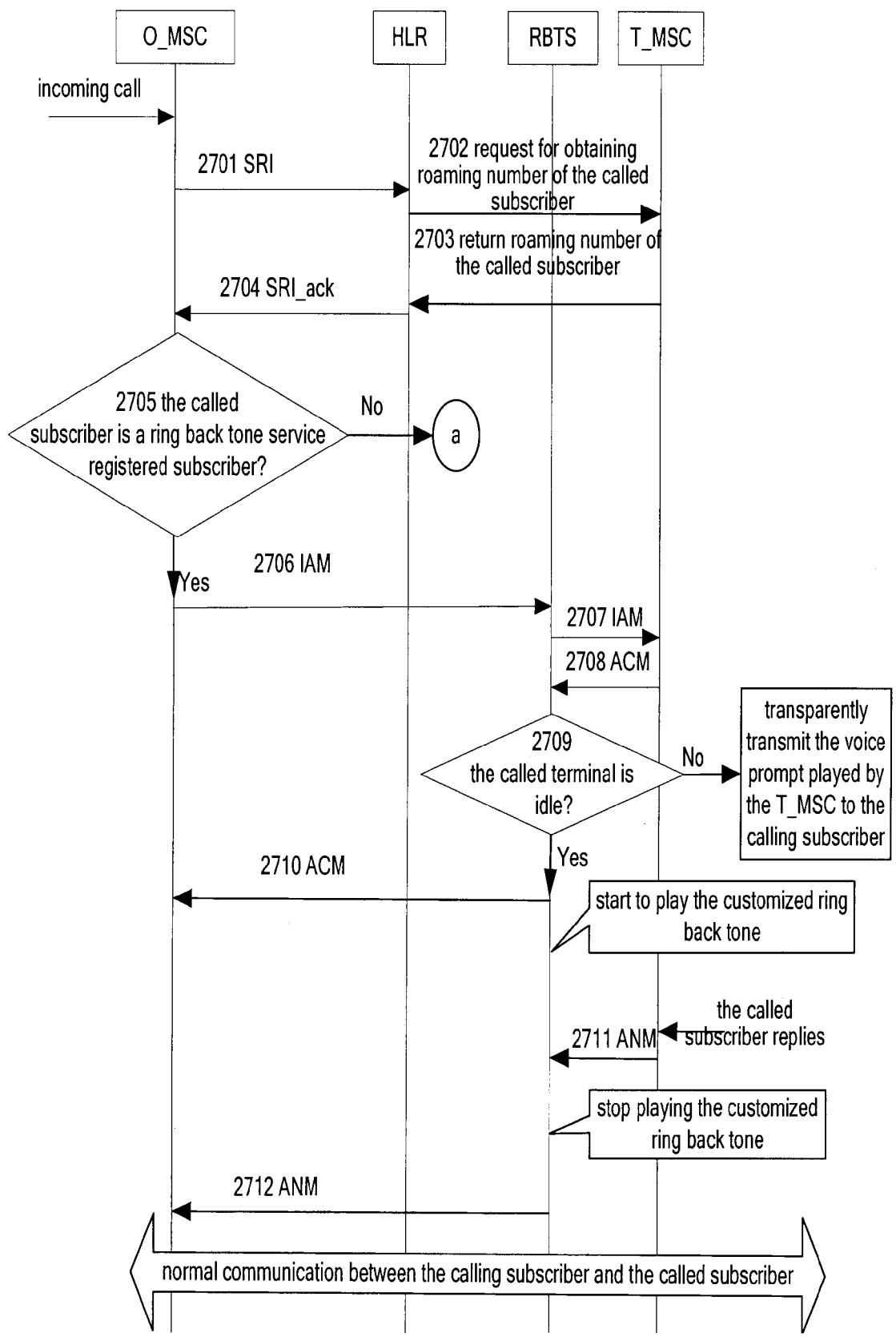
FIG. 27A and FIG. 27B are signaling flowcharts according to the eighteenth embodiment of the present invention.
Figure 27B:
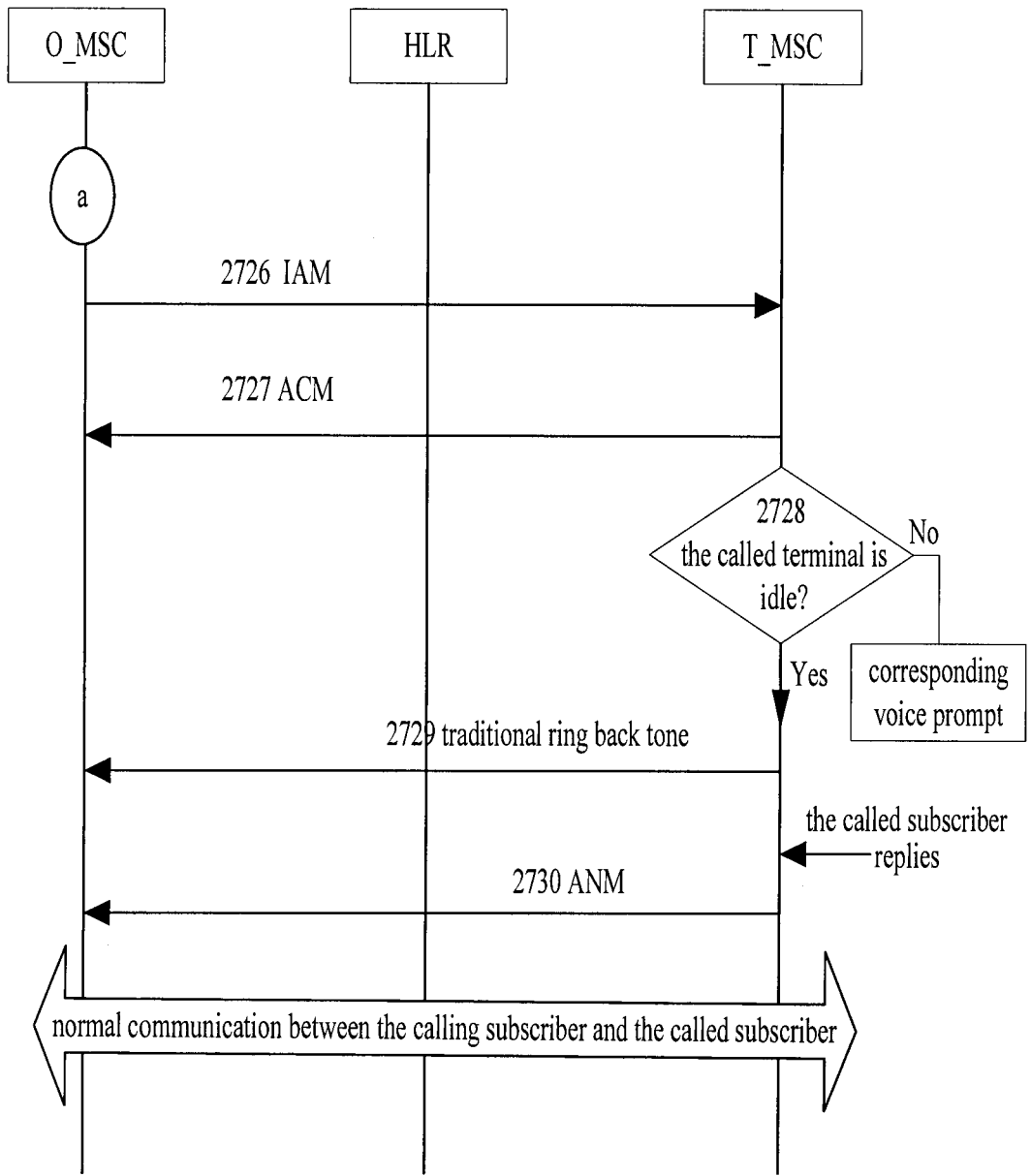

As for the system structure shown in FIG. 26A, the present invention provides the eighteenth embodiment shown in FIG. 27A and FIG. 27B. In step 2701, when the calling subscriber initiates a call to called terminal B via calling terminal A, the O_MSC sends a request for obtaining routing information of the called subscriber to the HLR to which the called terminal is attached after receiving the call request from calling terminal A. The request includes called number etc., the called number being MSISDN of the called subscriber.

In steps 2702 and 2703, the HLR sends a request for obtaining roaming number of the called subscriber to the T_MSC. The T_MSC assigns a MSRN for the called subscriber and sends the MSRN to the HLR.

In step 2704, the HLR sends called number and original called number to the O_MSC. Taking GSM network as example, the called number is MSRN with a routing prefix which is a routing number of the RBTS for a ring back tone service subscriber, and is only MSRN for a subscriber who has not registered ring back tone service.

In step 2705, the O_MSC judges whether the called subscriber is a ring back tone registered subscriber according to the called number, if so, step 2706 and its subsequent steps shown in FIG. 27A will be executed; else, step 2726 and its subsequent steps shown in FIG. 27B will be executed. Steps 2726 to 2730 are similar with steps 205 to 209 shown in FIG. 2, thus detailed description thereof will be omitted, simply speaking, it is to establish a connection between the O_MSC and the T_MSC when the called terminal is idle.

In step 2706, the O_MSC routes the call to the RBTS according to the routing prefix, and sends an IAM at the same time to the RBTS with forwarding mode. Here, the JAM includes calling number, called number and original called number. The called number is MSRN with a routing prefix, while the original called number is MSISDN.

In step 2707, after receiving the IAM sent from the O_MSC, the RBTS removes the routing prefix before the MSRN, extracts the original called number, and sends the calling number and the MSRN of the called subscriber to the T_MSC by means of an IAM.

In step 2708, the T_MSC pages the called subscriber and sends state information of the called terminal to the RBTS by means of an ACM.

In step 2709, the RBTS judges whether the called terminal is idle based on the ACM. If so, in step 2710, the RBTS sends an ACM to the O_MSC, searches the ring back tone customized by the called subscriber according to MSISDN of the called subscriber, and plays the ring back tone to the calling subscriber via the O_MSC, and meanwhile screens the traditional ring back tone played by the T_MSC. After that, the subsequent steps will be executed. If the called terminal is not idle, for example, busy, shutdown or out of service range, the RBTS will transparently transmit a voice prompt played by the T_MSC that represents busyness, shutdown or out of service range to the calling subscriber via the O_MSC rather than playing the ring back tone to the calling subscriber.

In steps 2711 and 2712, when the called subscriber picks up the phone and answers the call, the T_MSC sends an ANM to the RBTS. After receiving the ANM, the RBTS sends an ANM to the O_MSC, and stops playing the ring back tone to the calling subscriber at the same time, and establishes a voice channel between the O_MSC and the T_MSC through its relay in order to enable communication between the calling subscriber and the called subscriber.

Figure 28:
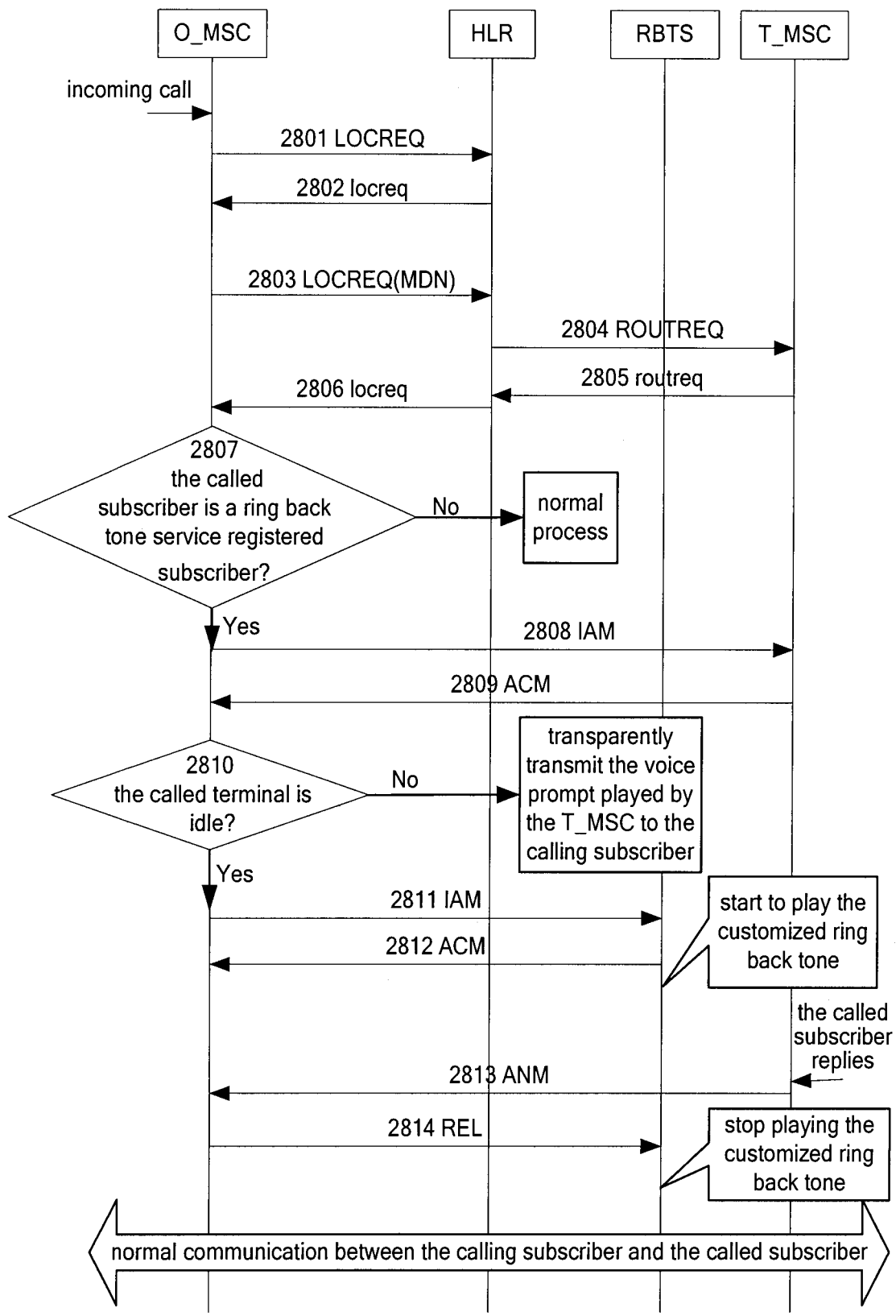
FIG. 28 is a signaling flowchart according to the nineteenth embodiment of the present invention.

For the system structure shown in FIG. 26B, the present invention provides the nineteenth embodiment shown in FIG. 28. With CDMA network as example, in step 2801, when the calling subscriber initiates a call to called terminal B via calling terminal A, the O_MSC receives the call from calling terminal A, triggers a Mobile_Termination trigger, and sends a LOCREQ message to the HLR to which the called terminal is attached in order to ask for routing information of the called subscriber. Here, the LOCREQ message includes called number of the called subscriber and other information.

In step 2802, the HLR searches the called subscriber information according to the called number, and then sends the information to the O_MSC by means of answer message locreq which at least includes LOCATION trigger, MDN of the called subscriber MDN and access number of the RBTS.

In steps 2803 to 2806, the O_MSC triggers the LOCATION trigger, and sends LOCREQ message to the HLR to which the called terminal is attached according to the called number, in order to ask for roaming number of the called subscriber. Through sending ROUTREQ to the T_MSC and receiving answer message routreq sent from the T_MSC, the HLR obtains the roaming number TLDN of the called subscriber assigned by the T_MSC. And then the HLR sends TLDN of the called subscriber to the O_MSC by means of answer message locreq.

In step 2807, the O_MSC judges whether the called subscriber is a ring back tone registered subscriber according to the called number, if it is true, step 2808 and its subsequent steps will be executed; else, normal routine processing will be implemented, which means establishing a connection between the O_MSC and the T_MSC when the called terminal is idle.

In step 2808, the O_MSC sends an IAM message to the T_MSC with TLDN as called number, thereby the call is connected to the T_MSC.

In step 2809, the T_MSC pages the called subscriber and sends state information of the called terminal to the O_MSC by mean of an ACM.

In step 2810, the O_MSC judges whether the called terminal is idle based on the ACM, if it is true, the subsequent steps will be executed, else the O_MSC transparently transmit the voice message that is played by the T_MSC and represents busyness, shutdown or out of service range to the calling subscriber via the O_MSC.

In step 2811, the O_MSC sends an IAM to the RBTS, and sends calling number, called number and other information to the RBTS by means of an IAM in which the called number is MDN of the called subscriber.

In step 2812, the RBTS searches the ring back tone customized by the called subscriber based on the called number, and sends an ACM to the calling terminal. At the same time, the RBTS plays ring back tone customized by the called subscriber to the calling subscriber via the O_MSC, and the O_MSC simultaneously screens the traditional ring back tone played by the T_MSC.

In step 2813, when the called subscriber picks up the phone and answers the call, the T_MSC sends an answer message ANM to the O_MSC.

In step 2814, after receiving the ANM, the O_MSC sends a REL signaling to the RBTS, disconnects the route to the RBTS immediately, and subsequently stops playing the ring back tone to the calling subscriber, while maintaining the route between the O_MSC and the T_MSC simultaneously, keeping communication between the calling subscriber and the called subscriber.

Figure 29B:
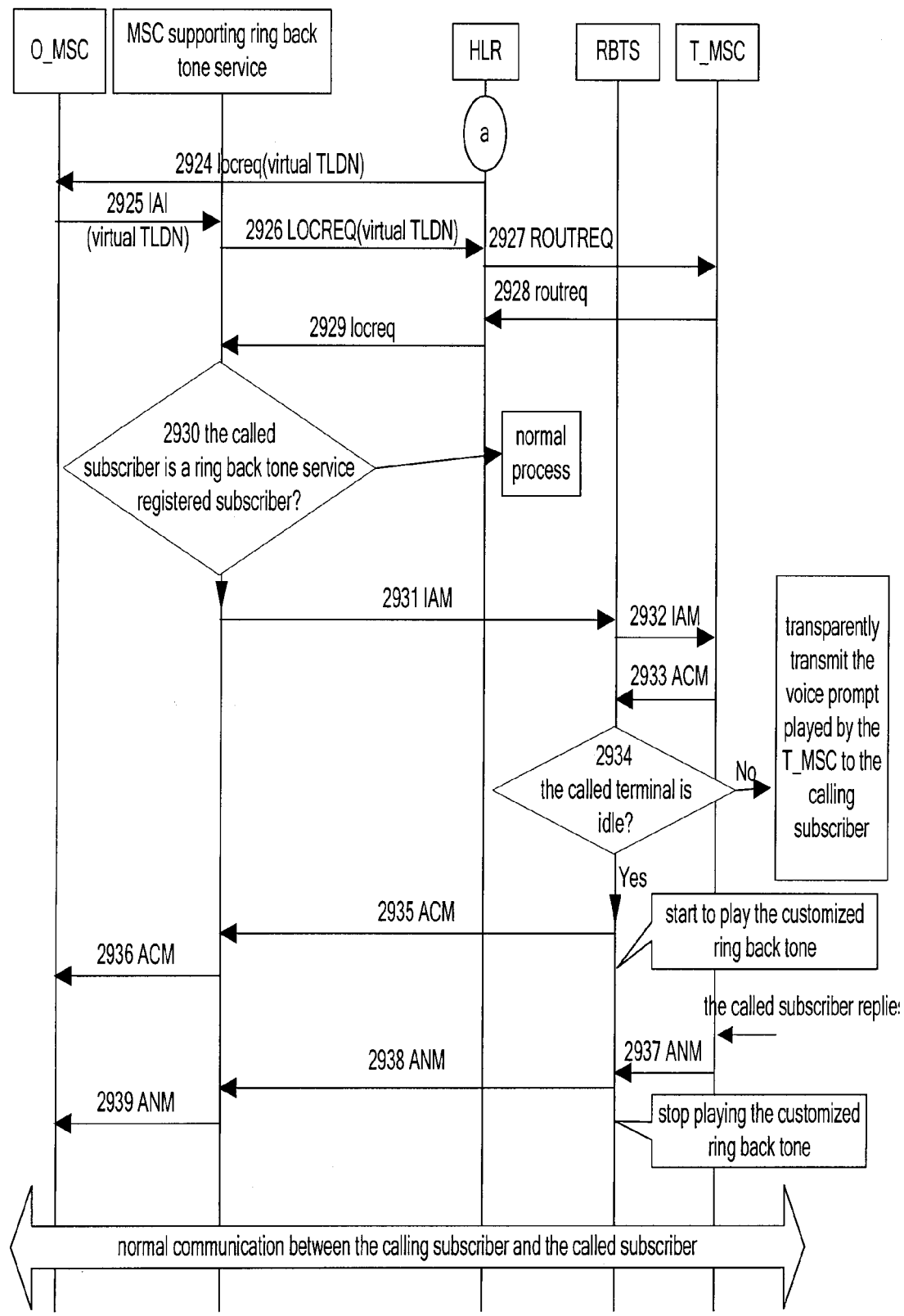

If the O_MSC does not support ring back tone service, an O_MSC that supports the ring back tone service can be selected to play ring back tone to the calling subscriber, thus the present invention provides the twentieth embodiment shown in FIG. 29A and FIG. 29B. The embodiment adds a step to judge whether the O_MSC supports the ring back tone service on basis of the eighteenth embodiment, and then selects a MSC that supports ring back tone service to route the call to the RBTS. Here, CDMA network is taken as an example in the embodiment.

In step 2901, when the calling subscriber initiates a call to called terminal B via calling terminal A, the O_MSC receives the call from calling terminal A, and sends a request for obtaining route information of the called subscriber to the HLR to which the called terminal is attached. Here, the request includes the called number of the called subscriber and MSCID of the O_MSC, the called number is MDN of the called subscriber.

In step 2902, the HLR judges whether the called subscriber is a ring back tone service registered subscriber according to the stored ring back tone service register information, if so, step 2903 and its subsequent steps will be executed. Else, prior call processing will be implemented.

In step 2903, the HLR further judges whether the O_MSC supports ring back tone service. If it is true, step 2904 shown in FIG. 29A and its subsequent steps will be executed, else, step 2924 shown in FIG. 29B and its subsequent steps will be executed.

Steps 2904 to 2914 are similar with steps 2702 to 2712, thus detailed description thereof will be omitted.

In step 2924, the HLR selects a MSC that supports ring back tone service, assigns a virtual TLDN for the called subscriber, and at the same time stores correspondence relationship between the virtual TLDN and called number. Here, route address of the virtual TLDN is the address of the selected MSC that supports ring back tone service. And then, the virtual TLDN is sent to the O_MSC.

In step 2925, the O_MSC sends an IAM to the MSC that supports ring back tone service according to the virtual TLDN, and connects the call to the MSC.

In step 2926, the MSC that supports ring back tone service triggers Mobile_Termination trigger, and sends a LOCREQ message including virtual TLDN to the HLR.

In steps 2927 and 2928, the HLR determines MSISDN of the called subscriber with the virtual TLDN according to the correspondence relationship stored in step 2924, then sends a request for obtaining roaming number of the called subscriber to the T_MSC. The T_MSC assigns a MSRN for the called subscriber, and then sends the MSRN to the HLR.

In step 2929, the HLR sends called number and original called number to the MSC that supports ring back tone service. Here, the called number is MSRN with a routing prefix which is a routing number of the RBTS.

In step 2930, the MSC that supports ring back tone service judges whether the called subscriber is a ring back tone service registered subscriber according to the called number, if so, the following steps will be executed. Else, the prior call processing will be implemented.

In step 2931, the MSC that supports ring back tone service routes the call to the RBTS according to the routing prefix, and sends an JAM at the same time to the RBTS with forwarding mode. Here, the IAM includes calling number, called number and original called number. The called number is MSRN with a routing prefix, while the original called number is MSISDN.

In step 2932, after receiving the JAM from the MSC that supports ring back tone service, the RBTS removes the routing prefix before the MSRN, extracts the original called number, and then sends calling number and MSRN of the called subscriber to the T_MSC by means of an IAM.

In step 2933, the T_MSC pages the called subscriber and sends state information of the called terminal to the RBTS by means of an ACM.

In step 2934, the RBTS judges whether the called terminal is idle based on the ACM. If so, in steps 2935 and 2936, the RBTS sends an ACM to the O_MSC via the MSC that supports ring back tone service, searches the ring back tone customized by the called subscriber according to MSISDN of the called subscriber, and then plays ring back tone customized by the called subscriber to the calling subscriber via the MSC that supports ring back tone service and the O_MSC, at the same time, the RBTS screens the traditional ring back tone played by the T_MSC. And then the subsequent steps will be executed. If the called terminal is not idle, for example, busy, shutdown or out of service range, the RBTS transparently transmits a voice prompt that presents busyness, shutdown or out of service range played by the T_MSC to the calling subscriber via the MSC that supports ring back tone service and the O_MSC rather than playing ring back tone to the calling subscriber.

In steps 2937 and 2938, when the called subscriber picks up the phone and answers the call, the T_MSC sends an ANM to the RBTS. After receiving the ANM, the RBTS sends an ANM to the MSC that supports ring back tone service, and stops playing the ring back tone to the calling subscriber.

In step 2939, the MSC that supports ring back tone service sends an ANM to the O_MSC, establishes a voice channel between the O_MSC and the T_MSC through relay of itself and the RBTS, to enable communication between the calling subscriber and the called subscriber.

Four triggering modes have been described hereinbefore. All of the intelligent network triggering, signaling interception triggering and switching device triggering modes support call forwarding function set by the called subscriber. That is, if it is preset by the called subscriber that the call is forwarded to terminal C from terminal B, the ring back tone set by the subscriber to whom terminal C corresponds can be played to the calling subscriber. Hereinafter, the subscriber to whom the terminal C corresponds is referred as the second called subscriber.

As for the intelligent network triggering mode, under the condition that after forwarding, i.e. forwarding the call to terminal C when no answer or hang-up is made by the called subscriber, is configured by the subscriber, the present invention provides the twenty-first embodiment shown in FIG. 30A and FIG. 30B.

Steps 3001 to 3011 are similar with steps 501 to 511, so description thereof will be omitted.

In step 3012, the T_MSC pages the called subscriber and sends state information of the called terminal to the RBTS by means of an ACM.

In step 3013, the RBTS judges whether the called terminal is idle based on the ACM. If so, in step 3014, the RBTS sends an ACM to the O_MSC, searches the ring back tone customized by the called subscriber according to MSISDN of the called subscriber, and plays ring back tone to the calling subscriber via the O_MSC, and meanwhile screens the traditional ring back tone played by the T_MSC. And then the subsequent steps will be executed. If the called terminal is not idle, for example, busy, shutdown or out of service range, the RBTS transparently transmits a voice prompt played by the T_MSC that represents busyness, shutdown or out of service range to the calling subscriber via the O_MSC rather than playing the ring back tone to the calling subscriber.

In step 3015, the T_MSC judges whether the called subscriber has answered the call within a preset period of time, if the called subscriber picks up the phone and answers the call, in steps 3016 and 3017 shown in FIG. 30A, the T_MSC sends an ANM to the RBTS. After receiving the ANM, the RBTS sends an ANM to the O_MSC, and stops playing the ring back tone to the calling subscriber at the same time, and establishes a voice channel between the O_MSC and the T_MSC through its relay in order to enable communication between the calling subscriber and the called subscriber. If there is no answer from the called subscriber in the preset period of time or the subscriber chooses the state of busyness, step 3018 and its subsequent steps shown in FIG. 30B will be executed.

In steps 3018 and 3019, the T_MSC sends a Call Progress (CPG) indicating that the called subscriber hangs up to the RBTS, the RBTS stops playing the ring back tone customized by the called subscriber after receiving the message.

In step 3020, because the second called subscriber is also a ring back tone service registered subscriber, the T_MSC sends the call to the HLR to which the called terminal of the second called subscriber is attached according to the forwarding information set by the subscriber. Hereinafter, the called terminal of the second called subscriber is called as the second called terminal, and the HLR to which the second called terminal is attached is called as the second HLR.

In step 3021, because the second called subscriber also registers the ring back tone service as an intelligent service, the second HLR returns contract information of the second called subscriber to the T_MSC.

In step 3022, the T_MSC sends the call information to the SCP that manages the second called terminal, which is called as the second SCP hereinafter.

In steps 3023 to 3026, the second SCP sends a SRI to the second HLR. After receiving the request message, the second HLR sends a request for obtaining roaming number of the called subscriber to the T_MSC of the second called subscriber that is called as the second T_MSC hereinafter. The second T_MSC assigns a MSRN, called as the second MSRN hereinafter, to the second called subscriber. The second T_MSC sends the second MSRN to the second HLR, and then the second HLR sends the second MSRN that the second T_MSC assigns for the second called subscriber to the second SCP by means of a SRI response.

In step 3027, the second SCP sends the called number and original called number to the T_MSC by means of a CONNECT command. The called number here is the second MSRN with a routing prefix which is the routing number of the second RBTS, while the original called number is MSISDN of the second subscriber.

In step 3028, after receiving the CONNECT command from the second SCP, the T_MSC routes the call to the second RBTS according to routing prefix in the command, and at the same time sends an IAM to the second RBTS by means of forwarding. Here, the IAM includes calling number, called number and original called number. Among them, the called number is the second MSRN with a routing prefix, while the original called number is the MSISDN of the second called subscriber.

In step 3029, after receiving the IAM from the T_MSC, the second RBTS removes the routing prefix before the second MSRN, and extracts the original called number, and sends the calling number and the second MSRN to the second T_MSC by means of an IAM.

In step 3030, the second T_MSC pages the second called subscriber, and sends state information of the second called terminal to the second RBTS by means of an ACM.

In step 3031, the second RBTS judges whether the second called terminal is idle based on the ACM. If so, in steps 3032 to 3034, the RBTS searches the ring back tone customized by the second called subscriber according to the MSISDN of the second called subscriber, sends the ring back tone to the O_MSC through transparent transmission of the T_MSC and RBTS. The O_MSC plays the ring back tone customized by the second called subscriber to the calling subscriber, and screens the traditional ring back tone played by the second T_MSC at the same time, and then the subsequent steps will be executed. If the called terminal is not idle, for example, busy, shutdown or out of service range, the second RBTS will transparently transmit a voice prompt played by the second T_MSC that represents busyness, shutdown or out of service range to the calling subscriber via the O_MSC rather than playing the ring back tone to the calling subscriber.

In steps 3035 to 3038, when the second called subscriber answers the call, the second T_MSC sends an ANM to the second RBTS. After receiving the ANM, the second RBTS transparently transmits the ANM to the O_MSC via the T_MSC and RBTS, and stops playing the ring back tone to the calling subscriber, and establishes a voice channel between the O_MSC and the second T_MSC through relay of the second RBTS, and thereby enabling communication between the calling subscriber and the second called subscriber.

The embodiment is suitable for call forwarding process after ring on the called subscriber. While the twenty-second embodiment shown in FIG. 31A and FIG. 31B is suitable for call forwarding process without ring on the called subscriber.

Steps 3101 to 3111 are similar with steps 3001 to 3011, so detail description thereof will be omitted hereinafter.

In step 3112, the T_MSC pages the called subscriber, and sends state information of the called terminal to the RBTS by means of an ACM or a CPG.

In step 3113, the RBTS judges whether the called terminal is idle based on the ACM. If so, in step 3114 shown in FIG. 31A, the RBTS sends an ACM to the O_MSC, searches the ring back tone customized by the called subscriber according to MSISDN of the called subscriber, and plays the ring back tone to the calling subscriber via the O_MSC, and meanwhile screens the traditional ring back tone played by the T_MSC. And then step 3115 and its subsequent steps will be executed. Else, if the called terminal is not idle, for example, the network confirms that the subscriber is busy, and the called subscriber has configured after forwarding, then step 3125 and its subsequent steps shown in FIG. 31B will be executed, while the RBTS will not play the ring back tone to the calling subscriber.

In steps 3115 and 3116, when the called subscriber picks up the phone and answers the call, the T_MSC sends an ANM to the RBTS. After receiving the ANM, the RBTS sends an ANM to the O_MSC, and stops playing the ring back tone to the calling subscriber at the same time, and establishes a voice channel between the O_MSC and the T_MSC through its relay in order to enable communication between the calling subscriber and the called subscriber.

In step 3125 shown in FIG. 31B, because the second called subscriber is also a ring back tone service registered subscriber, the T_MSC sends call information to the HLR to which the second called terminal is attached, which is called the second HLR hereinafter, according to the forwarding information set by the subscriber.

Figure 32A:
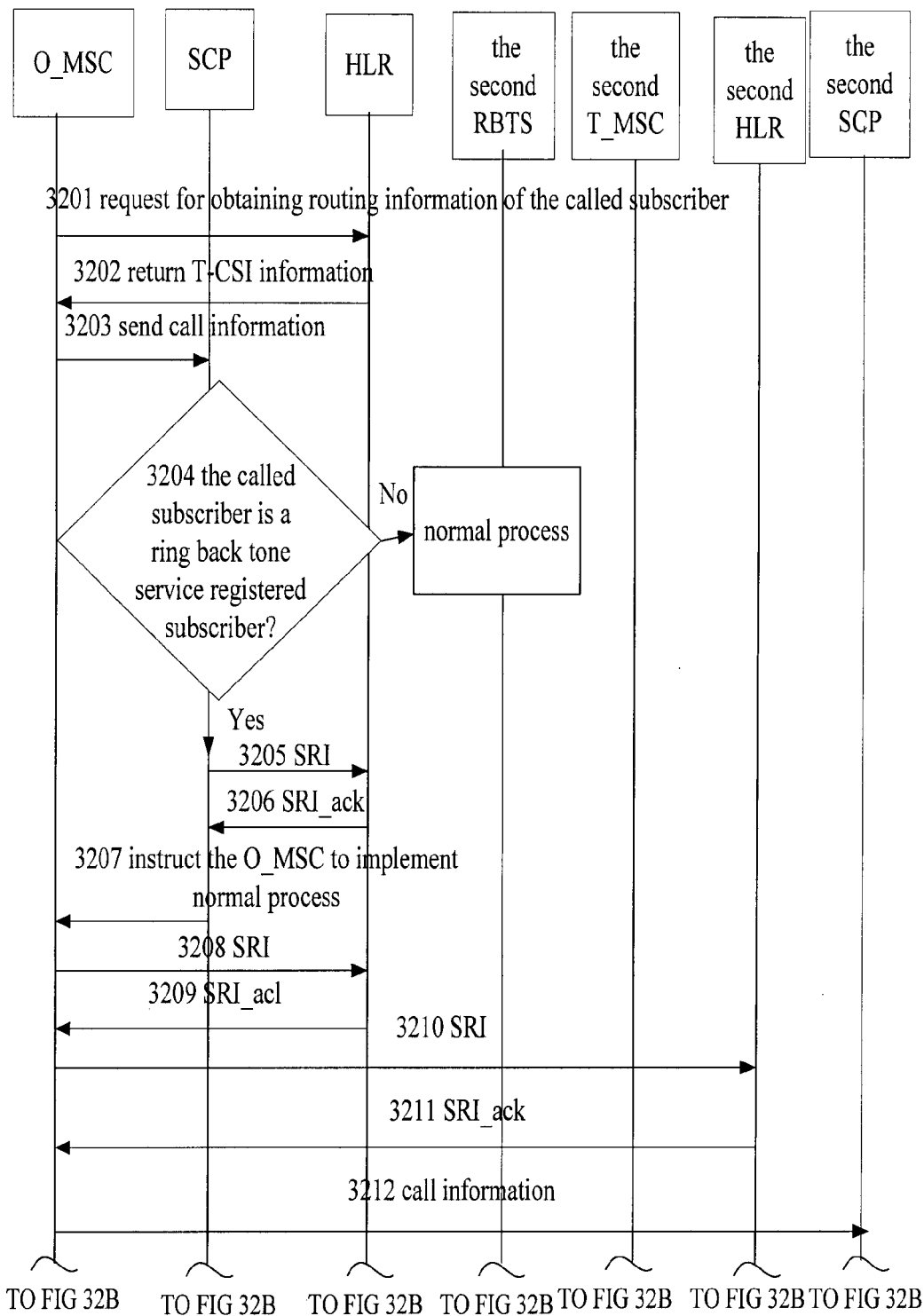
FIG. 32 is a signaling flowchart according to the twenty-third embodiment of the present invention.
Figure 32B:
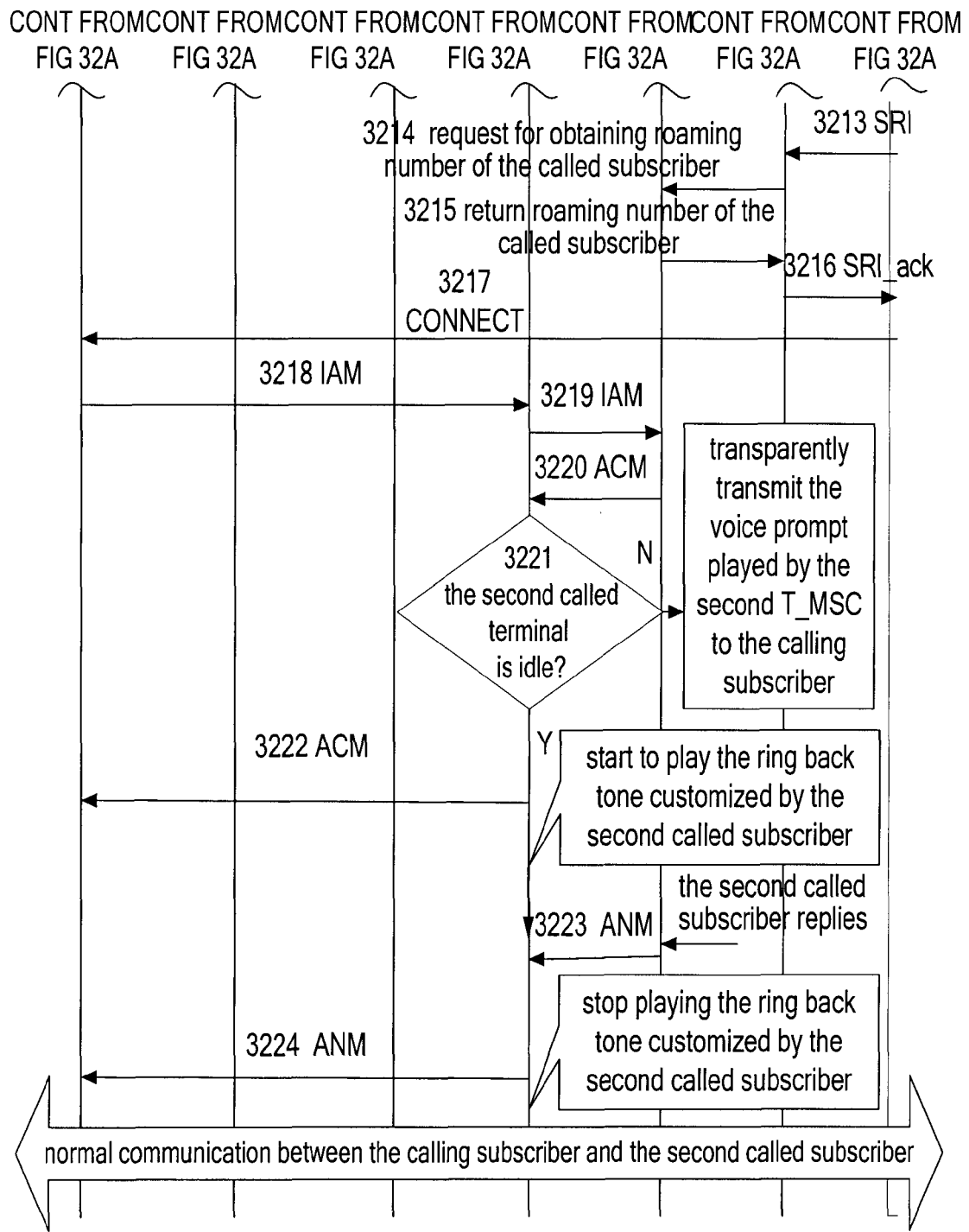

Steps 3126 to 3143 are similar with steps 3021 to 3038 above, so no detail will be elaborated further hereinafter The twenty-third embodiment shown in FIG. 32 is suitable for advance forwarding process, which means that the called subscriber has set unconditional forwarding or forwarding when the terminal is shutdown in the contract information.

In step 3201, when the calling subscriber initiates a call to called terminal B via calling terminal A, the O_MSC sends a request for obtaining routing information of the called subscriber to the HLR to which the called terminal is attached after receiving the call request from calling terminal A. Here, the request includes called number etc., the called number being MSISDN of the called subscriber.

In step 3202, the HLR finds the called subscriber is an intelligent network subscriber based on the called number, and then sends contract information of the called subscriber to the O_MSC. Here, because the triggering operation is made through intelligent network triggering in the embodiment, the called subscriber is registered as an intelligent network subscriber, in this way, the contract information of the called subscriber will be stored in forms of T-CSI information.

In step 3203, after receiving T-CSI information of the called subscriber, the O_MSC determines that the called subscriber is an intelligent network subscriber, and therefore sends the call related information to the SCP. Here, the call related information at least includes calling number and called number. It can be seen that the three steps are just identical with the routine of the prior triggering intelligent service.

In step 3204, the SCP judges whether the called subscriber is a ring back tone service registered subscriber according to the ring back tone service register information of the called subscriber saved in itself. If so, the steps followed will be executed. Else, the prior calling routine will be implemented.

In steps 3205 and 3206, the SCP sends a SRI to the HLR to which the called terminal is attached. Once confirming that the called subscriber has set unconditional forwarding after receiving the request message, the HLR instructs SCP to implement normal routine, if confirming that the called subscriber has set forwarding when the terminal is shutdown, the HLR will instruct SCP to implement normal routine under the condition that the called terminal is shutdown.

Besides, the SCP can judge whether the called subscriber performs unconditional forwarding according to the submitted call information. Under this circumstance, if the unconditional forwarding is performed, step 3207 will be executed directly, else step 3205 will be executed.

In step 3207, the SCP instructs the O_MSC to implement normal routine.

In steps 3208 and 3209, the O_MSC sends a SRI to the HLR which returns call forwarding message of the called subscriber which includes number of the second called subscriber.

In step 3210, the O_MSC sends a SRI to the second HLR to which the second called terminal is attached according to the number of the second called subscriber.

In step 3211, after confirming that the second called subscriber is an intelligent network subscriber, the second HLR returns contract information of the second called subscriber to the O_MSC.

In step 3212, the O_MSC sends the call information to the second SCP according to the contract information of the second called subscriber.

In steps 3213 to 3216, the second SCP sends a request for obtaining roaming number of the called subscriber to the second HLR which sends the request to the second T_MSC afterwards. The second T_MSC assigns a MSRN to the second called subscriber, and sends the second MSRN to the second HLR. The second HLR then sends the second MSRN assigned to the second called subscriber by the second T_MSC to the second SCP by means of a SRI response.

In step 3217, the second SCP sends the called number and original called number to the O_MSC by means of a connecting operation (CONNECT) command. The called number here is the second MSRN with a routing prefix which is an address of the second RBTS, while the original called number is MSISDN of the second called subscriber.

In step 3218, after receiving CONNECT command from the SCP, the O_MSC routes the call to the second RBTS according to routing prefix in the command, and at the same time sends an IAM to the second RBTS by means of forwarding mode. Here, the IAM includes calling number, called number and original called number. Here, the called number is the second MSRN with a routing prefix, while the original called number is MSISDN of the second called subscriber.

In step 3219, after receiving the IAM from the O_MSC, the second RBTS removes the routing prefix before the second MSRN, and extracts the original called number, after that, sends the calling number and the MSRN of the second called subscriber to the second T_MSC by means of an IAM.

In step 3220, the second T_MSC pages the called subscriber, and sends state information of the second called terminal to the second RBTS by means of an ACM.

In step 3221, the second RBTS judges whether the called subscriber is idle based on the ACM. If so, in step 3222, the RBTS sends an ACM to the O_MSC and searches the ring back tone customized by the second called subscriber according to the MSISDN of the second called subscriber, and then plays the ring back tone customized by the second called subscriber to the calling subscriber via the O_MSC, and screens the traditional ring back tone played by the second T_MSC at the same time. After that, the subsequent steps will be executed. Else, if the second called terminal is not idle, for example busy, shutdown or out of service range, the second RBTS will transparently transmit a voice prompt played by the second T_MSC that represents the state of busyness, shutdown or out of service range to the calling subscriber via the O_MSC, rather than playing the ring back tone to the calling subscriber.

In steps 3223 and 3224, when the second called subscriber picks up the phone and answers the call, the second T_MSC sends an ANM to the second RBTS. After receiving the ANM, the second RBTS sends the ANM to the O_MSC, and stops playing ring back tone to the calling subscriber simultaneously, and establishes a voice channel between the O_MSC and the second T_MSC through relay of itself, thereby enabling communication between the calling subscriber and the second called subscriber.

The method for implementing call forwarding has been discussed in detail through the twenty-first to twenty-third embodiments. All the three embodiments take the intelligent network triggering mode as example, it can be understood that the idea for implementing call forwarding and further playing the ring back tone customized by the second called subscriber can be easily applied for the switching device triggering mode and signaling interception triggering mode, so description thereof will be omitted hereinafter.

Figure 33:
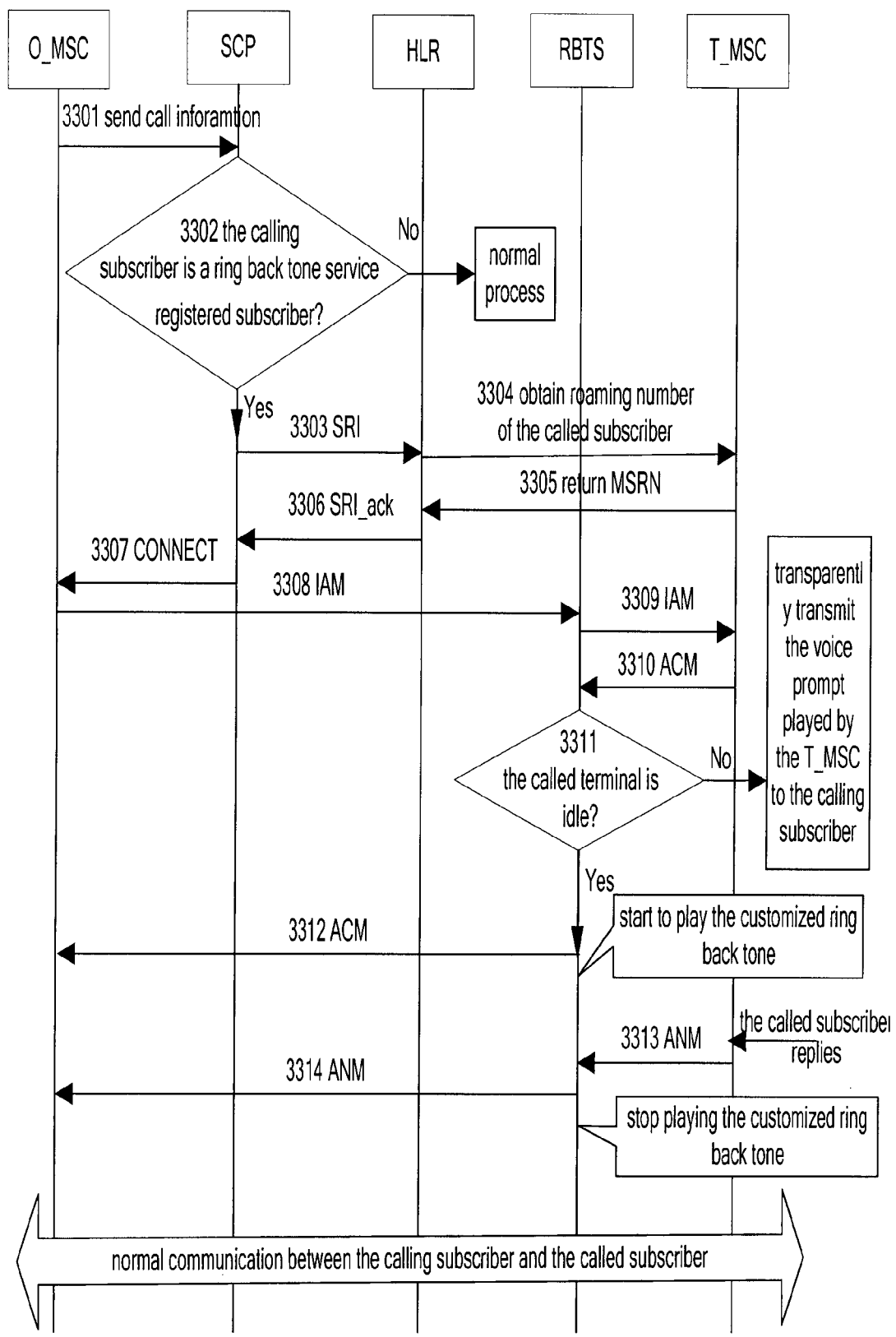
FIG. 33 is a signaling flowchart according to the twenty-fourth embodiment of the present invention.

In addition, in this invention, not only the ring back tone customized by the called subscriber can be played to the calling subscriber, but also the ring back tone customized by the calling subscriber can be played. Thus, the twenty-fourth embodiment shown in FIG. 33 is provided on the basis of the first embodiment.

In step 3301, when the calling subscriber initiates a call to called terminal B via calling terminal A, the O_MSC determines that the calling subscriber is an intelligent subscriber according to the O_CSI information stored in itself after receiving the call from calling terminal A, and sends the call related information to the SCP. Here, the call related information at least includes calling number and called number.

In step 3302, the SCP judges whether the calling subscriber is a ring back tone service registered subscriber according to ring back tone service register information of the calling subscriber stored in the SCP. If so, the subsequent steps will be executed. Else, the SCP instructs the O_MSC to implement prior call processing which is similar with steps 201 to 209 shown in FIG. 2, simply speaking, which means to establish a voice channel between the O_MSC and the T_MSC when the called terminal is idle.

In steps 3303 to 3306, the SCP sends a SRI to the HLR to which the called terminal is attached. After receiving the request message, the HLR sends a request for obtaining roaming number of the called subscriber to the T_MSC, and then the T_MSC assigns a MSRN for the called subscriber and sends the MSRN to the HLR which transmits the MSRN to the SCP by means of a SRI response message afterwards.

In step 3307, the SCP sends the called number and original called number to the O_MSC by means of a CONNECT command. The called number is MSRN with a routing prefix which is an address of the RBTS, while original called number is MSISDN.

In step 3308, after receiving the CONNECT command from the SCP, the O_MSC routes the call to the RBTS according to the routing prefix in the command, and sends an IAM at the same time to the RBTS with forwarding mode. Here, the IAM includes calling number, called number and original called number. The called number is MSRN with a routing prefix, while the original called number is MSISDN.

In step 3309, after receiving the IAM sent from the O_MSC, the RBTS removes the routing prefix before the MSRN, and extracts the original called number, and sends the calling number and the MSRN of the called subscriber to the T_MSC by means of the IAM.

In step 3310, the T_MSC pages the called subscriber and sends state information of the called subscriber to the RBTS by means of an ACM.

In step 3311, the RBTS judges whether the called subscriber is idle based on the ACM. If so, in step 3312, the RBTS sends an ACM to the O_MSC, searches the ring back tone customized by the calling subscriber according to the calling number, and plays the ring back tone to the calling subscriber via the O_MSC, and meanwhile screens the traditional ring back tone played by the T_MSC. After that, the subsequent steps will be executed. If the called terminal is not idle, for example, busy, shutdown or out of service range, the RBTS will transparently transmit a voice prompt played by the T_MSC that represents busyness, shutdown or out of service range to the calling subscriber via the O_MSC rather than playing the ring back tone to the calling subscriber.

In steps 3313 and 3314, when the called subscriber picks up the phone and answers the call, the T_MSC sends an ANM to the RBTS. After receiving the ANM, the RBTS sends the ANM to the O_MSC, and stops playing the ring back tone to the calling subscriber at the same time, and then establishes a voice channel between the O_MSC and the T_MSC through its relay in order to enable communication between the calling subscriber and the called subscriber.

Through comparing with the first embodiment, it is clear that the O_MSC searches calling subscriber information first, and initiates a signaling directly to the SCP according to the fact that the calling subscriber is an intelligent network subscriber, and then the SCP judges whether the calling subscriber is a ring back tone service registered subscriber. Moreover, at the time when playing ring back tone to the calling subscriber, the SCP plays the ring back tone customized by the calling subscriber rather than by the called subscriber, thereby, the calling subscriber can enjoy the ring back tone customized by himself. One skilled in the art will readily recognize that the idea of the twenty-fourth embodiment can be easily applied to other embodiments.

Figure 34:
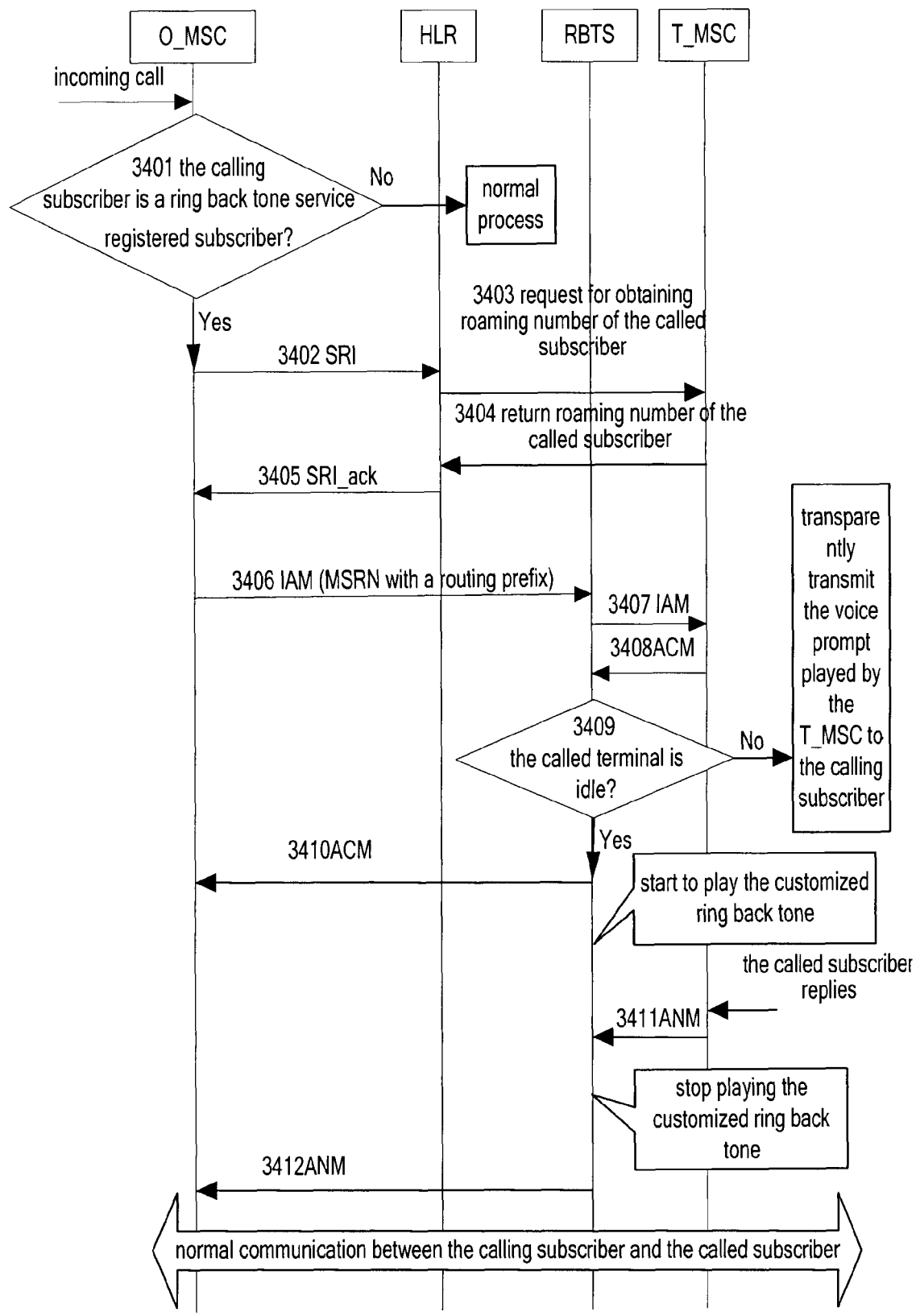
FIG. 34 is a signaling flowchart according to the twenty-fifth embodiment of the present invention.

An example of playing ring back tone customized by the calling subscriber in the case of switching device triggering, i.e. the twenty-fifth embodiment shown in FIG. 34, will be described hereinafter.

In step 3401, when the calling subscriber initiates a call to called terminal B via calling terminal A, the O_MSC receives the call from calling terminal A, and determines whether the calling subscriber is a ring back tone service registered subscriber according to the calling number in the request by means of the database in itself, if so, the subsequent steps will be executed, else normal call processing will be implemented.

Because the ring back tone service register information of the subscriber is included in subscriber information in the HLR, when the subscriber terminal implements location update, the HLR sends the subscriber information including the ring back tone service register information to the VLR to which the subscriber corresponds. Because the VLR usually is integrated with the MSC, the O_MSC can determine whether the calling subscriber is a ring back tone service registered subscriber in step 3401.

In step 3402, the O_MSC then sends a request for obtaining route information of the called subscriber to the HLR to which the called subscriber belongs. Here, the request called subscriber etc.

In steps 3403 and 3404, the HLR sends a request for obtaining roaming number of the called subscriber to the T_MSC. After that, the T_MSC assigns a MSRN to the called subscriber, and then sends the MSRN to the HLR.

In step 3405, the HLR returns the MSRN of the called subscriber to the O_MSC.

In step 3406, the O_MSC routes the call to the RBTS according to the routing prefix, and sends an IAM at the same time to the RBTS with forwarding mode. Here, the IAM includes calling number, called number and original called number. The called number is MSRN with a routing prefix, while the original called number is MSISDN.

In step 3407, after receiving the IAM sent from the O_MSC, the RBTS removes the routing prefix before the MSRN, extracts the original called number, and sends the calling number and the MSRN of the called subscriber to the T_MSC by means of an IAM.

In step 3408, the T_MSC pages the called subscriber and sends state information of the called terminal to the RBTS by means of an ACM.

In step 3409, the RBTS judges whether the called terminal is idle based on the ACM. If so, in step 3410, the RBTS sends an ACM to the O_MSC, searches the ring back tone customized by the calling subscriber according to the calling number, and plays the ring back tone to the calling subscriber via the O_MSC, and meanwhile screens the traditional ring back tone played by the T_MSC. And then the subsequent steps will be executed. If the called terminal is not idle, for example, busy, shutdown or out of service range, then the RBTS will transparently transmit a voice prompt played by the T_MSC that represents busyness, shutdown or out of service range to the calling subscriber via the O_MSC rather than playing the ring back tone to the calling subscriber.

In steps 3411 and 3412, when the called subscriber picks up the phone and answers the call, the T_MSC sends an ANM to the RBTS. The RBTS afterwards sends the ANM to the O_MSC after receiving the ANM, and stops playing the ring back tone to the calling subscriber at the same time, and establishes a voice channel between the O_MSC and the T_MSC through its relay in order to enable communication between the calling subscriber and the called subscriber.

Figure 35:
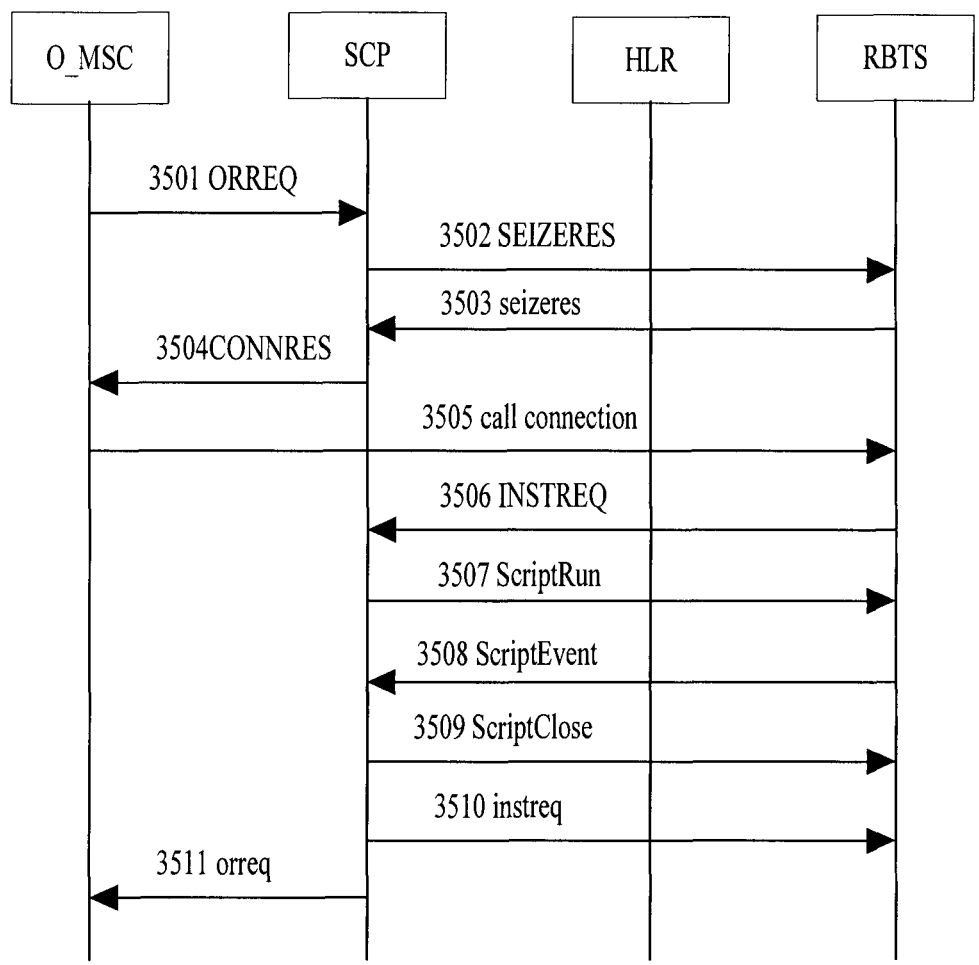
FIG. 35 is a signaling flowchart of subscriber-customized ring back tone management in CDMA network according to the present invention.

In addition, for the sake of enabling the subscriber to flexibly modify the ring back tone service customized by himself, for instance, the subscriber can replace the customized ring back tone, register or cancel ring back tone services etc. The present invention provides a method for the ring back tone service management shown in FIG. 35. The embodiment will be described hereinafter with CDMA network as an example.

In step 3501, after receiving a call whose called number is routing number of the RBTS, the O_MSC sends an ORREQ signaling to the SCP.

In step 3502, the SCP sends a SEIZERES signaling to the RBTS to ask for channel resource after receiving the ORREQ signaling.

In step 3503, the RBTS sends answer message seizeres to the SCP to confirm channel resource assigned for the call.

In step 3504, after receiving the correct response, the SCP sends a CONNRES signaling to the O_MSC to instruct the O_MSC to connect the call to the RBTS according to the channel resource.

In steps 3505 and 3506, the O_MSC connects the call to the RBTS which sends INSTREQ signaling indicating voice channel has been connected successfully to the SCP afterwards.

In step 3507, the SCP sends a ScriptRun signaling including number information of the subscriber to the RBTS, and then calls voice prompt stored in advance from database of the RBTS through UIScript message interface and plays the voice prompt to the subscriber. The RBTS executes corresponding procedures after receiving the information inputted by the subscriber. Concretely speaking, if the information received from the subscriber is a command of opening an account, the subscriber number will be added in the ring back tone service subscriber list database; if the information received from the subscriber is a command of canceling an account, the subscriber number will be deleted from the ring back tone service subscriber list database. In addition, the RBTS can search the ring back tone customized by the subscriber to the service provider SP through VXML script language.

In step 3508, after making modification on corresponding records in the database, the RBTS sends a ScriptEvent signaling to the SCP.

In step 3509, according to the operations on the subscriber made by the RBTS such as opening an account, canceling an account, customization and modification of the ring back tone service, the SCP generates corresponding charge information, and sends a ScriptClose signaling to the RBTS.

In step 3510, the SCP sends an instreq signaling to the RBTS, instructing the RBTS to disconnect channel connection.

In step 3511, the SCP sends an orreq signaling to the O_MSC, instructing the O_MSC to release channel connection with the RBTS.

Subsequently, the SCP can send the charge information to the business account further through the interface with business account so as to generate bills.

Figure 36:
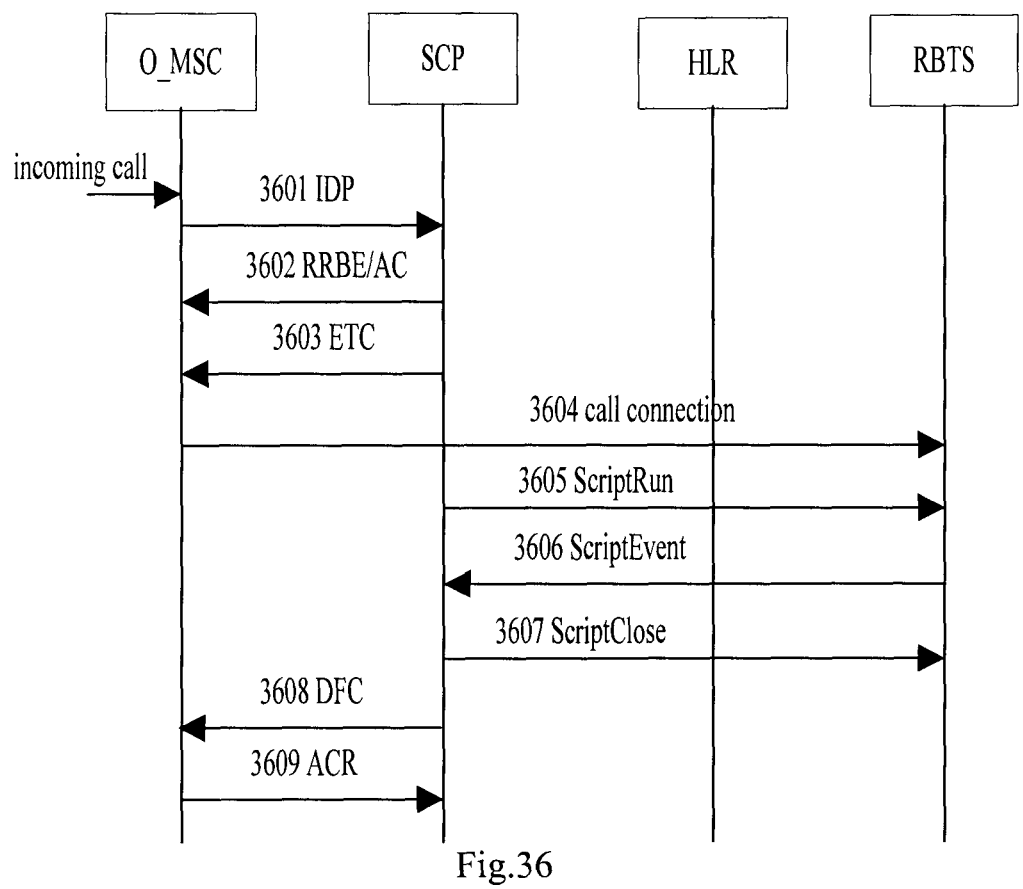
FIG. 36 is a signaling flowchart of subscriber-customized ring back tone management in GSM network according to the present invention.

The above method is also applicable for the GSM system, whose procedure is shown in FIG. 36.

In step 3601, after receiving a call from the subscriber whose called number is routing number of the RBTS, the O_MSC sends an IDP signaling to the SCP.

In step 3602, after receiving the signaling, the SCP sends a RRBE/AC signaling to the O_MSC.

In step 3603, the SCP sends an ETC signaling including routing number of the RBTS to the O_MSC.

In step 3604, the O_MSC connects the call to the RBTS according to the routing number of the RBTS in the ETC signaling.

In step 3605, the SCP sends a ScriptRun signaling including number information of the subscriber to the RBTS, and then calls voice prompt stored in advance from database of the RBTS through UIScript message interface and plays the voice prompt to the subscriber. The RBTS executes corresponding procedures after receiving the information inputted by the subscriber. Concretely speaking, if the information received from the subscriber is a command of opening an account, the subscriber number will be added in the ring back tone service subscriber list database; if the information received from the subscriber is a command of canceling an account, the subscriber number will be deleted from the ring back tone service subscriber list database. In addition, the RBTS can search the ring back tone customized by the subscriber to the service provider SP through VXML script language.

In step 3606, after making modification on corresponding records in the database, the RBTS sends a ScriptEvent signaling to the SCP.

In step 3607, according to the operations on the subscriber made by the RBTS such as opening an account, canceling an account, customization and modification of the ring back tone service, the SCP generates corresponding charge information, and sends a ScriptClose signaling to the RBTS.

In step 3608, the SCP sends a DFC signaling to the O_MSC, instructing the O_MSC to release channel connection with the RBTS.

In step 3609, O_MSC sends an ACR signaling to the SCP, and disconnects the voice channel with the RBTS.

Subsequently, the SCP can send the charge information to the business account further through the interface with business account so as to generate bills.

The present invention has been described in detail above with reference to some embodiments. In the present invention, it is possible that only part of the played ring back tones is customized by the subscriber. For instance, traditional ring back tone can be played first to the subscriber, and after waiting for a relative short period of time, for example 10 seconds, the prompt voice of "wait a moment please" will be played to the calling subscriber, and then the ring back tones such as music customized by the subscriber will be played.

In addition, in the present invention, a subscriber can upload his favorite sound sources to the ring back tone device, and thereby the ring back tone device provides personal ring back tone service to the subscriber. There are two ways to implement sound resource uploading, one of which is that the ring back tone system records sound source provided by subscribers through an Interactive Voice Response (IVR) process, and transforms the source into the format supported by the ring back tone device, and stores the source in ring back tone base of the corresponding subscriber in the ring back tone device, acting as ring back tone of the subscriber; another is that the subscriber uploads the sound source to the ring back tone device through direct logging on ring back tone device via Internet, where the source is transformed into the format supported by the ring back tone device, and stored in ring back tone base of the corresponding subscriber in the ring back tone device, acting as ring back tone of the subscriber. Both of these two methods above can enable the subscriber to use the sound source as their favorite ring back tones. Here, the sound resource may be flow media, dynamic information or existing fixed voice. From these methods the subscriber can enjoy colorful ring back tone service provided by the ring back tone device.

In the present invention, in case of playing ring back tone customized by the called subscriber to the calling subscriber, it is possible to further set different ring back tones for different calling subscribers, thereby, different calling subscribers who dial telephone of the same called subscriber can enjoy different ring back tones.

The above-described exemplary embodiments are intended to be illustrative in all respects, rather than restrictive, of the present invention. One skilled in the art will appreciate that many variations, equivalents and modifications are possible within the scope of the present invention.

The invention claimed is:

1. A method for providing ring back tones in a communication network which at least includes an originating switching device, a terminating switching device and a Home Location Register (HLR), said method comprising:
   a. establishing a ring back tone device for storing and playing ring back tones in the communication network, and storing ring back tone service register information of subscribers in the subscriber information in the HLR, wherein said ring back tone service register information at least includes identification information indicating whether a subscriber is a ring back tone service registered subscriber and routing information of the ring back tone device;
   b. after receiving a call request, the originating switching device sending a request for roaming number of the called subscriber to the HLR, and then judging whether the called subscriber is a ring back tone service registered subscriber according to the called subscriber information corresponding to said identification information received from the HLR, if so, going to step c, else, going to step d; and
   c. establishing a connection between the originating switching device and the terminating switching device, and establishing a connection between a switching device and the ring back tone device according to the routing information of the ring back tone device in the subscriber information of the called subscriber, the ring back tone device playing a ring back tone pre-customized by the called subscriber to the calling subscriber when the called terminal is idle; or d. establishing a connection between the originating switching device and the terminating switching device.

2. The method according to claim 1, after the step of the originating switching device sending a request for roaming number of the called subscriber to the HLR, said method further comprising:

the HLR judging whether the called subscriber is a ring back tone service registered subscriber according to the identification information in the ring back tone service register information, if so, sending roaming number of the called subscriber with a routing prefix as called number to the originating switching device, wherein said routing prefix is a routing number of the ring back tone device; else, sending roaming number of the called subscriber as called number to the originating switching device;

said judging whether the called subscriber is a ring back tone service registered subscriber according to subscriber information received from the HLR is judging whether the routing number of the ring back tone device acts as routing prefix of the called number;

wherein the steps of establishing a connection between the originating switching device and the terminating switching device, and establishing a connection between a switching device and the ring back tone device comprise:

the originating switching device establishing a connection to the ring back tone device according to the routing prefix, and sending an IAM to the ring back tone device, wherein said IAM includes a calling number, a called number and an original called number, and the called number is a roaming number of the called subscriber with a routing prefix;

the ring back tone device removing the routing prefix from the called number, and establishing a connection to the terminating switching device according to the roaming number of the called subscriber.

3. The method according to claim 2, before the step of the ring back tone device playing a ring back tone pre-customized by the called subscriber to the calling subscriber when the called terminal is idle in step c, said method further comprising:

the terminating switching device paging the called subscriber, and sending state information of the called terminal to the ring back tone device;

the ring back tone device judging whether the called terminal is idle, if so, executing the step of playing the ring back tone pre-customized by the called subscriber to the calling subscriber; else transparently transmitting a voice prompt played by the terminating switching device to the calling terminal.

4. The method according to claim 2, after step c further comprising: after receiving an answer message ANM denoting the called subscriber has picked up the phone, the ring back tone device stopping playing the subscriber-customized ring back tone to the calling subscriber, and connecting the call between the calling subscriber and the called subscriber through relay of itself.

5. The method according to claim 1, after the step of the originating switching device sending a request for obtaining roaming number of the called subscriber to the HLR, said method further comprising:

the HLR judging whether the called subscriber is a ring back tone service registered subscriber according to the identification information in the ring back tone service register information, if so, adding the roaming number of the ring back tone device to a response message and sending said response message to the originating switching device; else, sending a response message to the originating switching device directly;

said judging whether the called subscriber is a ring back tone service registered subscriber according to subscriber information received from the HLR is judging whether the information received from the HLR includes the routing number of the ring back tone device;

wherein the steps of establishing a connection between the originating switching device and the terminating switching device, and establishing a connection between a switching device and the ring back tone device comprise:

the originating switching device establishing a connection to the ring back tone device according to the routing number of the ring back tone device, and obtaining the roaming number of the called subscriber from the HLR according to the original called number, and then establishing a connection to the terminating switching device according to the roaming number of the called subscriber.

6. The method according to claim 5, before the step of the ring back tone device playing a ring back tone pre-customized by the called subscriber to the calling subscriber when the called terminal is idle, said method further comprising:

the terminating switching device paging the called subscriber, and sending state information of the called terminal to the originating switching device;

the originating switching device judging whether the called terminal is idle, if so, instructing the ring back tone device to play the ring back tone pre-customized by the called subscriber to the calling subscriber; else transparently transmitting a voice prompt played by the terminating switching device to the calling terminal.

7. The method according to claim 6, wherein the step of the originating switching device instructing the ring back tone device to play the ring back tone pre-customized by the called subscriber to the calling subscriber comprises:

the originating switching device sending a message including a calling number and a called number to the ring back tone device;

the ring back tone device determining the subscriber-customized ring back tone based on the subscriber number, and then sending a response message to the calling subscriber, meanwhile playing the subscriber-customized ring back tone to the calling subscriber through the originating switching device.

8. The method according to claim 5, after step c further comprising:

when the called subscriber picks up the phone and answers the call, the terminating switching device sending an ANM denoting the called subscriber has picked up the phone to the originating switching device;

after receiving said ANM, the originating switching device disconnecting the routing to the ring back tone device immediately, while keeping channel connection between the originating switching device and the terminating switching device.

9. The method according to claim 1, wherein the request that the originating switching device sends to the SCP in step b further includes an identifier of the originating switching device, before determining the called subscriber is a ring back tone service registered subscriber according to the called subscriber information received from the HLR, said method further comprising:
the HLR judging whether the originating switching device supports ring back tone service according to the received identifier of the originating switching device, if so, adding the identifier of the originating switching device in the information sent to the originating switching device; else, selecting a switching device that supports the ring back tone service, and adding the identifier of the switching device that supports the ring back tone service in the information sent to the originating switching device;
before step c, said method further comprising:
the originating switching device judging whether the received identifier of the switching device is the same as the identifier of itself, if so, executing step c; else, the originating switching device establishing a connection to the switching device corresponding to the received identifier, and establishing a connection to the terminating switching device via relay of the switching device that supports the ring back tone service, and meanwhile establishing a connection between a switching device and the ring back tone device, the ring back tone device playing a ring back tone pre-customized by the called subscriber to the calling subscriber via said switching device when the called terminal is idle.

10. A method for providing ring back tones in a communication network which at least includes an originating switching device, a terminating switching device and a HLR, said method comprising:
 a. establishing a ring back tone device for storing and playing ring back tones in the communication network, and storing ring back tone service register information of subscribers in the subscriber information in HLR, wherein said ring back tone service register information at least includes identification information indicating whether a subscriber is a ring back tone service registered subscriber and routing information of the ring back tone device;
 b. the HLR sending the subscriber information including ring back tone service register information of subscribers to the switching devices in which said subscriber information is stored;
 c. after receiving a call request, the originating switching device judging whether the calling subscriber is a ring back tone service registered subscriber according to the identification information in the subscriber information stored in itself, if so, going to step d, else going to step e; and
 d. establishing a connection between the originating switching device and the terminating switching device, and establishing a connection between a switching device and the ring back tone device according to the routing information of the ring back tone device in the subscriber information, the ring back tone device playing a ring back tone pre-customized by the calling subscriber to the calling subscriber when the called terminal is idle; or
 e. establishing a connection between the originating switching device and the terminating switching device.

11. The method according to claim 10, before step d further comprising:
the originating switching device obtaining roaming number of the called subscriber from the HLR to which the called terminal is attached;
wherein establishing a connection between the originating switching device and the terminating switching device and a connection between a switching device and the ring back tone device is establishing such connections according to the roaming number of the called subscriber and the routing number of the ring back tone device stored in the originating switching device.

12. The method according to claim 11, wherein the step of establishing such connections according to the roaming number of the called subscriber and the routing number of the ring back tone device stored in the originating switching device comprises:
the originating switching device establishing a connection to the ring back tone device according to the routing information of the ring back tone device;
the ring back tone device obtaining roaming number of the called subscriber from the information received from the originating switching device, and then establishing a connection to the terminating switching device according to the roaming number of the called subscriber.

13. The method according to claim 11, wherein the step of establishing such connections according to the roaming number of the called subscriber and the routing number of the ring back tone device stored in the originating switching device comprises:
the originating switching device establishing a connection to the ring back tone device according to the routing number of the ring back tone device, meanwhile establishing a connection to the terminating switching device according to the roaming number of the called subscriber.

14. A system for providing ring back tones in a communication network, comprising an originating switching device, a terminating switching device and a HLR, further comprising:
a ring back tone device, for storing subscriber-customized ring back tones and playing a ring back tone pre-customized by a subscriber to the calling subscriber via a switching device when the called terminal is idle;
wherein the HLR stores ring back tone service register information of subscribers, and is capable of sending said ring back tone service register information of subscribers to a switching device while sending roaming number of the called subscriber;
wherein the originating switching device and the terminating switching device are capable of judging whether a subscriber is a ring back tone service registered subscriber according to the ring back tone service register information.

15. The system according to claim 14, wherein said HLR is further used to send ring back tone service register information of subscribers to a switching device, and the originating switching device and the terminating switching device store said ring back tone service register information received from the HLR.

* * * * *